US012473709B2

(12) United States Patent
Nagao et al.

(10) Patent No.: US 12,473,709 B2
(45) Date of Patent: Nov. 18, 2025

(54) WORKING MACHINE

(71) Applicant: KUBOTA CORPORATION, Osaka (JP)

(72) Inventors: Kohei Nagao, Osaka (JP); Yuji Fukuda, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 375 days.

(21) Appl. No.: 18/119,573

(22) Filed: Mar. 9, 2023

(65) Prior Publication Data

US 2024/0301651 A1 Sep. 12, 2024

(51) Int. Cl.
*E02F 3/42* (2006.01)
*E02F 3/34* (2006.01)
(Continued)

(52) U.S. Cl.
CPC ............ *E02F 3/422* (2013.01); *E02F 3/3414* (2013.01); *E02F 3/431* (2013.01); *E02F 9/2004* (2013.01);
(Continued)

(58) Field of Classification Search
CPC ......... E02F 3/422; E02F 3/3414; E02F 3/431; E02F 9/2004; E02F 9/2203; E02F 9/262;
(Continued)

(56) References Cited

U.S. PATENT DOCUMENTS 11,319,695 B2 * 5/2022 Yamamoto .............. E02F 9/262
2006/0108127 A1 * 5/2006 Batthala .............. A01B 63/1117
172/2

(Continued)

FOREIGN PATENT DOCUMENTS

JP H 01153373 A * 6/1989
JP 2012233521 A * 11/2012

(Continued)

OTHER PUBLICATIONS

High-Resolution Indirect Feetâ Ground Interaction Measurement for Hydraulic-Legged Robots (Year: 2009).*

(Continued)

*Primary Examiner* — Fadey S. Jabr
*Assistant Examiner* — Faris Asim Shaikh
(74) *Attorney, Agent, or Firm* — GREENBLUM & BERNSTEIN, P.L.C.

(57) ABSTRACT

A working machine includes: at least one support member connectable to a work attachment to do work by making contact with an object to be contacted; at least one hydraulic cylinder to move the work attachment connected to the at least one support member, a rod-side pressure detector to detect a rod-side hydraulic pressure of hydraulic fluid in communication with a rod-side fluid chamber of the at least one hydraulic cylinder; a bottom-side pressure detector to detect a bottom-side hydraulic pressure of hydraulic fluid in communication with a bottom-side fluid chamber of the at least one hydraulic cylinder; and a controller to calculate a relationship in pressure between the rod-side hydraulic pressure and the bottom-side hydraulic pressure and evaluate, based on the calculated relationship in pressure, a contact state which is a state of contact of the work attachment with the object.

8 Claims, 13 Drawing Sheets

(51) Int. Cl.

| | |
|---|---|
| ***E02F 3/43*** | (2006.01) |
| ***E02F 3/96*** | (2006.01) |
| ***E02F 9/20*** | (2006.01) |
| ***E02F 9/22*** | (2006.01) |
| ***E02F 9/26*** | (2006.01) |
| ***F15B 11/08*** | (2006.01) |
| ***F15B 15/20*** | (2006.01) |
| ***F15B 19/00*** | (2006.01) |

(52) U.S. Cl.

CPC ............ *E02F 9/2203* (2013.01); *E02F 9/262* (2013.01); *F15B 11/08* (2013.01); *F15B 15/20* (2013.01); *F15B 19/00* (2013.01); *E02F 3/96* (2013.01); *E02F 9/2285* (2013.01); *E02F 9/2292* (2013.01); *E02F 9/2296* (2013.01)

(58) Field of Classification Search

CPC ......... E02F 3/96; E02F 9/2285; E02F 9/2292; E02F 9/2296; E02F 3/06; E02F 3/966; E02F 9/264; F15B 11/08; F15B 15/20; F15B 19/00; F15B 21/087; F15B 2211/7053; F15B 2211/6313; F15B 2211/6653; F15B 2211/76

See application file for complete search history.

(56) References Cited

U.S. PATENT DOCUMENTS

| | | | | |
|---|---|---|---|---|
| 2014/0271074 | A1* | 9/2014 | Ogawa | E02F 9/264 414/687 |
| 2017/0101761 | A1* | 4/2017 | Wu | E02F 9/20 |
| 2017/0114525 | A1* | 4/2017 | Rosa Neto | E02F 9/2257 |
| 2017/0211597 | A1* | 7/2017 | Vigholm | E02F 9/0883 |
| 2018/0110190 | A1* | 4/2018 | Mahrenholz | A01G 23/081 |
| 2020/0131731 | A1* | 4/2020 | Wu | E02F 3/439 |
| 2020/0299933 | A1* | 9/2020 | Wu | E02F 9/265 |
| 2020/0325649 | A1* | 10/2020 | Tsukamoto | E02F 3/439 |
| 2020/0362532 | A1* | 11/2020 | Shiratani | E02F 9/2267 |
| 2021/0010239 | A1* | 1/2021 | Ono | E02F 9/2041 |
| 2021/0198865 | A1* | 7/2021 | Wu | E02F 9/265 |
| 2022/0081871 | A1* | 3/2022 | Oasa | E02F 3/434 |
| 2022/0145584 | A1* | 5/2022 | Fujiwara | E02F 9/264 |
| 2022/0195690 | A1* | 6/2022 | Wu | E02F 9/205 |
| 2023/0313503 | A1* | 10/2023 | Hayakawa | E02F 9/2228 701/31.4 |
| 2024/0011243 | A1* | 1/2024 | Misaki | E02F 9/2228 |
| 2024/0011250 | A1* | 1/2024 | Ogawa | E02F 3/84 |
| 2024/0247460 | A1* | 7/2024 | Ikeda | E02F 9/2004 |
| 2024/0279902 | A1* | 8/2024 | Hashimoto | E02F 9/261 |
| 2025/0059728 | A1* | 2/2025 | Kowatari | E02F 9/265 |

FOREIGN PATENT DOCUMENTS

| | | | |
|---|---|---|---|
| JP | 2021-24383 A | | 2/2021 |
| JP | 2021024383 A | * | 2/2021 |

OTHER PUBLICATIONS

Translation of JP2012233521A retrieved from Espacenet on May 8, 2025 (Year: 2025).*

Translation of JP2021024383A retrieved from Espacenet on May 8, 2025 (Year: 2025).*

Translation of JPH01153373A retrieved from Espacenet on May 8, 2025 (Year: 2025).*

* cited by examiner

WORKING MACHINE

BACKGROUND OF THE INVENTION

1. Field of the Invention

The present invention relates to working machines such as loaders including a skid-steer loader and a compact track loader.

2. Description of the Related Art

For example, a working vehicle as disclosed in JP2021-24383A (wheel loader) includes a fluid pressure detector to detect the pressure of hydraulic fluid in hydraulic cylinder(s) to support and actuate a work attachment (bucket). Such a working vehicle is capable of calculating the weight of a load on the work attachment (such as earth and sand on the bucket lifted above the ground) based on the result of detection by the fluid pressure detector.

There are cases in which a working machine such as a loader having a bucket (work attachment) attached to its arm(s) performs land leveling (leveling of ground) by bringing the bucket into contact with the ground surface. For such land leveling work, the bucket should be maintained in a suitable attitude while in contact with the ground surface to a suitable degree (at a suitable pressure). The way of keeping the bucket in contact with the ground surface in such a manner for land leveling work relies on worker's experience in operation. Note that the same applies when leveling of ground is performed with a dozer blade attached to the arm(s) of the loader instead of the bucket.

In addition to the above cases of the land leveling work using a bucket or a dozer blade, there are also many cases where the work attachment attached to the arm(s) of a working machine such as a loader is required to be in contact with an object such as a to-be-excavated object including ground surface, soil, plants, bedrock, and buildings to a suitable degree (at a suitable pressure).

For example, in cases where a hydraulic breaker attached to the distal end of lift arm(s) of a loader is used to crush a to-be-crushed object such as a concrete wall of an old building, the breaker should be driven after the breaker is brought into contact with the to-be-crushed object. The breaker may otherwise be damaged from idle strokes.

Furthermore, in cases where a sweeper attached to the distal end of lift arm(s) of a loader is used to clean the ground surface (such as a road surface), the rotary brush of the sweeper should not only be merely in contact with the ground surface (road surface) but also be in contact with the ground by a suitable pressure. For example, when the pressure of contact of the rotary brush with the ground is less than a suitable pressure, i.e., when the sweeper is located higher than a position that achieves a suitable contact with the ground surface, the sweeper cannot sweep dust or the like on the ground surface sufficiently, resulting in a reduction in efficiency of cleaning. On the contrary, when the pressure of contact of the rotary brush with the ground is greater than the suitable pressure and the sweeper is strongly pressed against the ground surface, the rotary brush pressed against the ground surface does not rotate well, also resulting in a reduction in efficiency of cleaning.

The same applies to cases in which a brush cutter attached to the distal end of lift arm(s) of a loader is used to mow grass in the bush. It is required that the shoe (sled) on the body cover that supports the rotary blade of the brush cutter be in contact with the ground at a suitable angle (that is, the shoe be parallel to the ground surface and in contact with the ground surface) at a suitable pressure. If the pressure to press the shoe against the ground surface is too large or the angle of the shoe to the ground surface deviates from the suitable angle, the ground may be dug and desired mowing may not be performed.

Thus, many of the work attachments attachable to the working machine such as a loader (to the arm(s) of the working machine) are strictly required to be checked as to whether they are in contact with a contact object (such as earth and sand, plants, concrete, bedrock) to a suitable (predetermined) degree (at a suitable (predetermined) pressure), but such checking whether the work attachment is in contact with the contact object in an appropriate attitude to an appropriate degree relies on the worker's experience.

Also in cases where an earth auger attached to the distal end of the lift arm(s) of the loader is used to make a hole in the ground or a trencher attached to the distal end of the lift arm(s) of the loader is used to dig a trench, it is required that the depth of the hole or the trench be equal to the target depth: in this regard, making such a hole or trench having an accurate depth also relies on the worker's experience.

Working machines according to preferred embodiments of the present invention are each configured to allow a worker to easily know the state of contact between the work attachment and a contact object.

SUMMARY OF THE INVENTION

In a first aspect, a working machine includes: a machine body: at least one support member supported on the machine body and connectable to a work attachment to do work by making contact with an object to be contacted; at least one hydraulic cylinder extendable and retractable to move the work attachment connected to the at least one support member, the at least one hydraulic cylinder including a rod-side fluid chamber and a bottom-side fluid chamber separated by a piston: a rod-side pressure detector to detect a rod-side hydraulic pressure which is a pressure of hydraulic fluid in communication with the rod-side fluid chamber of the at least one hydraulic cylinder; a bottom-side pressure detector to detect a bottom-side hydraulic pressure which is a pressure of hydraulic fluid in communication with the bottom-side fluid chamber of the at least one hydraulic cylinder; and a controller to calculate a relationship in pressure between the rod-side hydraulic pressure detected by the rod-side pressure detector and the bottom-side hydraulic pressure detected by the bottom-side pressure detector and evaluate, based on the calculated relationship in pressure, a contact state which is a state of contact of the work attachment with the object.

The working machine may further include a memory to store a predetermined contact degree, the predetermined contact degree being a degree to which the work attachment is in contact with the object when the work attachment is in a predetermined contact state. The controller may be configured or programmed to: calculate, based on the calculated relationship in pressure, a current contact degree which is a degree to which the work attachment is currently in contact with the object; compare the current contact degree with the stored predetermined contact degree; and determine whether or not the work attachment is in the predetermined contact state.

The working machine may further include an attitude detector to detect an attitude of the work attachment and/or the at least one support member. The controller may be configured or programmed to: if the controller compares the calculated contact degree with the predetermined contact degree and determines that the work attachment is in the predetermined contact state, recognize, as a reference attitude, the attitude detected by the attitude detector at a point in time at which the controller determined that the work attachment was in the predetermined contact state; and based on a change in the attitude detected by the attitude detector from the reference attitude, measure a degree of work done represented as a change in position of the work attachment relative to the object.

The working machine may further include a display to display the degree of work done measured by the controller.

The controller may be configured or programmed to cause the display to display a guidance indication regarding an operation of the at least one hydraulic cylinder to change the attitude to cause the degree of work done to reach a target degree.

The controller may be configured or programmed to, if the controller determines that the degree of work done has reached a target degree based on a result of detection by the attitude detector, cause the display to display an indication that the degree of work done has reached the target degree.

The controller may be configured or programmed to control extension and retraction of the at least one hydraulic cylinder to control the attitude such that the degree of work done reaches a target degree.

The controller may be configured or programmed to, if the controller determines that the work attachment is not in the predetermined contact state, control extension and retraction of the at least one hydraulic cylinder such that the calculated current contact degree reaches the predetermined contact degree.

The working machine may further include a display. The controller may be configured or programmed to, if the controller determines that the work attachment is not in the predetermined contact state, cause the display to display a guidance indication regarding an operation of the at least one hydraulic cylinder to cause the calculated current contact degree to reach the predetermined contact degree.

The controller may be configured or programmed to, if the controller determines that the work attachment is not in the predetermined contact state, prohibit driving of the work attachment.

The memory may store a plurality of the predetermined contact degrees corresponding to a respective plurality of the work attachments. The controller may be configured or programmed to: select one of the plurality of predetermined contact degrees that corresponds to the work attachment connected to the at least one support member; and compare the selected one of the plurality of predetermined contact degrees with the calculated current contact degree.

The working machine may further include an attitude detector to detect an attitude of the work attachment. The controller may be configured or programmed to, if the controller determines that the work attachment is in the predetermined contact state, determine, as the attitude of the work attachment in the predetermined contact state, the attitude detected by the attitude detector at a point in time at which the controller determined that the work attachment was in the predetermined contact state.

The memory may store a proper attitude of the work attachment in the predetermined contact state. The controller may be configured or programmed to, if the controller determines that the work attachment is in the predetermined contact state and the attitude of the work attachment detected by the attitude detector differs from the proper attitude, control extension and retraction of the at least one hydraulic cylinder such that the attitude of the work attachment reaches the proper attitude.

The working machine may further include a display. The memory may store a proper attitude of the work attachment in the predetermined contact state. The controller may be configured or programmed to, if the controller determines that the work attachment is in the predetermined contact state and the attitude of the work attachment detected by the attitude detector differs from the proper attitude, cause the display to display a guidance indication regarding an operation of the at least one hydraulic cylinder to cause the attitude of the work attachment to reach the proper attitude.

The working machine may further include a display. The memory may store a proper attitude of the work attachment in the predetermined contact state. The controller may be configured or programmed to, if the controller determines that the work attachment is in the predetermined contact state and the attitude of the work attachment detected by the attitude detector is equal to the proper attitude, cause the display to display an indication that the work attachment is in the proper attitude and in the predetermined contact state.

The working machine may further include a manual operator to be operated to cause the at least one hydraulic cylinder to extend or retract. The controller may be configured or programmed to, when the manual operator is operated to cause the at least one hydraulic cylinder to extend or retract, calculate a corrected version of the relationship in pressure using a correction value set according to frictional resistance caused by operation of the manual operator on the piston of the at least one hydraulic cylinder.

The correction value may be changed according to a temperature of hydraulic fluid and/or an ambient temperature.

The correction value may be set to differ between when the at least one hydraulic cylinder is not moving and when the at least one hydraulic cylinder is moving.

The correction value may be set to differ between when the manual operator is operated to cause the at least one hydraulic cylinder to extend and when the manual operator is operated to cause the at least one hydraulic cylinder to retract.

The correction value may be set to differ between when the at least one hydraulic cylinder is extending and when the at least one hydraulic cylinder is retracting.

The controller may be configured or programmed to: when the manual operator is operated to cause the at least one hydraulic cylinder to extend, correct the detected bottom-side hydraulic pressure to reduce the detected bottom-side hydraulic pressure; and when the manual operator is operated to cause the at least one hydraulic cylinder to retract, correct the detected rod-side hydraulic pressure to reduce the detected rod-side hydraulic pressure.

In a second aspect, a working machine includes: a machine body: a support member supported on the machine body and connectable to a work attachment to do work by making contact with an object to be contacted: a first hydraulic cylinder extendable and retractable to move the support member relative to the machine body, the first hydraulic cylinder including a rod-side fluid chamber and a bottom-side fluid chamber separated by a piston: a first rod-side pressure detector to detect a first rod-side hydraulic pressure which is a pressure of hydraulic fluid in communication with the rod-side fluid chamber of the first hydraulic cylinder: a first bottom-side pressure detector to detect a first bottom-side hydraulic pressure which is a pressure of hydraulic fluid in communication with the bottom-side fluid chamber of the first hydraulic cylinder: a second hydraulic cylinder extendable and retractable to move the work attachment connected to the support member relative to the support member, the second hydraulic cylinder including a rod-side fluid chamber and a bottom-side fluid chamber separated by a piston: a second rod-side pressure detector to detect a second rod-side hydraulic pressure which is a pressure of hydraulic fluid in communication with the rod-side fluid chamber of the second hydraulic cylinder: a second bottom-side pressure detector to detect a second bottom-side hydraulic pressure which is a pressure of hydraulic fluid in communication with the bottom-side fluid chamber of the second hydraulic cylinder; and a controller to calculate a relationship in pressure between the detected first rod-side hydraulic pressure and the detected first bottom-side hydraulic pressure and a relationship in pressure between the detected second rod-side hydraulic pressure and the detected second bottom-side hydraulic pressure, and evaluate, based on the calculated relationships in pressure, a contact state which is a state of contact of the work attachment with the object.

The working machine may further include a memory to store a predetermined contact degree, the predetermined contact degree being a degree to which the work attachment is in contact with the object when the work attachment is in a predetermined contact state. The controller may be configured or programmed to: calculate, based on the calculated relationships in pressure, a current contact degree which is a degree to which the work attachment is currently in contact with the object; compare the current contact degree with the stored predetermined contact degree; and determine whether or not the work attachment is in the predetermined contact state.

The working machine may further include an attitude detector to detect an attitude of the work attachment and/or the support member. The controller may be configured or programmed to: if the controller compares the calculated contact degree with the predetermined contact degree and determines that the work attachment is in the predetermined contact state, recognize, as a reference attitude, the attitude detected by the attitude detector at a point in time at which the controller determined that the work attachment was in the predetermined contact state; and based on a change in the attitude detected by the attitude detector from the reference attitude, measure a degree of work done represented as a change in position of the work attachment relative to the object.

The controller may be configured or programmed to, if the controller determines that the work attachment is in the predetermined contact state, evaluate the attitude of the work attachment in the predetermined contact state based on a relationship between (i) a relationship in pressure between the first rod-side hydraulic pressure and the first bottom-side hydraulic pressure detected at a point in time at which the controller determined that the work attachment was in the predetermined contact state, and (ii) a relationship in pressure between the second rod-side hydraulic pressure and the second bottom-side hydraulic pressure detected at a point in time at which the controller determined that the work attachment was in the predetermined contact state.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
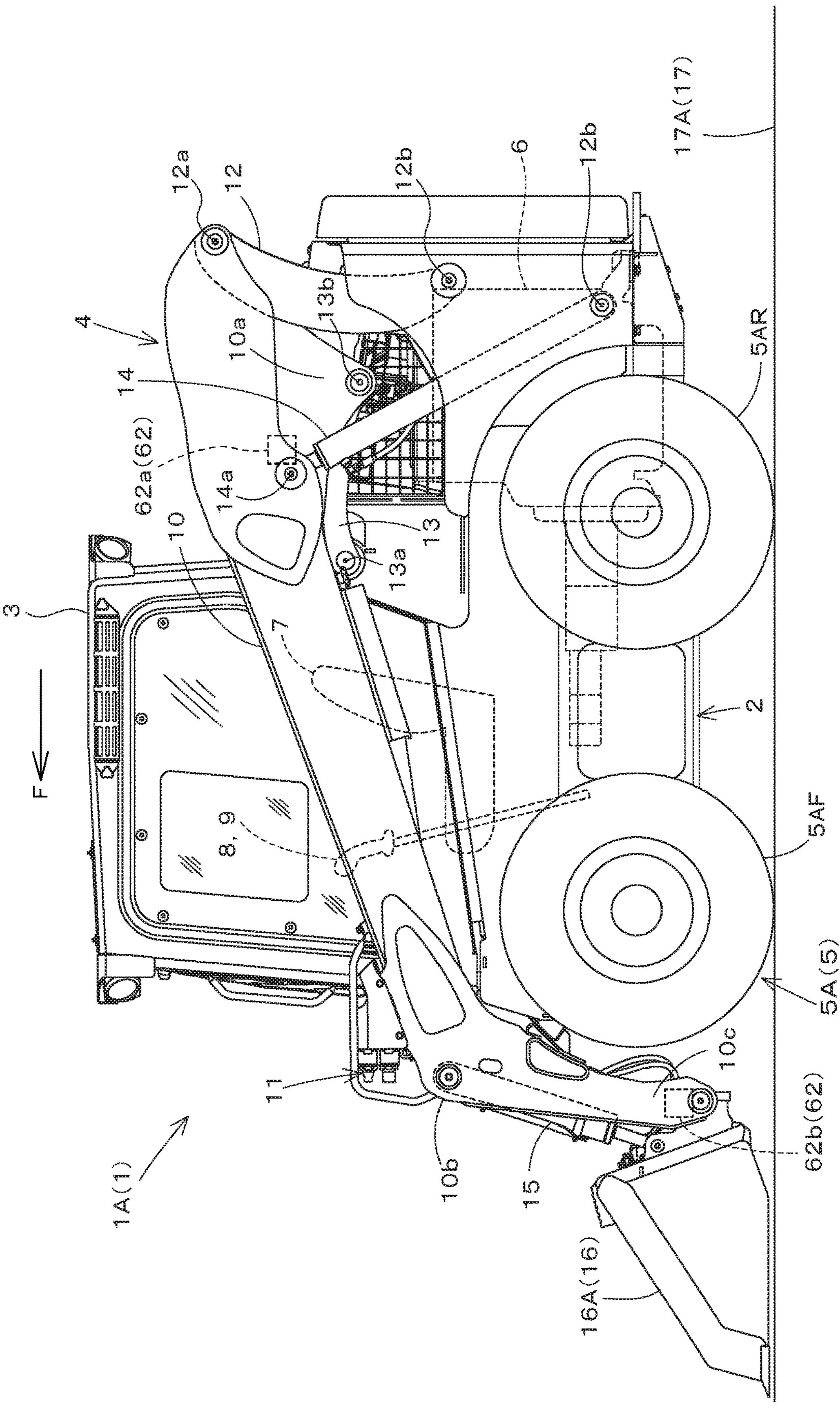
FIG. 1 is a side view of a working machine performing leveling of soil (leveling of ground) with a bucket.

The preferred embodiments will now be described with reference to the accompanying drawings, wherein like reference numerals designate corresponding or identical elements throughout the various drawings. The drawings are to be viewed in an orientation in which the reference numerals are viewed correctly.

Figure 2:
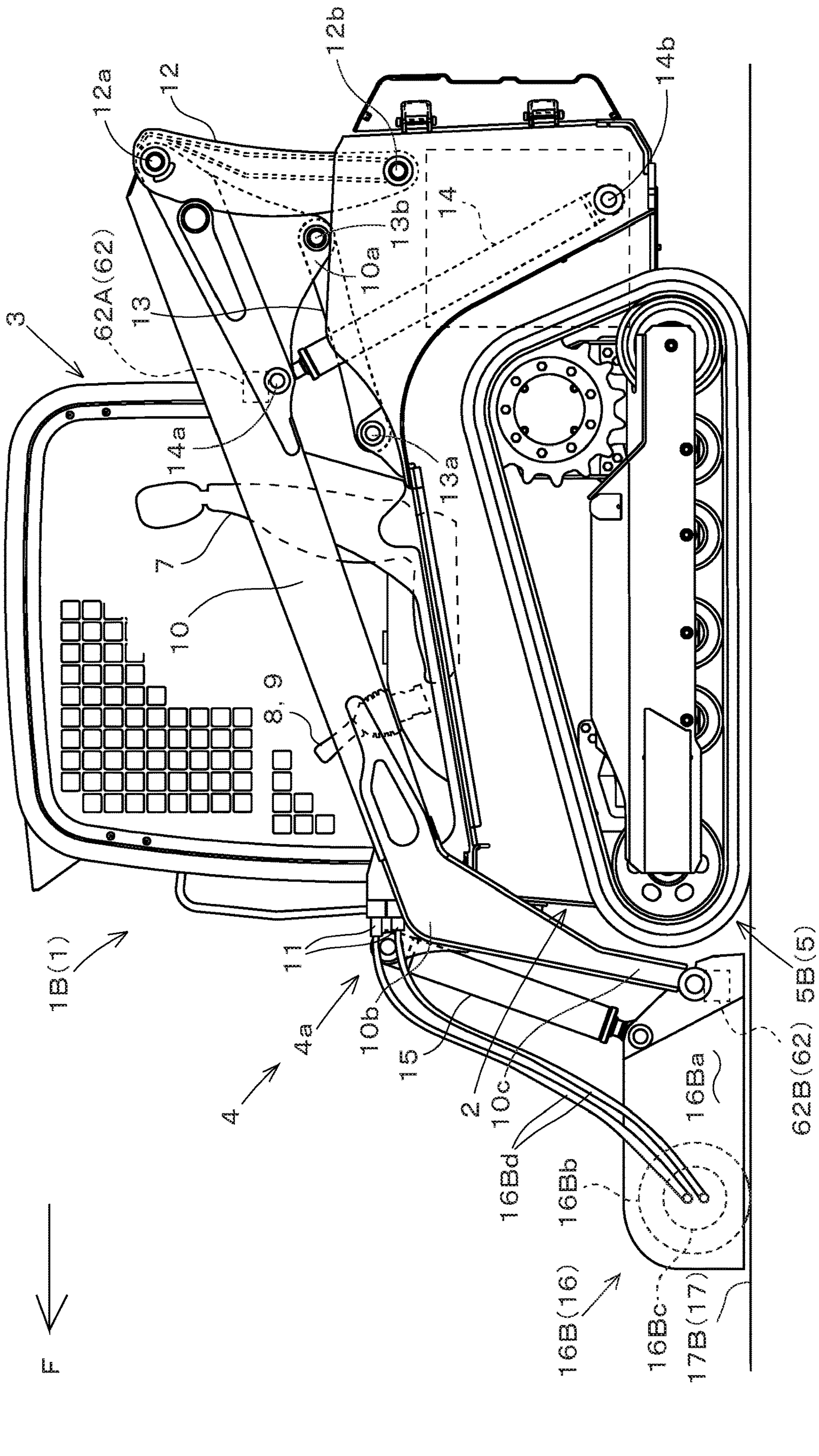
FIG. 2 is a side view of a working machine performing cleaning of a road surface with a sweeper.

The following description discusses an overall configuration of working machines 1 with reference to FIGS. 1 and 2. The working machine 1 includes a machine body 2, a cabin 3, a working device 4 and a traveling device 5. The cabin 3, the working device 4, and the traveling device 5 are provided on the machine body 2. The "forward direction" in the following description refers to the direction indicated by arrow F in FIGS. 1 and 2, and the "rearward direction" in the following description refers to the direction opposite to the direction indicated by arrow F. The "right" in the following description refers to the right of the working machine 1 when the operator (user) of the working machine 1 is facing in the forward direction (direction indicated by arrow F). The "left" in the following description refers to the left of the working machine 1 when the operator (user) of the working machine 1 is facing in the forward direction (direction indicated by arrow F).

The working machine 1 in FIG. 1 is a skid steer loader 1A whose traveling device is a wheeled traveling device 5A including a pair of left and right front wheels 5AF and a pair of left and right rear wheels 5AR. The working machine 1 in FIG. 2 is a compact track loader 1B whose traveling device 5 is a crawler traveling device 5B.

A prime mover 6 is mounted on the portion of the machine body 2 that is located rearward of the cabin 3. The prime mover 6 is an internal combustion engine such as a diesel engine or a gasoline engine. Alternatively, the prime mover 6 may include an internal combustion engine and/or an electric motor, for example. The prime mover 6 drives hydraulic pumps 32L and 32R in a travel hydraulic system 30 of FIG. 5 and hydraulic pumps 41 and 42 in a work hydraulic system 40 of FIGS. 6A and 6B.

An operator's seat 7 is mounted on the machine body 2. The cabin 3 is mounted on the machine body 2 to enclose the operator's seat 7. The cabin 3 is a kind of protector to protect an operator seated on the operator's seat 7, meters and manual operators such as levers and switches arranged in the vicinity of the operator's seat 7, and/or the like. Another protector having such a function, such as a canopy or a rollover protective structure (ROPS), may be mounted on the machine body 2.

Referring to FIGS. 1 and 2, the manual operators to be manually operated by an operator seated on the operator's seat 7 in the cabin 3 include a lever (such as a joystick) 8 (hereinafter referred to as "travel operation lever 8") operable to change the traveling direction and travel speed of the traveling device 5, and a lever (such as a joystick) 9 (hereinafter referred to as "work operation lever 9") operable to swing (move) lift arms 10 (first support members) of the working device 4 up and down (raise and lower the lift arms 10) and/or swing a work attachment 16 attached to the working device 4 up and down (raise and lower the work attachment 16). The travel operation lever 8 and the work operation lever 9 are located on the left and right sides of a front portion of the operator's seat 7.

Figure 5:
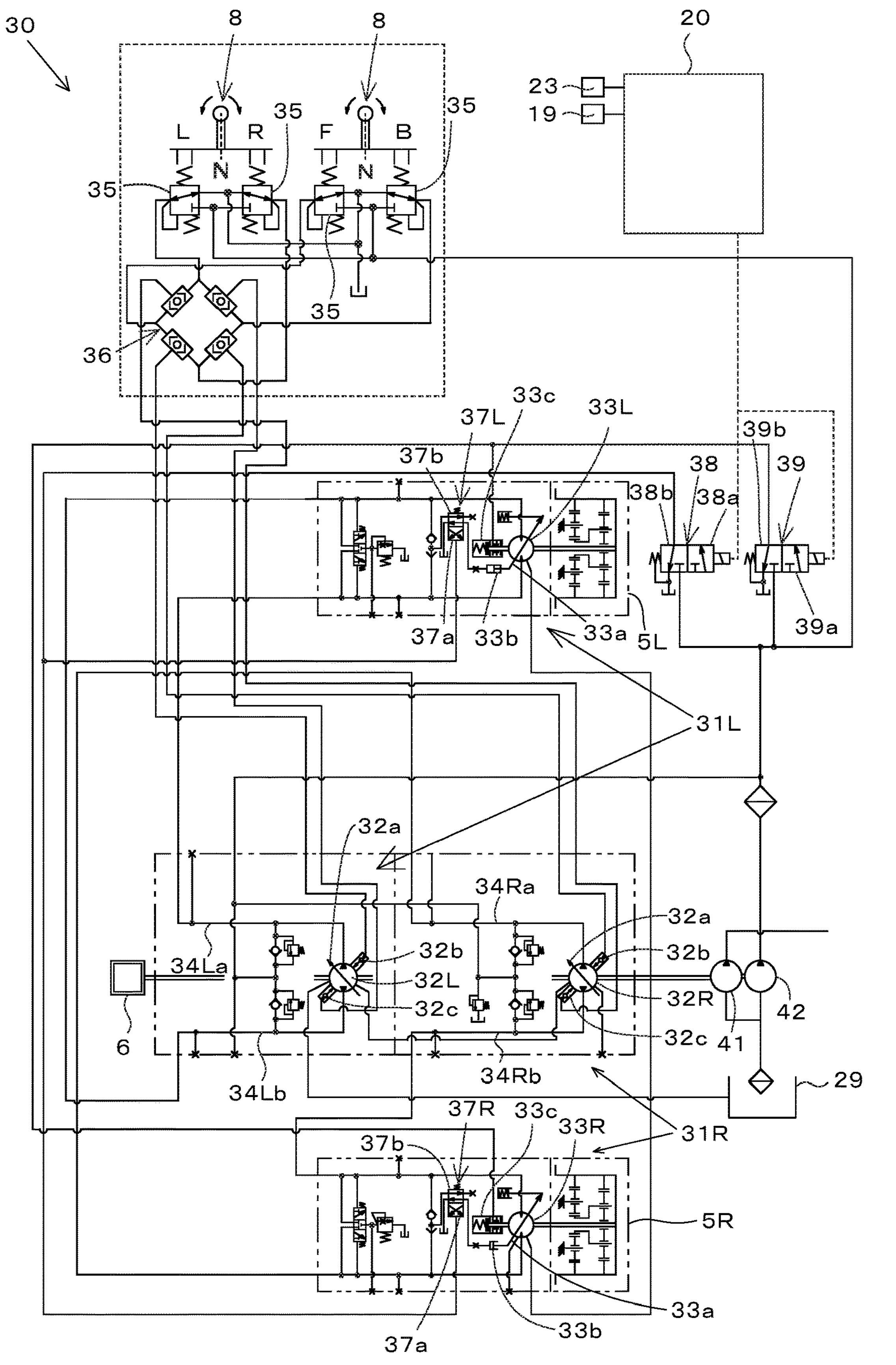
FIG. 5 is a circuit diagram of a travel hydraulic system of a working machine.

The manual operators in the cabin 3 also include a speed change switch 23, an attachment driving switch (AUX switch) 18 and a brake pedal 19. Referring to FIG. 5, the speed change switch 17, operable to change the traveling speed stage of the traveling device 5 between high and low speed stages, is located in the vicinity of the operator's seat 7 (for example, on the travel operation lever 8).

Referring to FIG. 6, the attachment driving switch (AUX switch) 18, operable to control fluid supply to a hydraulic actuator when a work attachment including the hydraulic actuator is attached to the working device 4, is located in the vicinity of the operator's seat 7 (for example, on the work operation lever 9). Referring to FIG. 5, the brake pedal 19 is located at a position at which a foot of an operator seated on the operator's seat 7 is to be placed in the cabin 3.

The working device 4 includes a pair of the left and right lift right arms 10 (support members) attached to the machine body 2 swingably up and down with respect to the machine body 2. The left lift arm 10 of the pair of left and right lift arms 10 is on the left side of the cabin 3. The right lift arm 10 is on the right side of the cabin 3. Each left arm extends lengthwise in the fore-and-aft direction of the working machine 1.

Front portions of the left and right lift arms 10 are connected to each other via a connection member (not illustrated) in front of the cabin 3. Rear portions of the left and right lift arms 10 are connected to each other via a connection member (not illustrated) behind the cabin 3. An assembly of left right and the lift arms 10 and the front and rear connection members (not illustrated) assembled in this way, defining and functioning as a main body 4$a$ of the working device 4, is attached to the machine body 2 swingably up and down with respect to the machine body 2.

The manner in which the left and right lift arms 10 are connected to each other is not limited to using the front and rear connection members as described above. The left and right lift arms 10 may be connected to each other in any manner, provided that the left and right lift arms 10 are swingable together up and down with respect to the machine body 2.

The working device 4 includes a pair of left and right lift links 12 and a pair of left and right control links 13 to support the left and right lift arms 10 at a rear portion of the main body 2. The working device 4 includes a pair of left and right lift arm cylinders 14 as hydraulic actuators to swing the left and right lift arms 10 up and down with respect to the machine body 2.

FIGS. 1 and 2, each of which is a left side view of the working machine 1, illustrate the left lift arm 10, the left lift link 12, the left control link 13, and the left lift arm cylinder 14 which are located leftward of the cabin 3. The right lift arm 10, the right lift link 12, the right control link 13, and the right lift arm cylinder 14 are located rightward of the cabin 3 in a similar manner.

Note that, in FIGS. 1 and 2, the left and right lift arms 10 movable (swingable) up and down with respect to the machine body 2 (the main body 4$a$ of the working device 4 that includes the left and right lift arms 10) are in the lowered state such that the work attachment 16 attached at the distal ends thereof makes contact with the ground. In the following description, the positions, orientations/directions, and the like of the elements of the working device 4 are discussed on the assumption that the left and right lift arms 10 are in such a lowered state.

Each of the lift links 12 extends substantially vertically, is pivotally connected at a top end thereof to a rear end of a corresponding lift arm 10 via a corresponding pivot 12$a$ extending laterally, and is pivotally connected at a bottom end thereof to an upper rear portion of the machine body 2 via a corresponding pivot 12$b$ extending laterally. At a position forward of the lift link 12, a head of a piston rod of a corresponding lift arm cylinder 14 is pivotally connected to the lift arm 10 via a corresponding pivot 14$a$ extending laterally. The bottom end (cylinder bottom) of the lift arm cylinder 14 is pivotally connected to a lower rear portion of the main body 2 via a corresponding pivot 14$b$ extending laterally.

Each of the lift arm cylinders 14 includes a piston. The piston is moved by hydraulic pressure to extend or retract the piston rod. In each of FIGS. 1 and 2, the lift arm cylinders 14 have the piston rod in their fully or almost fully retracted position. In other words, the lift arms 10 are lowered when the piston rods of the lift arm cylinders 14 are retracted.

Each of the lift arms 10 is provided with a downwardly projecting bracket 10$a$ that is located between, in the fore-and-aft direction, the rear end (pivot 12$a$) of the lift arm 10 and the portion (pivot 14$a$) of the lift arm 10 that pivotally supports the piston rod of a corresponding lift arm cylinder 14. Each of the control links 13 extends substantially in the fore-and-aft direction, is pivotally connected at a front end thereof to an upper rear portion of the main body 2 via a corresponding pivot 13$a$ extending laterally, and is pivotally connected at a rear end thereof to a corresponding bracket

10*a* of the lift arm 10 via a corresponding pivot 13*b* extending laterally, when the lift arms 10 are in the lowered position as illustrated in FIGS. 1 and 2.

The lift arms 10 each include a bent portion 10*b* located forward of the cabin 3, and extend forward from their rear ends pivotally connected to the lift links 12 to the bent portions 10*b*. The lift arms 10 each include a distal end portion 10*c* extending downward from its corresponding bent portion 10*b*. The distal end portions 10*c* of the left and right lift arms 10 are configured to have the work attachment 16 pivotally attached thereto.

The working device 4 includes a pair of left and right attachment cylinders 15. The left and right attachment cylinders 15 are hydraulic actuators to support the work attachment 16 attached to the distal end portions 10*c* of the left and right lift arms 10 and swing the work attachment 16 up and down with respect to the lift arms 10 via pivots 16*a* each extending laterally.

Each of the attachment cylinders 15 is pivotally connected to the bent portion 10*b* of a corresponding lift arm 10 at a cylinder bottom thereof (an upper end thereof). Each of the pair of left and right attachment cylinders 15 is pivotally connected at the distal end of the piston rod thereof (at a lower end thereof) to the work attachment 16 attached to the distal end portions 10*c* of the lift arms 10.

The attachment 16 is pivotally connected at a rear portion thereof to the distal end portions 10*c* of the left and right lift arms 10 and to the distal ends of the piston rods of the attachment cylinders 15 in this way, so that the work attachment 16 is attached to the working device 4 (to the main body 4*a* of the working device 4) swingably up and down with respect to the working device 4 (lift arms 10).

The working device 4 (lift arms 10 (support members) is configured to have various kinds of work attachments 16 attached thereto in this way. Examples of the various kinds of work attachments 16 include backets, dozer blades, brushcutters, tree-pullers, hydraulic crushers, hydraulic breakers, angle brooms, earth augers, pallet forks, sweepers, mowers, snowblowers and so on.

Figure 3:
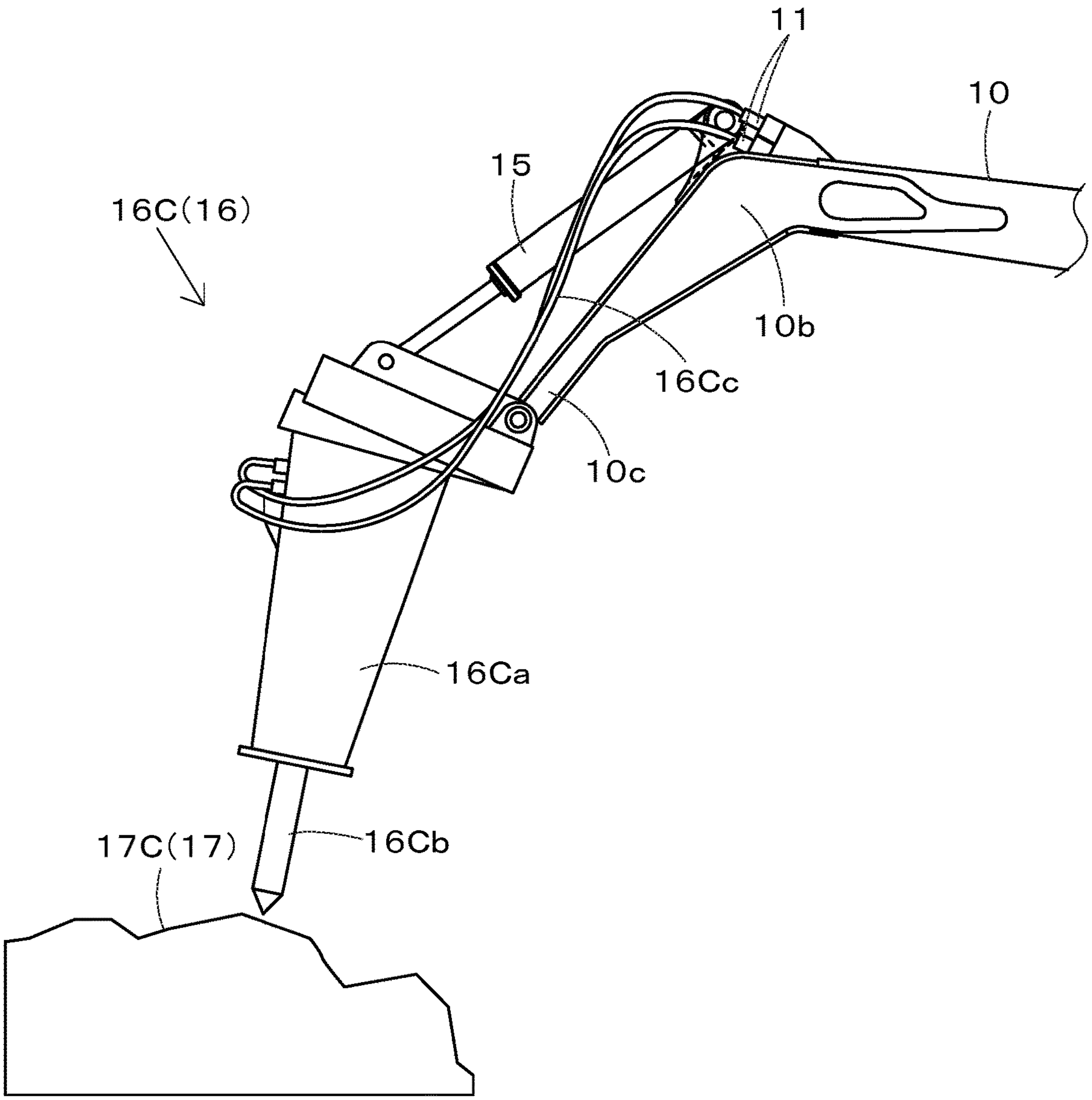
FIG. 3 is a partial side view of a working machine performing crushing of a to-be-crushed object with a hydraulic breaker.
Figure 4:
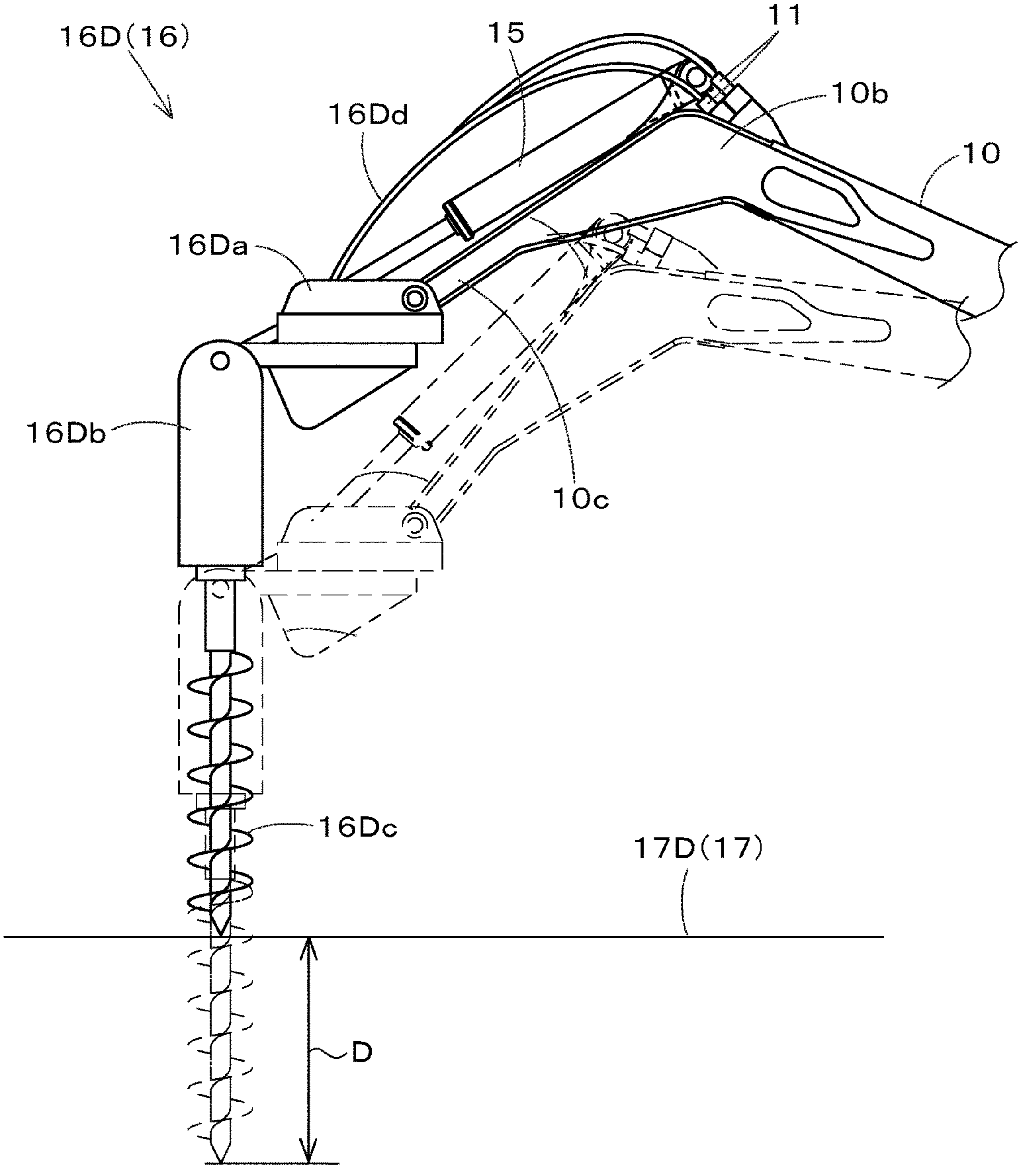
FIG. 4 is a partial side view of a working machine digging into soil (making a hole in soil) with an earth auger.

FIGS. 1 to 4 illustrate some types of work attachments 16 each attached to the working device 4 of the working machine 1, as examples of the work attachment 16 attached to the working device 4. The work attachment 16 illustrated in FIG. 1 is a bucket 16A. The work attachment 16 illustrated in FIG. 2 is a sweeper 16B. The work attachment 16 illustrated in FIG. 3 is a hydraulic breaker 16C. The work attachment 16 illustrated in FIG. 4 is an earth auger 16D.

Note that it is possible to selectively attach various types of work attachments 16 to the working device 4 of the working machine 1 (to the distal end portions 10*c* of the lift arms 10), and also possible to selectively attach work attachments 16 of the same type having different sizes and/or different specifications to the working device 4 of the working machine 1 (to the distal end portions 10*c* of the lift arms 10).

Some types of work attachment 16 such as the sweeper 16B in FIG. 2, the hydraulic breaker 16C in FIG. 3, and the earth auger 16D in FIG. 4 include its own hydraulic actuator(s) such as hydraulic motor(s). For the purpose of supplying hydraulic fluid from the working machine 1 to the hydraulic actuator(s) of such a work attachment 16, one of the pair of left and right lift arms 10 (in the present preferred embodiment, the left lift arm 10) has, on the bent portion 10*b* thereof, a pair of AUX ports (hydraulic fluid ports) 11.

The AUX ports 11 are couplers and project from the corresponding lift arm 10. The AUX ports (couplers) 11 can have connected thereto fluid pipes such as hoses, which are connectable at their ends to hydraulic actuator(s) (AUX actuator(s)) of the attachment 16 attached to the front ends of the left and right lift arms 10.

Note that some types of work attachments 16 such as the bucket 16A in FIG. 1 does not include its own hydraulic actuators, and it is not necessary to supply hydraulic fluid from the working machine 1 via the AUX ports 11. When such a type of work attachment 16 is attached to the working device 4, the AUX ports 11 are closed.

The following description discusses up-and-down movement (raising and lowering movements) of the lift arms 10 (the main body 4*a* of the working device 4). Upon upward extension of the piston rods of the left and right lift arm cylinders 14 from the state in FIGS. 1 and 2 in which the left and right lift arms 10 are in the lowered position, the piston rods raise the lift arms 10, so that, eventually, the lift arms 10 (the main body 4*a* of the working device 4) swing such that the angle between the lift arms 10 and the lift arms 12 increases. Accordingly, the control links 13 swing diagonally forward and upward and front portions (the bent portions 10*b* and the distal end portions 10*c*) of the lift arms 10 move upward.

When the ends of the control links 13 pivotally connected to the brackets 10*a* of the lift arms 10 are moved by swinging the control links 13 diagonally forward and upward and reach their highest position in the range of the up-and-down movement, the left and right lift arms 10 (the main body 4*a* of the working device 4) can no longer be raised upward. In other words, when the ends of the control links 13 pivotally connected to the lift arms 10 reach this position, the left and right lift arms 10 (the main body 4*a* of the working device 4) reach their fully raised position (i.e., the arm height reaches the maximum), and the lift arm cylinders 14 are in their fully extended position.

The following description discusses the swinging of the work attachment 16 attached to the working device 4 relative to the lift arms 10. As the piston rods of the left and right attachment cylinders 15 located between the work attachment 16 and the left and right lift arms 10 extend, the work attachment 16 swings diagonally rearward and downward with respect to the lift arms 10 (in the anticlockwise direction in a left side view of the working machine 1 as illustrated in FIGS. 1 and 2). As the piston rods of the left and right attachment cylinders 15 retract, the work attachment 16 swings diagonally forward and upward with respect to the lift arms 10 (in the clockwise direction in a left side view of the working machine 1 as illustrated in FIGS. 1 and 2.)

Thus, the degree of extension of the piston rods of the attachment cylinders 15 determines the angle of the work attachment 16 to the lift arm 10. More specifically, the degree of extension of the piston rods of the lift arm cylinders 14 (such a degree may be hereinafter referred to as "the degree of extension of the lift arm cylinders 14" for short) and the degree of extension of the piston rods of the attachment cylinders 15 (such a degree may be hereinafter referred to as "the degree of extension of the attachment cylinders 15" for short) determine the attitude (upward or downward tilting in the fore-and-aft direction) and the position of the work attachment 16 relative to the machine body 2.

Referring to FIGS. 1, 2, 6A, and 6B, the working machine 1 includes an attitude detector 62 to detect the attitude (position relative to the machine body 2) of the work attachment 16 and the lift arms (support members) 10. For the foregoing reasons, the attitude detector 62 may be a combination of a detector to detect the degree of extension of the lift arm cylinders 14 and a detector to detect the degree of extension of the attachment cylinders 15.

In the present embodiment, the attitude detector 62 is a combination of an angle detector (angle sensor) 62*a* to detect the angle of rotation of the lift arm(s) 10 (main body 4*a* of the working device 4) relative to the machine body 2 and an angle detector (angle sensor) 62*b* to detect the angle of rotation of the work attachment 16 relative to the lift arms 10.

Note that, in the working machine 1 illustrated in FIGS. 1 and 2, the angle detector 62*a* is provided in the vicinity of the pivots 14*a* via which the top ends (heads of the piston rods) of the lift arm cylinders 14 are pivoted on the lift arms 10, and detects changes in the angle between the lift arm cylinders 14 and the lift arms 10 which pivot about the pivots 14*a*.

The angle detector 62*a* to detect the angle of the lift arms 10 (the main body 4*a* of the working device 4) relative to the machine body 2 may be positioned to additionally or alternatively detect the angle between the lift link(s) 12 and the lift arm(s) 10 which pivot about the pivot(s) 12*a* or the angle between the machine body 2 and the control link(s) 13 which pivot about the pivot(s) 13*a*.

The angle detector 62*b* may be provided in the vicinity of the pivot(s) 16*a* to detect the angle between the distal end portion(s) 10*c* of the lift arm(s) 10 and the work attachment 16.

The attitude detector 62 may be an angle detector to detect the angle between the lift arm(s) 10 and the machine body 2 and/or the angle between the lift arm(s) 10 and the work attachment 16. Alternatively or additionally, the attitude detector 62 may be a cylinder length detector to detect the degree of extension of the piston rod(s) of the lift arm cylinder(s) 14 and/or the degree of extension of the piston rod(s) of the attachment cylinder(s) 15.

Alternatively, the attitude detector 62 may be a combination of detector(s) for the degree of extension of the piston rods of cylinders as described above and detector(s) to detect the angle of rotation of the lift arms 10 and/or the like as described above.

Figure 6A:
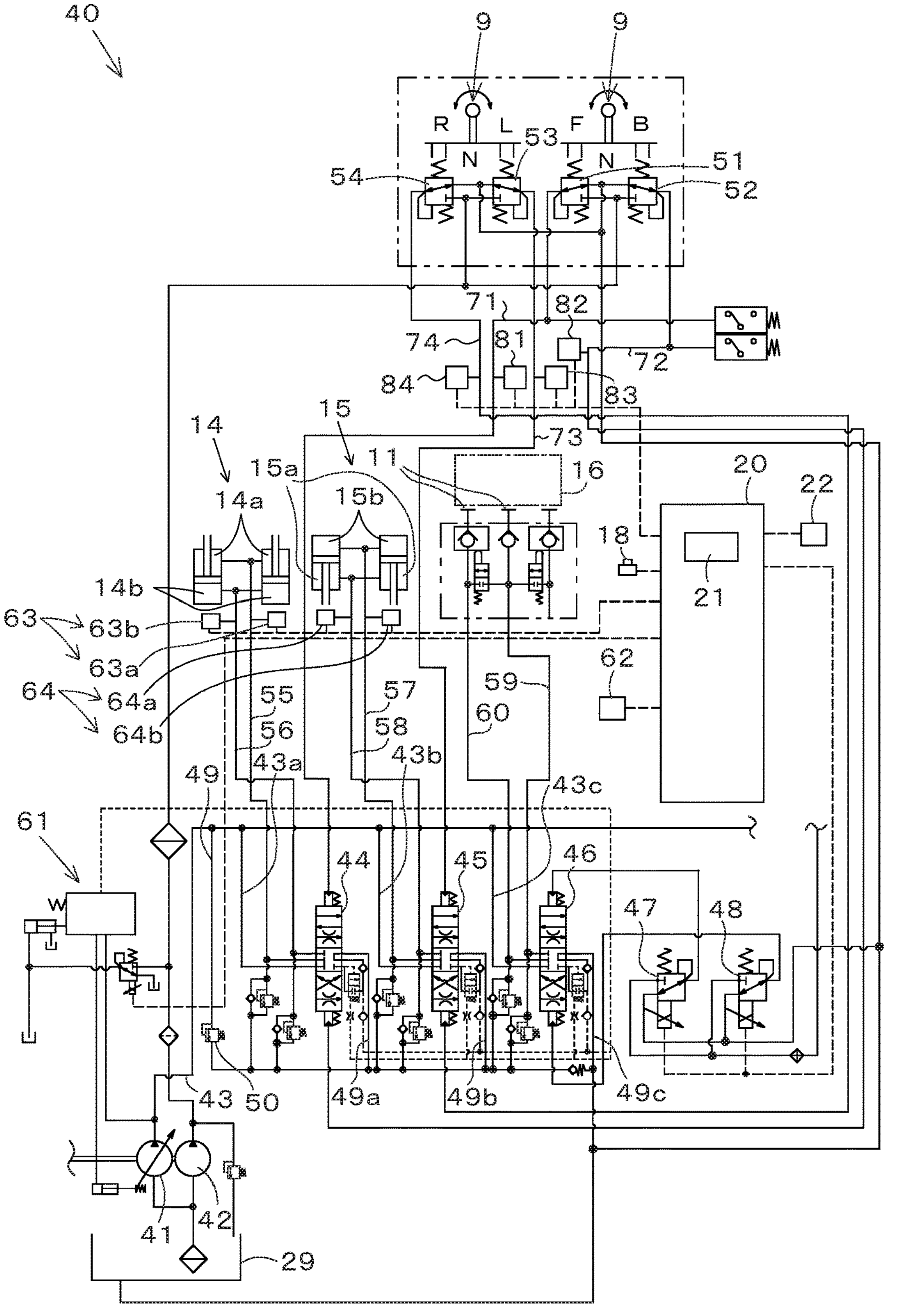
FIG. 6A is a circuit diagram of a work hydraulic system of a working machine.
Figure 6B:
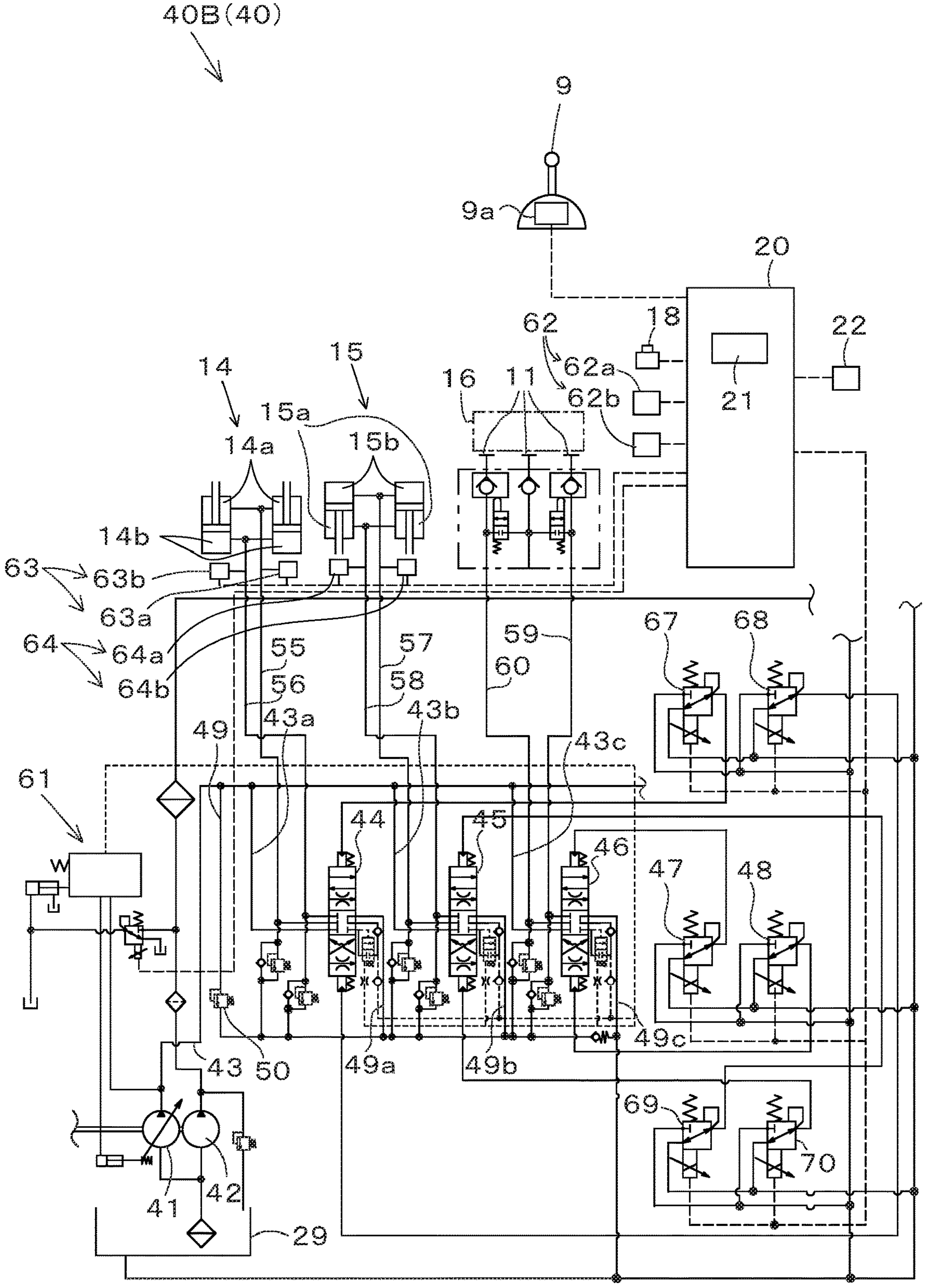
FIG. 6B is a circuit diagram of an alternative work hydraulic system of a working machine.

The working machine 1 includes a controller 20 and a display 22 (see FIGS. 6A and 6B). The controller 20 is capable of, based on the result of detection by the attitude detector 62, controlling the lift arm cylinder(s) 14 and/or the attachment cylinder(s) 15 such that the attitude of the work attachment 16 reaches a desired attitude and/or causing the display 22 to display a guidance indication regarding control of the lift arm cylinder(s) 14 and/or the attachment cylinder(s) 15 such that the attitude of the work attachment 16 reaches a desired attitude. These will be described later in detail.

The working machine 1 includes a travel hydraulic system 30 illustrated in FIG. 5 and a work hydraulic system 40 illustrated in FIGS. 6A and 6B. The following discusses these systems.

The following description first discusses the travel hydraulic system 30 to control drive of the traveling device 5 with reference to the hydraulic circuit diagram in FIG. 5. It is assumed here that the traveling device 5 (including the traveling devices 5A and 5B and the like) includes a left traveling device 5L on the left portion of the machine body 2 and a right traveling device 5R on the right portion of the machine body 2, which can be driven independently of each other.

The travel hydraulic system 30 includes hydrostatic stepless transmissions (HSTs) 31L and 31R provided on the machine body 2. The HST 31L includes a hydraulic pump 32L, a hydraulic motor 33L, and a pair of fluid passages 34La and 34Lb between the hydraulic pump 32L and the hydraulic motor 33L. The HST 31R includes a hydraulic pump 32R, a hydraulic motor 33R, and a pair of fluid passages 34Ra and 34Rb between the hydraulic pump 32R and the hydraulic motor 33R.

The hydraulic pumps 32L and 32R are drivingly connected to an output shaft 6*a* of the prime mover 6 to be rotated together synchronously with the output rotation of the prime mover 6. The hydraulic motor 33L is drivingly connected to the left traveling device 5L. The hydraulic motor 33R is drivingly connected to the right traveling device 5R.

The hydraulic pumps 32L and 32R are variable displacement hydraulic pumps including respective movable swash plates 32*a*. Each of the hydraulic pumps 32L and 32R includes a pair of pressure receivers 32*b* and 32*c*. The tilt direction and angle of the movable swash plate 32*a* is controlled by applying pilot fluid pressure to the pressure receivers 32*b* and 32*c*.

Hydraulic pumps 41 and 42 are drivingly connected to the output shaft 6*a* of the prime mover 6. The hydraulic pump 42 is driven by the prime mover 6 to suck fluid from a reservoir tank 29 and deliver the fluid. A portion of fluid delivered by the hydraulic pump 42 is supplied to the HSTs 31L and 31R.

Another portion of the fluid delivered from the hydraulic pump 42 may flow through pump control valves 35 operably connected to the travel operation lever 8 and through shuttle valves 36 to be applied as pilot pressure fluid to the pressure receivers 32*b* and 32*c* of the hydraulic pumps 32L and 32R to control the movable swash plates 32*a*.

When the travel operation lever 8 is in a neutral position (N), the movable swash plates 32*a* of the hydraulic pumps 32L and 32R are in their neutral position and therefore neither the hydraulic pump 32L nor the hydraulic pump 32R delivers fluid, rotating neither the hydraulic motor 33L nor the hydraulic motor 33R. Therefore, the left and right traveling devices 5L and 5R are in their stopped state and therefore the working machine 1 (the machine body 2) is in its stopped state.

The travel operation lever 8 can be pivoted from the neutral position (N) in all directions including forward (F), rearward (B), leftward (L), and rightward (R) directions. The direction in which the travel operation lever 8 is pivoted from the neutral position (N) and the angle at which the travel operation lever 8 is pivoted (the degree of pivoting of the travel operation lever 8) determine the direction in which the movable swash plates 32*a* of the hydraulic pumps 32L and 32R are titled and the angle at which the movable swash plates 32*a* are tilted, respectively. This stops or drives the hydraulic motors 33L and 33R (left traveling device 5L and the right traveling device 5R) and determines the direction of driving/rotation and the speed of driving/rotation of the hydraulic motors 33L and 33R (left traveling device 5L and the right traveling device 5R). Thus, the direction of travel (turn) and travel speed of the working machine 1 (machine body 2) are controlled according to how the travel operation lever 8 is operated (the direction in which and the degree to which the travel operation lever 8 is pivoted).

The hydraulic motors 33L and 33R are variable displacement hydraulic motors including respective movable swash plates 33*a*. Each of the movable swash plates 33*a* is shiftable between a tilt position for high speed travel (hereinafter referred to as "high-speed tilt position") (a small angled position, or a position for small displacement) and a tilt position for low speed travel (hereinafter referred to as "low-speed tilt position") (a large angled position, or a position for large displacement).

Each of the hydraulic motors 33L and 33R includes a swash plate control actuator 33*b* operably connected to a corresponding movable swash plate 33*a*. The swash plate control actuator 33*b* of the hydraulic motor 33L is fluidly connected to a switching valve 37L. The swash plate control actuator 33*b* of the hydraulic motor 33R is fluidly connected to a switching valve 37R.

Each of the switching valves 37L and 37R is shiftable between a fluid supply position 37*a* to allow fluid to be supplied to a corresponding swash plate control actuator 33*b* and a fluid discharge position 37*b* to allow fluid to be discharged from the corresponding swash plate control actuator 33*b*. The switching of each of the switching valves 37L and 37R between two positions switches the position of a corresponding movable swash plate 33*a* between two positions.

Each of the switching valves 37L and 37R is in the fluid supply position 37*a* when receiving the pilot fluid pressure, and returns to the fluid discharge position 37*b* when the pilot fluid pressure is removed. The fluid delivered by the hydraulic pump 42 can be supplied as pilot pressure fluid to the switching valves 37L and 37R via a speed-shift solenoid switching valve 38.

The speed-shift solenoid switching valve 38 is shiftable between two positions: an open position 38*a*; and a closed position 38*b*, and is biased to the closed position 38*b*. The speed-shift solenoid switching valve 38, when in the closed position 38*b*, isolates the fluid delivered by the hydraulic pump 42 from the pressure receivers of the switching valves 37L and 37R, bringing the switching valves 37L and 37R into their fluid discharge position 37*b*.

The travel hydraulic system 30 includes a controller 20 to positionally control the speed-shift solenoid switching valve 38 and a brake solenoid switching valve 39 (which is described later). The controller 20 includes, for example, electric/electronic circuit(s) including a central processing unit (CPU), a microprocessor unit (MPU), a memory, and/or the like.

In the present preferred embodiment, the controller 20 is used to control the travel hydraulic system 30 of FIG. 5 and the work hydraulic system 40 of FIGS. 6A and 6B. Note, however, that the systems may be controlled by their respective corresponding controllers and the controllers may communicate with each other.

The speed-shift solenoid switching valve 38 is electrically connected to the controller 20. When the speed-shift solenoid switching valve 38 receives a control signal from the controller 20, a solenoid of the speed-shift solenoid switching valve 38 is energized, so that the speed-shift solenoid switching valve 38 is shifted to the open position 38*a*, allowing the fluid delivered by the hydraulic pump 42 to flow therefrom to the switching valves 37L and 37R as pilot pressure fluid. This brings the switching valves 37L and 37R into their fluid supply position 37*a*.

The speed change switch 23 is electrically connected to the controller 20. The speed change switch 23 is shiftable between a high-speed position and a low-speed position. When the speed change switch 23 is in the high-speed position, the controller 20 places the speed-shift solenoid switching valve 38 in the closed position 38*b*, so that the switching valves 37L and 37R are placed in the fluid supply position 37*b*, the movable swash plates 33*a* of the hydraulic motors 33L and 33R are placed in the high-speed tilt position, and the hydraulic motors 33L and 33R rotate in the high-speed stage.

When the speed change switch 23 is in the low-speed position, the controller 20 places the speed-shift solenoid switching valve 38 in the open position 38*a*, so that the switching valves 37L and 37R are placed in the fluid supply position 37*a*, the movable swash plates 33*a* of the hydraulic motors 33L and 33R are placed in the low-speed tilt positions, and the hydraulic motors 33L and 33R rotate in the low-speed stage.

Each of the hydraulic motors 33L and 33R includes a brake actuator 33*c* defining and functioning as a hydraulic actuator. The brake actuator 33*c*, when supplied with fluid, brakes a corresponding hydraulic motor 33R or 33L. The fluid delivered from the hydraulic pump 42 can be supplied to the brake actuators 33*c* of the hydraulic motors 33L and 33R via the brake solenoid switching valve 39.

The brake solenoid switching valve 39 is shiftable between two positions: an open position 39*a*; and a closed position 39*b*, and is biased to the closed position 39*b*. The brake solenoid switching valve 39, when in the closed position 39*b*, isolates the fluid delivered by the hydraulic pump 42 from the brake actuators 33*c* of the hydraulic motors 33L and 33R.

The brake solenoid switching valve 39 is electrically connected to the controller 20. When the brake solenoid switching valve 39 receives a control signal from the controller 20, a solenoid of the brake solenoid switching valve 39 is energized, so that the brake solenoid switching valve 39 is shifted to the open position 39*a*, allowing the fluid delivered from the hydraulic pump 42 to flow therefrom to the brake actuators 33*c*. This brakes the hydraulic motors 33L and 33R.

The brake pedal 19 is electrically connected to the controller 20. When the brake pedal 19 is not depressed, the controller 20 maintains the brake solenoid switching valve 39 in the closed position 39*b*, and therefore the hydraulic motors 33L and 33R are not braked. When the brake pedal 19 is depressed to a brake position, the controller 20 places the brake solenoid switching valve 39 in in the open position 39*a*, and the hydraulic motors 33L and 33R are braked.

FIG. 6A illustrates a work hydraulic system 40A which is a first embodiment of the work hydraulic system 40, and FIG. 6B illustrates a work hydraulic system 40B which is a second embodiment of the work hydraulic system 40. The following description discusses a configuration of the work hydraulic system 40 with reference to the hydraulic circuit diagrams in FIGS. 6A and 6B, based on the assumption that the configuration of the work hydraulic system 40 is the same between the work hydraulic system 40A and the work hydraulic system 40B.

The work hydraulic system 40 includes the hydraulic pumps 41 and 42. The hydraulic pumps 41 and 42 are driven together by power from the prime mover 6 to suck fluid from the common reservoir tank 29 and deliver fluid from delivery ports thereof.

The hydraulic pump 41 delivers hydraulic fluid to the hydraulic actuators (i.e., a pair of left and right lift arm cylinders 14 and a pair of left and right attachment cylinders 15) of the working device 4 of the working machine 1 and the hydraulic actuator of the attachment 16 (such as a hydraulic motor 16Bc of a sweeper 16B (see FIG. 2) to drive a rotary brush 16Bb) attached to the working device 4.

The machine body 2 is provided with a lift arm control valve 44 to control a flow of hydraulic fluid supplied to the left and right lift arm cylinders 14, an attachment control valve 45 to control a flow of hydraulic fluid supplied to the left and right attachment cylinder(s) 15, and an AUX control valve 46 to control a flow of hydraulic fluid supplied to the AUX ports 11.

A delivery fluid passage 43 extends from a delivery port of the hydraulic pump 41. Supply fluid passages 43*a*, 43*b* and 43*c*, which are parallel to each other and branch from the delivery fluid passage 43, are connected to pump ports of the lift arm control valve 44, the attachment control valve 45, and the AUX control valve 46, respectively.

The flow rate of hydraulic fluid in the delivery fluid passage 43 is adjusted by a flow adjusting valve 50 in a bleed-off fluid passage 49 branching from the delivery fluid passage 43 on the upstream side of the supply fluid passages 32*a*, 43*b* and 43*c* and extending to the reservoir tank 29. Drain fluid passages 49*a*, 49*b* and 49*c* extending from tank ports of the lift arm control valve 44, the attachment control valve 45 and the AUX control valve 46 are connected to the bleed-off fluid passage 49 on the downstream side of the flow adjusting valve 50.

The hydraulic pump 41 is a variable displacement hydraulic pump capable of changing the flow rate of fluid delivered therefrom. The work hydraulic system 40 includes a load sensing (LS) system 61 defining and functioning as a pump controller to control the flow rate of fluid delivered from the hydraulic pump 41 according to the type of work done by the working machine 1. Specifically, the LS system 61 has a predetermined load sensing (LS) differential pressure and controls the flow rate of fluid delivered from the hydraulic pump 41 so that the pressure of fluid delivered from the hydraulic pump 41 is higher than the maximum of the load pressure(s) of the working hydraulic actuator(s) by the LS differential pressure.

Each of the lift arm cylinders 14 is a double-acting hydraulic cylinder whose inner space is divided by a piston into a rod-side (upper) fluid chamber 14*a* and a bottom-side (lower) fluid chamber 14*b*. A pair of fluid supply/discharge passages 55 and 56 extend from the lift arm control valve 44. The fluid supply/discharge passage 55 is in communication with the rod-side fluid chambers 14*a* of the left and right lift arm cylinders 14. The fluid supply/discharge passage 56 is in communication with the bottom-side fluid chambers 14*b* of the left and right lift arm cylinders 14.

The work hydraulic system 40 includes a lift arm cylinder fluid pressure detector 63. The lift arm cylinder fluid pressure detector 63 includes a rod-side pressure detector 63*a* to detect the pressure of hydraulic fluid in the rod-side fluid chambers 14*a* of the lift arm cylinders 14, and a bottom-side pressure detector 63*b* to detect the pressure of hydraulic fluid in the bottom-side fluid chambers 14*b* of the lift arm cylinders 14.

The rod-side pressure detector 63*a* and the bottom-side pressure detector 63*b* of the lift arm cylinder fluid pressure detector 63 are electrically connected to input interface(s) of the controller 20, and the controller 20 receives (i) a detection signal indicative of a rod-side hydraulic pressure P1r which is the pressure of hydraulic fluid in the rod-side fluid chambers 14*a* of the lift arm cylinders 14 detected by the rod-side pressure detector 63*a* and (ii) a detection signal indicative of a bottom-side hydraulic pressure P1b which is the pressure of hydraulic fluid in the bottom-side fluid chambers 14*b* of the lift arm cylinders 14 detected by the bottom-side pressure detector 63*b*.

The controller 20 is capable of calculating a value indicating the relationship (relationship in pressure) between the rod-side hydraulic pressure Pla and the bottom-side hydraulic pressure P1b based on the detection signals received from the lift arm cylinder fluid pressure detector 63 and, based on the calculated relationship in pressure, evaluating the state of contact between the work attachment 16 attached to the working device 4 and a contact object (an object to be contacted) 17 such as soil.

Note that, since the pressure of hydraulic fluid is constant throughout the range from the port of the lift arm control valve 44 connected to the fluid supply/discharge passage 55 through the fluid supply/discharge passage 55 to the rod-side fluid chambers 14*a* of the lift arm cylinders 14, the rod-side pressure detector 63*a* is capable of detecting the pressure of hydraulic fluid in the rod-side fluid chambers 14*a* by detecting hydraulic pressure at a position within the above range. Furthermore, since the pressure of hydraulic fluid is constant throughout the range from the port of the lift arm control valve 44 connected to the fluid supply/discharge passage 56 through the fluid supply/discharge passage 56 to the bottom-side fluid chambers 14*b* of the lift arm cylinders 14, the bottom-side pressure detector 63*b* is capable of detecting the pressure of hydraulic fluid in the bottom-side fluid chambers 14*b* by detecting hydraulic pressure at a position within the above range.

Each of the attachment cylinders 15 is a double-acting hydraulic cylinder whose inner space is separated by a piston into a rod-side (lower) fluid chamber 15*a* and a bottom-side (upper) fluid chamber 15*b*. A pair of fluid supply/discharge passages 57 and 58 extend from the attachment control valve 45. The fluid supply/discharge passage 57 is in communication with the bottom-side fluid chambers 15*b* of the left and right attachment cylinders 15. The fluid supply/discharge passage 58 is in communication with the rod-side fluid chambers 15*a* of the left and right attachment cylinders 15.

The work hydraulic system 40 includes an attachment cylinder fluid pressure detector 64. The attachment cylinder fluid pressure detector 64 includes a rod-side pressure detector 64*a* to detect the pressure of hydraulic fluid in the rod-side fluid chambers 15*a* of the attachment cylinders 15, and a bottom-side pressure detector 64*b* to detect the pressure of hydraulic fluid in the bottom-side fluid chambers 15*b* of the attachment cylinders 15.

The rod-side pressure detector 64*a* and the bottom-side pressure detector 64*b* of the attachment cylinder fluid pressure detector 64 are electrically connected to input interface(s) of the controller 20, and the controller 20 receives (i) a detection signal indicative of a rod-side hydraulic pressure P2r which is the pressure of hydraulic fluid in the rod-side fluid chambers 15*a* of the attachment cylinders 15 detected by the rod-side pressure detector 64*a* and (ii) a detection signal indicative of a bottom-side hydraulic pressure P2b which is the pressure of hydraulic fluid in the bottom-side fluid chambers 15*b* of the attachment cylinders detected by the bottom-side pressure detector 64*b*.

The controller 20 is capable of calculating a value indicating the relationship (relationship in pressure) between the rod-side hydraulic pressure P2r and the bottom-side hydraulic pressure P2b based on the detection signals received from the attachment cylinder fluid pressure detector 64 and, based on the calculated relationship in pressure, determining the state of contact between the work attachment 16 attached to the working device 4 and a contact object 17 such as soil.

Note that, since the pressure of hydraulic fluid is constant throughout the range from the port of the attachment control valve 45 connected to the fluid supply/discharge passage 58 through the fluid supply/discharge passage 58 to the rod-side fluid chambers 15*a* of the attachment cylinders 15, the rod-side pressure detector 64*a* is capable of detecting the pressure of hydraulic fluid in the rod-side fluid chambers 15*a* by detecting hydraulic pressure at a position within the above range. Furthermore, since the pressure of hydraulic fluid is constant throughout the range from the port of the attachment control valve 45 connected to the fluid supply/discharge passage 57 through the fluid supply/discharge passage 57 to the bottom-side fluid chambers 15*b* of the attachment cylinders 15, the bottom-side pressure detector 64*b* is capable of detecting the pressure of hydraulic fluid in the bottom-side fluid chambers 15*b* by detecting hydraulic pressure at a position within the above range.

Steps performed by the controller 20 using the cylinder fluid pressure detectors 63 and 64 to evaluate the state of contact between the work attachment 16 the contact object 17, and steps performed by the controller 20 based on the evaluation, will be described later in detail.

A pair of fluid supply/discharge passages 59 and 60 extend from the AUX control valve 46 and are connected to corresponding ones of the AUX ports 11. When the attachment 16 including hydraulic actuator(s) is attached to the distal ends of the pair of left and right lift arms 10, the hydraulic actuator is fluidly connected to the AUX ports 11.

Each of the control valves 44, 45 and 46 is a pilot-operated directional switching valve including a spool and pressure receivers provided on opposite sides of the spool to receive pilot fluid pressure. The hydraulic pump 42 is a pilot pump to supply pilot pressure fluid to the control valves 44 and 45 and/or the like.

As discussed earlier with reference to FIG. 5, the hydraulic pump 42 is a charge pump to deliver hydraulic fluid to the HSTs 31L and 31R in the travel hydraulic system 30, and also defines and functions as a pilot pump to supply pilot pressure fluid to control the movable swash plates 32*a* of the hydraulic pumps 32L and 32R.

The work operation lever 9 is manually operated by an operator seated on the operator's seat 7. By pivoting the work operation lever 9 forward or rearward, the lift arm control valve 44 is actuated and switches positions to cause the lift arm cylinders 14 to extend or retract, and the lift arms 10 are swung (moved) up or down with respect to the machine body 2. By pivoting the work operation lever 9 rightward or leftward, the attachment control valve 45 is actuated and switches positions to cause the attachment cylinder 15 to extend or retract, and the work attachment 16 is swung up or down with respect to the lift arms 10.

The link structure between (i) the work operation lever 9 and (ii) the lift arm control valve 44 and the attachment control valve 45 differs between the work hydraulic system 40A in FIG. 6A and the work hydraulic system 40B in FIG. 6B. The link structure between the work operation lever 9 and the cylinder control valves 44 and 45 specific to the work hydraulic system 40A in FIG. 6A and that specific to the work hydraulic system 40B in FIG. 6B will be described later in detail.

As discussed earlier, when a work attachment 16 such as the sweeper 16B as illustrated in FIG. 2, the hydraulic breaker 16C as illustrated in FIG. 3, or the earth auger 16D as illustrated in FIG. 4 is attached to the working device 4, the hydraulic actuator(s) (AUX actuator(s)) of the work attachment 16 is fluidly connected to the AUX ports 11 as the couplers via fluid pipes and/or the like to be driven by hydraulic fluid supplied from the AUX control valve 46 via the AUX ports 11.

The work hydraulic system 40 includes solenoid valves 47 and 48 to positionally control the AUX control valve 46. The controller 20 controls the solenoid valves 47 and 48 based on operation of the AUX switch 18.

The AUX switch 18 may be a swingable seesaw switch, a slidable switch or a push switch, for example. The AUX switch 18 is electrically connected to the input interface of the controller 20.

When the AUX switch 18 is operated, an input signal which is an electric signal corresponding to the operation direction and operation amount of the AUX switch 18 is outputted from the AUX switch 18 and is inputted to the controller 20. The solenoid valves 47 and 48 are electrically connected to output interface(s) of the controller 20. The controller 20 outputs current as a control signal to the solenoid valves 47 and 48 according to the input signal from the AUX switch 18.

For example, hydraulic fluid delivered from the hydraulic pump 41 via the delivery fluid passage 43 is supplied to the solenoid valves 47 and 48 as pilot pressure fluid whose pressure is to be applied to the AUX control valve 46. A source of fluid supplied to the solenoid valves 47 and 48 and to be supplied as pilot pressure fluid to the AUX control valve 46 is omitted in FIG. 6A or 6B.

When the solenoid valve 47 receives a control signal from the controller 20 and its solenoid is energized, the solenoid valve 47 supplies pilot pressure fluid to the upper pressure receiver of the AUX control valve 46 in FIGS. 6A and 6B, so that the spool of the AUX control valve 46 shifts downward in FIGS. 6A and 6B. Accordingly, hydraulic fluid is supplied from the AUX control valve 46 to the hydraulic actuator of the attachment 16 via the fluid supply/discharge passage 59 and the AUX ports 11 (i.e., corresponding one(s) of the AUX ports 11) and hydraulic fluid is returned from the hydraulic actuator to the AUX control valve 46 via the AUX ports 11 and the fluid supply/discharge passage 60.

When the solenoid valve 48 receives a control signal from the controller 20 and its solenoid is energized, the solenoid valve 48 supplies pilot pressure fluid to the lower pressure receiver of the AUX control valve 46 in FIGS. 6A and 6B, so that the spool of the AUX control valve 46 shifts upward in FIGS. 6A and 6B. Accordingly, hydraulic fluid is supplied from the AUX control valve 46 to the hydraulic actuator of the attachment 16 via the fluid supply/discharge passage 60 and the AUX ports 11 and hydraulic fluid is returned from the hydraulic actuator to the AUX control valve 46 via the AUX ports 11 and the fluid supply/discharge passage 59.

The following discusses the link structure between (i) the work operation lever 9 and (ii) the lift arm control valve 44 and the attachment cylinder 15 specific to the work hydraulic system 40A in FIG. 6A.

In the working machine 1, operation valves 51, 52, 53 and 54 are arranged around the base of the work operation lever 9. By pivoting the work operation lever 9 in one direction, one or more of the operation valves 51, 52, 53 and 54 that correspond to that direction are actuated to deliver, as pilot pressure fluid, fluid supplied from the hydraulic pump 42.

When the work operation lever 9 is pivoted forward (see "F" in FIG. 6A) from a neutral position (N), the corresponding operation valve 51 delivers pilot pressure fluid at a flow rate corresponding to the angle at which the work operation lever 9 is pivoted from the neutral position (N) (operation amount) and the pressure of the pilot pressure fluid is applied to the upper pressure receiver of the lift arm control valve 44 in FIG. 6A via a pilot pressure fluid passage 71, so that the spool of the lift arm control valve 44 shifts downward in FIG. 6A. Accordingly, hydraulic fluid is supplied from the lift arm control valve 44 to the rod-side fluid chambers 14*a* of the lift arm cylinders 14 via the fluid supply/discharge passage 55 and hydraulic fluid is discharged from the bottom-side fluid chambers 14*b* of the lift arm cylinders 14 to the lift arm control valve 44 via the fluid supply/discharge passage 56, causing the piston rods of the lift arm cylinders 14 to retract to lower the lift arms 10.

When the work operation lever 9 is pivoted rearward (backward) (B) from the neutral position (N), the corresponding operation valve 52 delivers pilot pressure fluid at a flow rate corresponding to the angle at which the work operation lever 9 is pivoted from the neutral position (N) (operation amount) and the pressure of the pilot pressure fluid is applied to the lower pressure receiver of the lift arm control valve 44 in FIG. 6A via a pilot pressure fluid passage 72, so that the spool of the lift arm control valve 44 shifts upward in FIG. 6A. Accordingly, hydraulic fluid is supplied from the lift arm control valve 44 to the bottom-side fluid chambers 14*b* of the lift arm cylinders 14 via the fluid supply/discharge passage 56 and hydraulic fluid is discharged from the rod-side fluid chambers 14*a* of the lift arm cylinders 14 to the lift arm control valve 44 via the fluid supply/discharge passage 55, causing the piston rods of the lift arm cylinders 14 to extend to raise the lift arms 10.

When the work operation lever 9 is pivoted leftward (L) from the neutral position (N), the corresponding operation valve 53 delivers pilot pressure fluid at a flow rate corresponding to the angle at which the work operation lever 9 is pivoted from the neutral position (N) (operation amount) and the pressure of the pilot pressure fluid is applied to the upper pressure receiver of the attachment control valve 45 in FIG. 6A via a pilot pressure fluid passage 73, so that the spool of the attachment control valve 45 shifts downward in FIG. 6A. Accordingly, hydraulic fluid is supplied from the attachment control valve 45 to the bottom-side fluid chambers 15*b* of the attachment cylinders 15 via the fluid supply/discharge passage 57 and hydraulic fluid is discharged from the rod-side fluid chambers 15*a* of the attachment cylinders 15 to the attachment control valve 45 via the fluid supply/discharge passage 58, causing the piston rods of the attachment cylinders 15 to extend to swing the work attachment 16 downward (in the anticlockwise direction in FIGS. 1 and 2) with respect to the left and right lift arms 10.

When the work operation lever 9 is pivoted rightward (R) from the neutral position (N), the corresponding operation valve 54 delivers pilot pressure fluid at a flow rate corresponding to the angle at which the work operation lever 9 is pivoted from the neutral position (N) (operation amount) and the pressure of the pilot pressure fluid is applied to the lower pressure receiver of the attachment control valve 45 in FIG. 6A via a pilot pressure fluid passage 74, so that the spool of the attachment control valve 45 shifts upward in FIG. 6A. Accordingly, hydraulic fluid is supplied from the attachment control valve 45 to the rod-side fluid chambers 15*a* of the attachment cylinders 15 via the fluid supply/discharge passage 58 and hydraulic fluid is discharged from the bottom-side fluid chambers 15*b* of the attachment cylinders 15 to the attachment control valve 45 via the fluid supply/discharge passage 57, causing the piston rods of the attachment cylinders 15 to retract to swing the attachment 16 upward (in the clockwise direction in FIGS. 1 and 2) with respect to the left and right lift arms 10.

The work operation lever 9 may be pivotable in four diagonal directions from the neutral position, and both the raising or lowering of the left and right lift arms 10 and the upward or downward swinging movement of the work attachment 16 may be achieved by pivoting the work operation lever 9 in one of the diagonal directions.

In such a case, the following configuration may be used. Pivoting the work operation lever 9 diagonally forward and leftward from the neutral position (N) lowers the lift arms 10 while swinging the attachment 16 downward. Pivoting the work operation lever 9 diagonally forward and rightward from the neutral position (N) lowers the lift arms 10 while swinging the attachment 16 upward. Pivoting the work operation lever 9 diagonally backward and leftward from the neutral position (N) raises the lift arms 10 while swinging the attachment 16 downward. Pivoting the work operation lever 9 diagonally backward and rightward from the neutral position (N) raises the lift arms 10 while swinging the attachment 16 upward.

The work hydraulic system 40A is provided with fluid pressure detectors 81, 82, 83, and 84 to detect hydraulic pressures in the respective pilot pressure fluid passages 71, 72, 73, and 74. The fluid pressure detectors 81, 82, 83, and 84 are electrically connected to the controller 20, and the controller 20 receives signals representative of the hydraulic pressures detected by the fluid pressure detectors 81, 82, 83, and 84.

The controller 20 is capable of determining, based on the signals received from the fluid pressure detectors 81, 82, 83, and 84, whether or not the lift arm control valve 44 or the attachment control valve 45 is in operation to cause the lift arm cylinder 14 or the attachment cylinder 15 to extend or retract. In other words, the controller 20 is capable of determining whether or not the work operation lever 9 is operated to actuate the lift arms 10 or the work attachment 16 (whether the work operation lever 9 is pivoted from the neutral position). The controller 20 is further capable of, based on the signals, recognizing the position of the lift arm control valve 44 or the attachment control valve 45, i.e., the direction of operation and operation amount of the work operation lever 9 (the direction in which the work operation lever 9 is pivoted from the neutral position and the angle at which the work operation lever 9 is pivoted from the neutral position).

The following discusses the link structure between (i) the work operation lever 9 and (ii) the lift arm control valve 44 and the attachment cylinder 15 specific to the work hydraulic system 40B in FIG. 6B.

The working machine 1 is provided, at the base of the work operation lever 9, with a lever position detector 9*a* to detect the direction of operation and operation amount of the work operation lever 9 (the direction in which the work operation lever 9 is pivoted from the neutral position and the angle at which the work operation lever 9 is pivoted from the neutral position). The lever position detector 90 is a gyroscope sensor, an angle sensor, a potentiometer, and/or the like. The lever position detector 9*a* is electrically connected to the controller 20, and the controller 20 receives signal(s) representative of the operation direction and operation amount of the work operation lever 9 detected by the lever position detector 9*a*.

The work hydraulic system 40B includes solenoid valves 67 and 68 to positionally control the lift arm control valve 44, and solenoid valves 69 and 70 to positionally control the attachment control valve 45. The solenoid valves 67, 68, 69, and 70 are controlled by the controller 20 based on the direction of operation and operation amount of the work operation lever 9 (the direction in which the work operation lever 9 is pivoted from the neutral position and the angle at which the work operation lever 9 is pivoted from the neutral position) detected by the lever position detector 9*a*.

When the work operation lever 9 is pivoted forward (see "F" in FIG. 6A) from a neutral position (N) (see FIG. 6A), the controller 20 applies a control signal (electric current) corresponding to the angle at which the work operation lever 9 is pivoted from the neutral position (N) (operation amount)

to the solenoid of the solenoid valve 67 to energize the solenoid, the solenoid valve 67 delivers pilot pressure fluid, and the pilot pressure fluid is supplied to the upper pressure receiver of the lift arm control valve 44 in FIG. 6B, so that the spool of the lift arm control valve 44 shifts downward in FIG. 6B. Accordingly, hydraulic fluid is supplied from the lift arm control valve 44 to the rod-side fluid chambers 14*a* of the lift arm cylinders 14 via the fluid supply/discharge passage 55 and hydraulic fluid is discharged from the bottom-side fluid chambers 14*b* of the lift arm cylinders 14 to the lift arm control valve 44 via the fluid supply/discharge passage 56, causing the piston rods of the lift arm cylinders 14 to retract to lower the lift arms 10.

When the work operation lever 9 is pivoted rearward (backward) (B) (see FIG. 6A) from the neutral position (N), the controller 20 applies a control signal (electric current) corresponding to the angle at which the work operation lever 9 is pivoted from the neutral position (N) (operation amount) to the solenoid of the solenoid valve 68 to energize the solenoid, the solenoid valve 68 delivers pilot pressure fluid, and the pilot pressure fluid is supplied to the lower pressure receiver of the lift arm control valve 44 in FIG. 6B, so that the spool of the lift arm control valve 44 shifts upward in FIG. 6B. Accordingly, hydraulic fluid is supplied from the lift arm control valve 44 to the bottom-side fluid chambers 14*b* of the lift arm cylinders 14 via the fluid supply/discharge passage 56 and hydraulic fluid is discharged from the rod-side fluid chambers 14*a* of the lift arm cylinders 14 to the lift arm control valve 44 via the fluid supply/discharge passage 55, causing the piston rods of the lift arm cylinders 14 to extend to raise the lift arms 10.

When the work operation lever 9 is pivoted leftward (L) (see FIG. 6A) from the neutral position (N) the controller 20 applies a control signal (electric current) corresponding to the angle at which the work operation lever 9 is pivoted from the neutral position (N) (operation amount) to the solenoid of the solenoid valve 69 to energize the solenoid, the solenoid valve 69 delivers pilot pressure fluid, and the pilot pressure fluid is supplied to the upper pressure receiver of the attachment control valve 45 in FIG. 6B, so that the spool of the attachment control valve 45 shifts downward in FIG. 6B. Accordingly, hydraulic fluid is supplied from the attachment control valve 45 to the bottom-side fluid chambers 15*b* of the attachment cylinder 15 via the fluid supply/discharge passage 57 and hydraulic fluid is discharged from the rod-side fluid chambers 15*a* of the attachment cylinders 15 to the attachment control valve 45 via the fluid supply/discharge passage 58, causing the piston rods of the attachment cylinders 15 to extend to swing the work attachment 16 downward (in the anticlockwise direction in FIGS. 1 and 2) with respect to the left and right lift arms 10.

When the work operation lever 9 is pivoted rightward (R) (see FIG. 6A) from the neutral position (N), the controller 20 applies a control signal (electric current) corresponding to the angle at which the work operation lever 9 is pivoted from the neutral position (N) (operation amount) to the solenoid of the solenoid valve 70 to energize the solenoid, the solenoid valve 70 delivers pilot pressure fluid, and the pilot pressure fluid is supplied to the lower pressure receiver of the attachment control valve 45 in FIG. 6B, so that the spool of the attachment control valve 45 shifts upward in FIG. 6B. Accordingly, hydraulic fluid is supplied from the attachment control valve 45 to the bottom-side fluid chambers 15*b* of the attachment cylinders 15 via the fluid supply/discharge passage 58 and hydraulic fluid is discharged from the bottom-side fluid chambers 15*b* of the attachment cylinders 15 to the attachment control valve 45 via the fluid supply/discharge passage 57, causing the piston rods of the attachment cylinders 15 to retract to swing the work attachment 16 upward (in the clockwise direction in FIGS. 1 and 2) with respect to the left and right lift arms 10.

The work operation lever 9 linked to the work hydraulic system 40B in FIG. 6B may be pivotable in four diagonal directions from the neutral position, and both the raising or lowering of the left and right lift arms 10 and the upward or downward swinging movement of the work attachment 16 may be achieved by pivoting the work operation lever 9 in one of the diagonal directions, similarly to the work operation lever 9 linked to the work hydraulic system 40A in FIG. 6A.

In the work hydraulic system 40 (the work hydraulic system 40A in FIG. 6A and the work hydraulic system 40B in FIG. 6B), the input interface(s) of the controller 20 has/have electrically connected thereto the rod-side pressure detector 63*a* and the bottom-side pressure detector 63*b* of the lift arm cylinder fluid pressure detector 63 and have electrically connected thereto the rod-side pressure detector 64*a* and the bottom-side pressure detector 64*b* of the attachment cylinder fluid pressure detector 64. The controller 20 is capable of evaluating the state of contact between the work attachment 16 and the contact object 17 based on the result of detection by the lift arm cylinder fluid pressure detector 63 and/or the attachment cylinder fluid pressure detector 64 (hereinafter may be referred to as "cylinder fluid pressure detector(s) 63 and/or 64").

The following description discusses steps performed by the controller 20 to evaluate the state of contact between the work attachment 16 and the contact object 17 based on the result of detection by the cylinder fluid pressure detector(s) 63 and/or 64.

First, major examples of the state of contact between the work attachment 16 and the contact object 17 (may be referred to also as "contact state") are the following three states: a predetermined contact state in which the work attachment 16 is in contact with the contact object 17 and apples a predetermined (target, desired) contact pressure on the contact object 17; an "insufficient contact state" in which the work attachment 16 does not apply a sufficient contact pressure on the contact object 17 because, for example, the work attachment 16 is spaced from the contact object 17; and an "excessive contact state" in which the work attachment 16 applies an excessive contact pressure on the contact object 17, such as, for example, a state in which the work attachment 16 is digging into the contact object 17 such as soil.

The "predetermined contact state" may have different meanings depending on the type of work attachment 16, the content of work done using the work attachment 16, and/or the like. For example, in the case of leveling of soil (earth) 17A (leveling of ground) using the bucket 16A as illustrated in FIG. 1, cleaning of a road surface 17B using the sweeper 16B as illustrated in FIG. 2, or the like, the "predetermined contact state" refers to the state in which the work attachment 16 is in an optimal (suitable) attitude and in contact with the contact object 17A or 17B, and this contact state (contact pressure between the work attachment 16 and the contact object 17A or 17B which are in this contact state) is required to be maintained during work/travel of the working machine 1.

In the case of crushing of a to-be-crushed object 17C such as a concrete block using the hydraulic breaker 16C as illustrated in FIG. 3, the "predetermined contact state" refers to the state in which the hydraulic breaker 16C applies a pressing force equal to or greater than a predetermined minimum required pressing force and is in contact with the to-be-crushed object 17C.

The hydraulic breaker 16C receives hydraulic pressure from the AUX ports 11 to cause a crushing chisel 16Cb in the form of rod to make reciprocating movements. If the chisel 16Cb is driven by hydraulic pressure from the AUX ports 11 while the hydraulic breaker 16C is in "the insufficient contact state", i.e., if the chisel 16Cb is driven by hydraulic pressure from the AUX ports 11 when the hydraulic breaker 16C is spaced from the to-be-crushed object 17C or when the hydraulic breaker 16C is in contact with the to-be-crushed object 17C but only applies a pressure less than the minimum required pressure to the to-be-crushed object 17C, the chisel 16Cb makes idle strokes (idles) and directly receives a very strong hydraulic pressure, and may be damaged.

That is, the "predetermined contact state" for the hydraulic breaker 16C refers to the state (contact degree) in which the hydraulic breaker 16C is in contact with the to-be-crushed object 17C and applies a minimum required pressure (used as a criterion for making a judgment to avoid the insufficient contact state) to the to-be-crushed object 17C, instead of an optimal contact state to be maintained during work.

In the case of digging into soil (earth) 17D (making a hole) using the earth auger 16D as illustrated in FIG. 4, it is first necessary to define the state in which the earth auger 16D is in contact with the soil 17D at a depth-of-excavation of 0, before excavating (digging into) the soil 17D while checking the current depth of excavation in order to form a pile hole or the like having a target depth. Therefore, the "predetermined contact state" for excavation using the earth auger 16D refers to the state in which the earth auger 16D is in contact with the soil 17D at a depth-of-excavation of 0.

As has been discussed, the meaning of the "predetermined contact state" differs depending on the type of work attachment 16 and the content of work as illustrated in FIGS. 1 to 4, and such a state may be required to be maintained as an optimal state or may be required to be achieved temporarily. In any case, the work attachment 16 is required to be in contact with the contact object 17 and in the "predetermined contact state" either always or temporarily.

Checking the state of contact between the work attachment 16 and the contact object 17 (i.e., checking whether or not the work attachment 16 is in the predetermined contact state) has depended on the worker's vision and experience in operation of the work operation lever 9 and/or the like.

In the working machine 1 according to the present application, the controller 20 is configured or programmed to (i) refer to the relationship in hydraulic pressure regarding the lift arm cylinder(s) 14 (relationship between the rod-side hydraulic pressure P1r and the bottom-side hydraulic pressure P1b) calculated based on the results of detection by the lift arm cylinder fluid pressure detector 63 and/or the relationship in hydraulic pressure regarding the attachment cylinder(s) 15 (relationship between the rod-side hydraulic pressure P2a and the bottom-side hydraulic pressure P2r) calculated based on the results of detection by the attachment cylinder fluid pressure detector 64 and (ii) determine whether the state of contact between the work attachment 16 and the contact object 17 is the predetermined contact state, the insufficient contact state, the excessive contact state, or the like.

The controller 20 is capable of calculating a value representing the relationship in hydraulic pressure regarding the lift arm cylinder(s) 14 and the relationship in hydraulic pressure regarding the attachment cylinder(s) 15. There are various possible arithmetic expressions to calculate such a value. In the present embodiment, the value is a cylinder thrust force Fc that is generated depending on the balance between (i) the pressing force between the work attachment 16 and the contact object 17 and (ii) the gravity acting on the piston.

The cylinder thrust force Fc is calculated using the following expression.

$$Fc = (Pr/G) \times Aa - (Pb/G) \times Ab$$

In the above expression, G represents gravitational acceleration. Pr represents the rod-side hydraulic pressure of a hydraulic cylinder 14 or 15, Aa represents the area on which pressure is acting (hereinafter "pressure area") of the rod-side fluid chamber of the hydraulic cylinder 14 or 15, Pb represents the bottom-side hydraulic pressure of the hydraulic cylinder 14 or 15, and Ab represents the pressure area of the bottom-side fluid chamber of the hydraulic cylinder 14 or 15. The cylinder thrust force Fc calculated using the above expression is greater when the rod-side hydraulic pressure Pr is greater (when the bottom-side hydraulic pressure Pb is smaller). That is, the cylinder thrust force Fc calculated using the above expression is a force in the direction of retraction of a piston rod. In other words, the cylinder thrust force Fc has a positive value when the direction of the cylinder thrust force Fc is the direction of retraction of a piston rod, whereas the cylinder thrust force Fc has a negative value when the direction of the cylinder thrust force Fc is the direction of extension of the piston rod.

The cylinder thrust force Fc of the lift arm cylinder 14 is calculated by substituting the pressure area of the rod-side fluid chamber 14*a* into Aa of the above expression, substituting the pressure area of the bottom-side fluid chamber 14*b* into Ab of the above expression, substituting the rod-side hydraulic pressure P1r detected by the rod-side pressure detector 63*a* into Pr of the above expression, and substituting the bottom-side hydraulic pressure P1b detected by the bottom-side pressure detector 63*b* into Pb of the above expression.

The cylinder thrust force Fc of the attachment cylinder 15 is calculated by substituting the pressure area of the rod-side fluid chamber 15*a* into Aa of the above expression, substituting the pressure area of the bottom-side fluid chamber 15*b* into Ab of the above expression, substituting the rod-side hydraulic pressure P2r detected by the rod-side pressure detector 64*a* into Pr of the above expression, and substituting the bottom-side hydraulic pressure P2b detected by the bottom-side pressure detector 64*b* into Pb of the above expression.

Note that, when the operator operates the work operation lever 9 in order to swing the lift arms 10 upward or downward (cause the lift arm cylinders 14 to extend or retract) or to swing the work attachment 16 upward or downward (cause the attachment cylinders 15 to extend or retract), a thrust force is produced on the piston and therefore a frictional resistance is generated between the piston and the main body of the cylinder.

In the case where the work operation lever 9 is operated in order to cause the hydraulic cylinders 14 and/or 15 to extend or retract (hereinafter may be referred to as "when the work operation lever 9 is in operation"), the controller 20 calculates a corrected version of the cylinder thrust force Fc using a correction value set according to the frictional resistance resulting from the operation of the work operation lever 9 (for example, the controller 20 corrects the detected rod-side hydraulic pressure Pr or the bottom-side hydraulic pressure Pb and then calculates the cylinder thrust force Fc).

Examples of the correction value include: a correction value Kp set according to static friction generated in the hydraulic cylinders 14 and/or 15 when the work operation lever 9 is in operation but the hydraulic cylinders 14 and/or 15 are not moving (stationary); and a correction value Kv set according to kinetic friction generated in the hydraulic cylinders 14 and/or 15 when the work operation lever 9 is in operation and the hydraulic cylinders 14 and/or 15 are moving.

The foregoing static friction (frictional force) is a force that keeps the piston at rest against the pressure applied on the piston in the direction of extension or retraction of the piston rod. The foregoing kinetic friction (frictional force) is a force to reduce the movement of the piston which is sliding in the direction of extension or retraction of the piston rod. The correction value Kp and the correction value Kv are different values corresponding to the static frictional force and the kinetic frictional force differing from each other as discussed above. Specifically, the static frictional force is greater than the kinetic frictional force, and therefore the correction value Kp is greater than the correction value Kv.

When the work operation lever 9 is operated in order to cause the hydraulic cylinders 14 and/or 15 to extend (hereinafter referred to as "when the work operation lever 9 is operated to cause cylinders to extend"), the controller 20 corrects the detected bottom-side hydraulic pressure Pb to reduce the detected bottom-side hydraulic pressure Pb. When the work operation lever 9 is operated in order to cause the hydraulic cylinders 14 and/or 15 to retract (hereinafter referred to as "when the work operation lever 9 is operated to cause cylinders to retract"), the controller 20 corrects the detected rod-side hydraulic pressure Pr to reduce the detected rod-side hydraulic pressure Pr.

Specifically, the controller 20 calculates the cylinder thrust force Fc using any of the following equations according to the situation.

First, when the work operation lever 9 is operated to cause cylinders to extend but the hydraulic cylinders 14 and/or 15 are not moving (stationary) (pressure in the direction of extension of the piston rod is applied on the piston), the cylinder thrust force Fc is calculated using the following equation using the correction value Kp.

$$\begin{aligned} Fc &= ((Pr/G)\times Aa - Kp) - (Pb/G)\times Ab \\ &= (Pr/G)\times Aa - (Pb/G)\times Ab - Kp \end{aligned}$$

When the work operation lever 9 is operated to cause cylinders to retract but the hydraulic cylinders 14 and/or 15 are not moving (stationary) (pressure in the direction of retraction of the piston rod is applied on the piston), the cylinder thrust force Fc is calculated using the following equation using the correction value Kp.

$$\begin{aligned} Fc &= (Pr/G)\times Aa - ((Pb/G)\times Ab - Kp) \\ &= (Pr/G)\times Aa - (Pb/G)\times Ab + Kp \end{aligned}$$

One way to more accurately calculate the cylinder thrust force Fc would be to set different correction values Kp for when the work operation lever 9 is operated to cause cylinders to extend and for when the work operation lever 9 is operated to cause cylinders to retract. Assuming that the correction value Kp for when the work operation lever 9 is operated to cause cylinders to extend is Kpr and the correction value Kp for when the work operation lever 9 is operated to cause cylinders to retract is Kpb (#Kpr), the cylinder thrust force Fc is calculated using any of the following equations according to the situation.

Specifically, when the work operation lever 9 is operated to cause cylinders to extend but the hydraulic cylinders 14 and/or 15 are not moving (stationary), the cylinder thrust force Fc is calculated using the following equation using the correction value Kpr.

$$\begin{aligned} Fc &= ((Pr/G)\times Aa - Kpr) - (Pb/G)\times Ab \\ &= (Pr/G)\times Aa - (Pb/G)\times Ab - Kpr \end{aligned}$$

When the work operation lever 9 is operated to cause cylinders to retract but the hydraulic cylinders 14 and/or 15 are not moving (stationary), the cylinder thrust force Fc is calculated using the following equation using the correction value Kpb.

$$\begin{aligned} Fc &= (Pr/G)\times Aa - ((Pb/G)\times Ab - Kpb) \\ &= (Pr/G)\times Aa - (Pb/G)\times Ab + Kpb \end{aligned}$$

Next, when the work operation lever 9 is operated to cause cylinders to extend and the hydraulic cylinders 14 and/or 15 are actually extending (hereinafter referred to as "when cylinders are extending"), the cylinder thrust force Fc is calculated using the following equation using the correction value Kv.

$$\begin{aligned} Fc &= ((Pr/G)\times Aa - Kv) - (Pb/G)\times Ab \\ &= (Pr/G)\times Aa - (Pb/G)\times Ab - Kv \end{aligned}$$

When the work operation lever 9 is operated to cause cylinders to retract and the hydraulic cylinders 14 and/or 15 are actually retracting (hereinafter referred to as "when cylinders are retracting"), the cylinder thrust force Fc is calculated using the following equation using the correction value Kv.

$$\begin{aligned} Fc &= (Pr/G)\times Aa - ((Pb/G)\times Ab - Kv) \\ &= (Pr/G)\times Aa - (Pb/G)\times Ab + Kv \end{aligned}$$

One way to more accurately calculate the cylinder thrust force Fc would be to set different correction values Kv for when cylinders are extending and for when cylinders are retracting. Assuming that the correction value Kv for when cylinders are extending is Kvr and the correction value Kv for when cylinders are retracting is Kvb (Kvr), the cylinder thrust force Fc is calculated using any of the following equations according to the situation.

Specifically, when cylinders are extending, the cylinder thrust force Fc is calculated using the following equation using the correction value Kvr.

$$Fc = ((Pr/G)\times Aa - Kvr) - (Pb/G)\times Ab$$
$$= (Pr/G)\times Aa - (Pb/G)\times Ab - Kvr$$

When cylinders are retracting, the cylinder thrust force Fc is calculated using the following equation using the correction value Kvb.

$$Fc = (Pr/G)\times Aa - ((Pb/G)\times Ab - Kvb)$$
$$= (Pr/G)\times Aa - (Pb/G)\times Ab + Kvb$$

In order to determine which of the above equations to use to calculate the cylinder thrust force Fc, it is necessary to determine whether or not the work operation lever 9 is currently in operation and, if the work operation lever 9 is in operation, to determine whether the work operation lever 9 is operated to cause cylinders to extend or the work operation lever 9 is operated to cause cylinders to retract.

In the case where the working machine 1 includes the work hydraulic system 40A of FIG. 6A, the controller 20 determines whether or not pilot fluid pressure is applied on any of the pilot pressure fluid passages 71, 72, 73, and 74 and which of the pilot pressure fluid passages 71, 72, 73, and 74 is/are receiving the pilot fluid pressure based on the results of detection by the fluid pressure detectors 81, 82, 83, and 84, thus performing the above-described determination.

On the contrary, in the case where the working machine 1 includes the work hydraulic system 40B of FIG. 6B, the controller 20 checks the direction in which the work operation lever 9 is pivoted from the neutral position and the angle at which the work operation lever 9 is pivoted from the neutral position based on the results of detection by the lever position detector 9*a*, thus performing the above-described determination.

Furthermore, in the case where hydraulic cylinders 14 and/or 15 are not moving when the work operation lever 9 is operated to cause cylinders to extend or when the work operation lever 9 is operated to cause cylinders to retract, the corresponding rod-side hydraulic pressure Pr or bottom-side hydraulic pressure Pb increases as the operation amount of the work operation lever 9 (the angle at which the work operation lever 9 is pivoted from the neutral position) increases; in this regard, the static frictional force would also change as the operation amount changes.

In view of the above, the controller 20 may change the correction value Kp (Kpr, Kpb) according to the operation amount of the work operation lever 9, and calculate the cylinder thrust force Fc using the thus-changed correction value Kp (Kpr, Kpb).

In the case where the working machine 1 includes the work hydraulic system 40B of FIG. 6B, the controller 20 is capable of checking the operation amount of the work operation lever 9 (the angle at which the work operation lever 9 is pivoted from the neutral position) based on a signal received from the lever position detector 9*a*. On the contrary, in the case where the working machine 1 includes the work hydraulic system 40A of FIG. 6A, the controller 20 is capable of checking the pilot fluid pressure applied on the cylinder control valve(s) 44 and/or 45 instead of the operation amount of the work operation lever 9 based on the results of detection by the fluid pressure detectors 81, 82, 83, and 84.

Note that the frictional forces (static frictional force and kinetic frictional force) against hydraulic pressure may change under the influence of ambient temperature changes depending on the material for the hydraulic cylinders 14 and/or 15. Also note that the frictional forces (static frictional force and kinetic frictional force) on the hydraulic cylinders 14 and/or 15 may also change under the influence of, for example, changes in viscosity of hydraulic fluid that would result from changes in temperature of the hydraulic fluid.

In view of the above, the correction value Kp (Kpr, Kpb) and/or the correction value Kv (Kvr, Kvb) set according to the frictional forces (static frictional force and kinetic frictional force) may be changed according to the temperature of hydraulic fluid and/or the ambient temperature.

Note that each of the cylinder thrust forces Fc calculated using the above-described equations is an example of a value representative of the relationship in hydraulic pressure between the rod-side hydraulic pressure Pr and the bottom-side hydraulic pressure Pb, and that the value may be corrected depending on the situation by any of various other methods.

Furthermore, it is assumed that the state of contact between the work attachment 16 and the contact object 17 is represented by a value of "contact degree C." when the state of contact is evaluated. In the present embodiment, the contact degree C. is the percentage (%) of the cylinder thrust force Fc calculated as described above based on the results of detection by the cylinder fluid pressure detector(s) 63 and/or 64 to the maximum cylinder thrust force Fcm. Specifically, the contact degree C. (unit: %) is calculated using the following equation.

$$C = (Fc/Fcm)\times 100$$

The memory 21 stores a predetermined contact degree Cp which is an indicator of the predetermined contact state for each work attachment 16. Specifically, the state of the work attachment 16 in which the work attachment 16 is in contact with the contact object 17 to a predetermined contact degree Cp is defined as the "predetermined contact state", and information about each work attachment 16 stored in the memory 21 includes the predetermined contact degree Cp of that work attachment 16. Note that the foregoing relationship in hydraulic pressure such as a cylinder thrust force corresponding to the predetermined contact degree Cp may be stored instead of or in addition to the predetermined contact degree Cp. The memory 21 may be contained in the controller 20 and may be provided external to the controller 20 and electrically connected to the controller 20.

If the current contact degree(s) C. determined based on the cylinder thrust force(s) Fc of the hydraulic cylinder(s) 14 and/or 15 calculated based on the results of detection by the cylinder fluid pressure detector(s) 63 and/or 64 is the predetermined contact degree Cp ($C=Cp$), the controller 20 determines that the current state of contact between the work attachment 16 and the contact object 17 is the predetermined contact state.

In cases where the contact degree C. is calculated based on the results of detection by the lift arm cylinder fluid pressure detector 63, if the current contact degree C. is less than the predetermined contact degree Cp ($C<Cp$), the controller 20 determines that the current state of contact between the work attachment 16 and the contact object 17 is the insufficient contact state. In contrast, if the current contact degree C. is greater than the predetermined contact degree Cp (C>Cp), the controller 20 determines that the current state of contact between the work attachment 16 and the contact object 17 is the excessive contact state.

In cases where the contact degree C. is calculated based on the results of detection by the attachment cylinder fluid pressure detector 64, if the current contact degree C. is less than the predetermined contact degree Cp (C<Cp), the controller 20 determines that the current state of contact between the work attachment 16 and the contact object 17 is the excessive contact state. In contrast, if the current contact degree C. is greater than the predetermined contact degree Cp (C>Cp), the controller 20 determines that the current state of contact between the work attachment 16 and the contact object 17 is the insufficient contact state.

Note that, as discussed earlier, the cylinder thrust force Fc is an example of an indicator of the relationship in hydraulic pressure between the rod-side hydraulic pressure Pr and the bottom-side hydraulic pressure Pb of a hydraulic cylinder (lift arm cylinder 14 or attachment cylinder 15). The indicator of the relationship in hydraulic pressure is not limited as such.

For example, the foregoing expression is for use when the relationship in hydraulic pressure is represented by the cylinder thrust force Fc in the direction of retraction of a piston rod. The expression may be replaced with another expression for use when the relationship in hydraulic pressure is represented by a cylinder thrust force in the direction of extension of the piston rod. In other words, the cylinder thrust force in the direction of extension of the piston rod may have a positive value and the cylinder thrust force in the direction of retraction of the piston rod may have a negative value.

The indicator does not need to be a value calculated based on the difference between the rod-side hydraulic pressure Pr and the bottom-side hydraulic pressure Pb such as the cylinder thrust force Fc. The indicator of the relationship in hydraulic pressure may be, for example, a value calculated based on the ratio between the rod-side hydraulic pressure Pr and the bottom-side hydraulic pressure Pb.

The contact degree C. and the predetermined contact degree Cp may be any values and not limited to those determined using the foregoing equations, provided that the contact degree C. and the predetermined contact degree Cp are indicators of the state of contact between the work attachment 16 and the contact object 17 and are calculated based on the relationship in hydraulic pressure (for example, cylinder thrust force Fc) between the rod-side hydraulic pressure Pr and the bottom-side hydraulic pressure Pb of hydraulic cylinder(s) (lift arm cylinder(s) 14 and/or attachment cylinder(s) 15).

For example, the following arrangement may be used: a value indicating the relationship in hydraulic pressure between the rod-side hydraulic pressure Pr and the bottom-side hydraulic pressure Pb (such as the cylinder thrust force Fc) is used as-is to represent the contact degree: the value is compared with a value representative of the relationship in hydraulic pressure corresponding to the predetermined contact state stored in the memory 21; and whether the work attachment 16 and the contact object 17 are in the predetermined contact state or not is determined.

The controller 20 is capable of performing various steps corresponding to the state of contact between the work attachment 16 and the contact object 17 (contact degree C.) determined based on the relationship in hydraulic pressure (cylinder thrust force Fc) calculated using the results of detection by the cylinder fluid pressure detector(s) 63 and/or 64.

For example, if the controller 20 determines that the state of contact of the work attachment 16 including a hydraulic actuator (AUX actuator) supplied with hydraulic fluid from the AUX port(s) 11 with the contact object 17 is the insufficient contact state (C<Cp), the controller 20 controls the solenoid valve(s) 47 and/or 48 to place the AUX control valve 46 in the position in which hydraulic fluid is not sent to the AUX port(s) 11, thus stopping the driving of the hydraulic actuator (AUX actuator) of the work attachment 16.

The controller 20 has a display 22 electrically connected thereto. The controller may cause the display 22 to display the relationship in hydraulic pressure (cylinder thrust force Fc) calculated based on the results of detection by the cylinder fluid pressure detector(s) 63 and/or 64 and/or the current state of contact (contact degree C.) between the work attachment 16 and the contact object 17 determined based on the calculated relationship in hydraulic pressure. Additionally or alternatively, the controller 20 may cause the display 22 to display the difference (Cp-C) between the current contact state (contact degree C.) and the predetermined contact state (predetermined contact degree Cp).

Additionally or alternatively, the controller 20 may, in the case where the work attachment 16 is not in the predetermined contact state (C≠Cp), issue an alert to an operator by, for example, causing the display 22 to display an indication that the work attachment 16 is not in the predetermined contact state. Additionally or alternatively, the controller 20 may cause the display 22 to display a guidance indication indicating a manner in which the work operation lever 9 should be operated to bring the contact state (contact degree C.) into the predetermined contact state (predetermined contact degree Cp). The guidance indication is, for example, the message "Raise lift arms", "Lower work attachment", and/or the like.

Additionally or alternatively, the controller 20 may transmit the foregoing alert, guidance, and/or the like to the operator via sound.

Additionally or alternatively, the controller 20 may control the lift arm cylinder(s) 14 and/or attachment cylinder(s) 15 to bring the current state of contact (contact degree C.) between the work attachment 16 and the contact object 17 determined based on the results of detection by the cylinder fluid pressure detector(s) 63 and/or 64 into the predetermined contact state (predetermined contact degree Cp).

The lift arm control valve 44 and/or the attachment control valve 45, which are pilot-control proportional valves which change positions in response to pilot pressure in FIGS. 6A and 6B, may be replaced by proportional solenoid valve(s).

In cases where the control valves 44 and 45 are proportional solenoid valves, the work operation lever 9 may be replaced by the one that includes a lever position detector **9*a* to detect the direction of operation and operation amount of the work operation lever 9 as illustrated in FIG. 9B, and the lever position detector 9*a* may be electrically connected to the/an input interface of the controller 20**.

In such a case, the controller 20 may control the energization and deenergization of the solenoid(s) of the lift arm control valve 44 and/or attachment control valve 45 based on signal(s) indicating the position and the amount of pivoting of the work operation lever 9 received from the lever position detector **9*a***.

Alternatively, the lift arm control valve 44 and the attachment control valve 45 may stay the same as those illustrated in FIG. 6A, i.e., the lift arm control valve 44 and the attachment control valve 45 may be pilot-control valves and the pilot pressure fluid to the control valves 44 and 45 may be controlled by operating the work operation lever 9 as illustrated in FIG. 6, whereas the work operation lever 9 may be operable in accordance with an operation signal from the controller 20 without the operator's operation.

In such a case, the controller 20 may control the work operation lever 9 to control the positions of the control valves 44 and 45 to ensure that the work attachment 16 and the contact object 17 are in the predetermined contact state (predetermined contact degree Cp), according to the contact state (contact degree C.) determined based on the relationship in hydraulic pressure (cylinder thrust force Fc) calculated based on the results of detection by the cylinder fluid pressure detector(s) 63 and/or 64.

As discussed earlier, the following vary depending on the type of work attachment 16, the type of content of work, and the like: the predetermined contact state (predetermined contact degree Cp) of the work attachment 16 and the contact object 17; which of the result of detection by the cylinder fluid pressure detector 63 and the result of detection by the cylinder fluid pressure detector 64 should be used (or should mainly be used) to evaluate the contact state: which part of the working machine 1 is to be controlled and how the working machine 1 is to be controlled based on the determined contact state; and the like.

In this regard, the memory 21 stores pieces of information relating to the predetermined contact state (predetermined contact degree Cp) of the work attachment 16 and the contact object 17, which of the result of detection by the cylinder fluid pressure detector 63 and the result of detection by the cylinder fluid pressure detector 64 should be used (or should mainly be used) to determine the state of contact, which part of the working machine 1 is to be controlled and how the working machine 1 is to be controlled based on the determined contact state, and the like, for respective types of work attachment 16 and/or for respective types of work.

Figure 7:
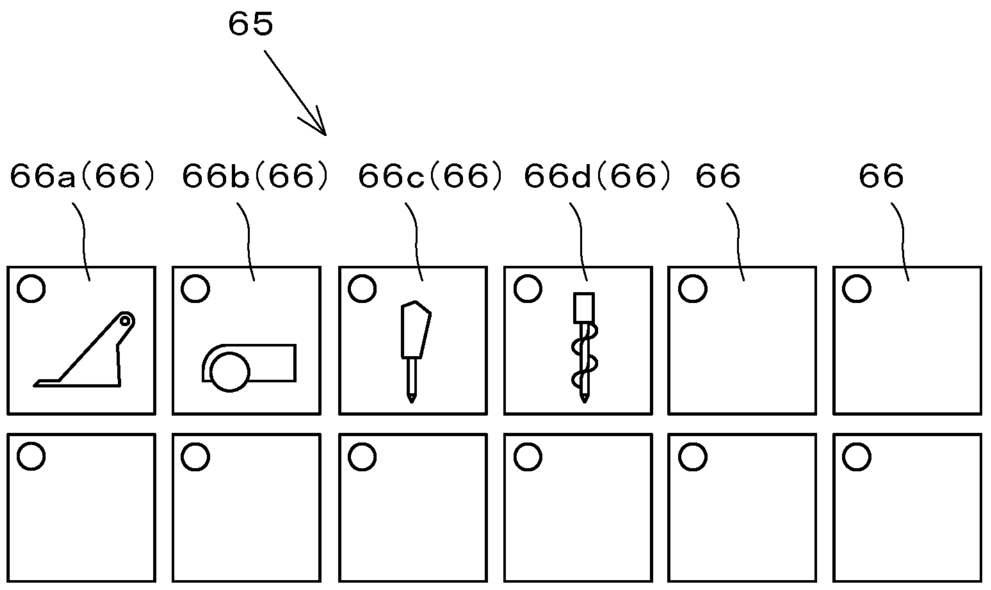
FIG. 7 illustrates a manner in which an attachment list is displayed.

In view of the above, in order for the controller 20 to select and acquire desired piece(s) of information from the pieces of information stored in the memory 21, for example, the display 22 may display an attachment list 65 as illustrated in FIG. 7 before the working machine 1 does work using the work attachment 16. The attachment list 65 is a list of arranged icons 66 each including a pictogram of a corresponding work attachment 16.

The attachment list 65 may be displayed in a touch sensitive form. In such a case, it is possible, by pressing with a finger one of the icons 66 displayed on the display 22 that includes a pictogram corresponding to the work attachment 16 attached to the working device 4 (lift arm 10), to cause the controller 20 to select and acquire a piece of information relating to the work attachment 16 corresponding to the icon 66 from the pieces of information stored in the memory 21.

For example, the icons 66 of the attachment list 65 in FIG. 7 include an icon 66*a* including a pictogram of a bucket 16A, an icon 66*b* including a pictogram of a sweeper 16B, an icon 66*c* including a pictogram of a hydraulic breaker 16C, and an icon 66*d* including a pictogram of an earth auger 16D.

It is possible to cause the controller 20 to acquire a piece of information Ia relating to the bucket 16A from the memory 21 by touching the icon 66*a* in the attachment list 65 displayed in a touch sensitive form. It is possible to cause the controller 20 to acquire a piece of information Ib relating to the sweeper 16B from the memory 21 by touching the icon 66*b* in the attachment list 65. It is possible to cause the controller 20 to acquire a piece of information Ic relating to the hydraulic breaker 16C from the memory 21 by touching the icon 66*c* in the attachment list 65. It is possible to cause the controller 20 to acquire a piece of information Id relating to the earth auger 16D from the memory 21 by touching the icon 66*d* in the attachment list 65.

Note that any structure may be used, provided that a piece of information relating to the work attachment 16 attached to the working device 4 can be selected and acquired from the pieces of information stored in the memory 21. For example, the icons 66 of the attachment list 65 may be replaced by corresponding push buttons provided on, for example, an instrument panel in front of the operator's seat 7 of the working machine 1.

Additionally or alternatively, each work attachment 16 may include a storage unit such as a microchip storing a piece of information including a desired predetermined contact degree Cp of the work attachment 16, which of the relationship in hydraulic pressure (cylinder thrust force Fc) of the lift arm cylinder(s) 14 and that of the attachment cylinder(s) 15 should be used (or should mainly be used), and/or the like, and the controller 20 may be configured or programmed to read the piece of information from the storage unit of the work attachment 16 attached to the working device 4 and control the work attachment 16 and/or the like.

The controller 20 may be configured or programmed to control the work attachment 16 and/or the like based on the information acquired from the work attachment 16 in priority to the information stored in the memory 21 of the working machine 1.

In cases where the work attachment 16 is an attachment to form, by work such as excavation or boring, a work product such as a hole or a trench in the contact object 17 in contact with the work attachment 16 in the predetermined contact state, the controller 20 may display the degree of work done represented as, for example, the depth of the hole, the depth of trench, or the like. In this regard, the controller 20 may cause the display 22 to display a degree-of-work-done gauge WG.

Figure 8:
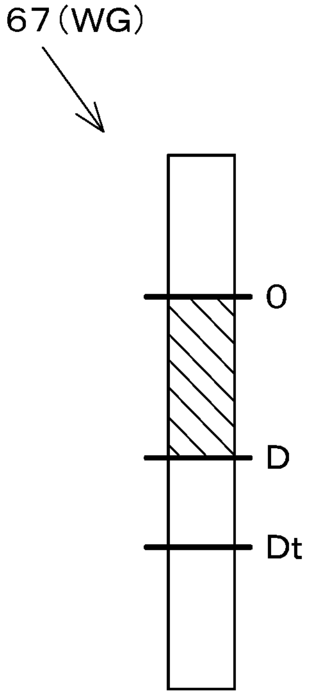
FIG. 8 illustrates a depth-of-excavation gauge (degree-of-work-done gauge).

For example, in the case where the earth auger 16D is attached to the working device 4 (lift arm(s) 10) as illustrated in FIG. 4 (that is, in the case of an embodiment in which the foregoing attachment list 65 is displayed, the earth auger 16D is selected from the attachment list 65 displayed on the display 22 and the piece of information Id relating to the earth auger 16D is selected and acquired), the controller 20 causes the display 22 to display a depth-of-excavation gauge 67 as illustrated in FIG. 8, which is an example of the degree-of-work-done gauge WG.

In such a case, the controller 20 causes the display 22 to display, as a reference position DO which is a depth-of-excavation of 0 on the depth-of-excavation gauge 67, the position of the distal end of the earth auger 16D in contact with the soil 17D (contact object 17) and in the predetermined contact state. The controller 20 further causes the display 22 to display, as the depth-of-excavation D, the position of the distal end of the earth auger 16D which changes as the excavation proceeds from the reference position DO.

Note that the controller 20 may acquire the attitude of the working device 4 when the earth auger 16D is at the reference position DO based on the result of detection by the foregoing attitude detector 62, and cause the memory 21 to store the attitude. The controller may, as the earth auger 16D proceeds with excavation on the soil 17D, further read a change in attitude of the working device 4 resulting from the progress of the excavation by acquiring the results of detection by the attitude detector 62, determine the depth-of-excavation D based on the change, and indicate the determined depth-of-excavation D on the depth-of-excavation gauge 67.

The following description discusses control flows in FIGS. 9 to 12 corresponding to pieces of work using the respective work attachments 16 illustrated in FIGS. 1 to 4, based on the assumption that the controller 20 controls the actions of the working device 4 (for example, control the lift arm control valve 44 and/or attachment control valve 45 which are proportional solenoid valves) until the work attachment 16 makes contact with the contact object 17 in a predetermined contact state.

FIG. 1 illustrates a working machine 1 performing leveling of soil (earth) 17A which is a contact object 17 (performing leveling of ground) by traveling with the bucket 16A in contact with the ground. Note that the bucket 16A illustrated in FIG. 1 does not include its own hydraulic actuators, and the AUX ports 11 of the working machine 1 do not need to be fluidly connected to the bucket 16A. Therefore, the AUX ports 11 of the working machine 1 are closed.

In order to achieve reliable and accurate leveling of the soil 17A, it is required that the bucket 16A continue being in an optimal attitude and continue applying an optimal contact pressure on the soil 17A during the travel/work of the working machine 1. That is, it is required that a predetermined (optimal) state of contact between the bucket 16A (work attachment 16) and the soil 17A (contact object 17) be maintained.

One example of the predetermined (optimal) contact state of the bucket 16A during the land leveling would be, in the case where, for example, the surface of the soil is a horizontal surface, a state in which the bottom surface of the bucket 16A is in contact with the surface of the soil such that the bottom surface of the bucket 16A is a horizontal surface parallel to the surface of the soil.

If the bucket 16A is in contact with the surface of the soil 17A such that the bucket 16A is tilted downward and forward, the sharp distal end portion of the bucket 16A is pressed against the soil 17A (and further digs into the soil 17A). Such a state is an excessive contact state for the bucket 16A which is about to perform land leveling (leveling of ground). If the working machine 1 travels with the bucket 16A in the excessive contact state, the distal end portion of the bucket 16A may gouge the soil 17A, resulting in a loss of the effect of land leveling (leveling of ground).

In contrast, if the bucket 16A is spaced above from the surface of the soil 17A and a contact pressure applied by the bucket 16A to the soil 17A is not large enough, such a state is an insufficient contact state for the bucket 16A which is about to perform land leveling (leveling of ground). If the working machine 1 travels to perform land leveling (leveling of ground) with the bucket 16A in the insufficient contact state, a desired effect of land leveling (leveling of ground) may not be obtained, and many stones and rocks and the like would be left on the surface of the soil 17A after the land leveling (leveling of ground).

Because the state of contact between the soil 17A and the bucket 16A which is about to perform land leveling (leveling of ground) (i.e., the attitude of the bucket 16A) is evaluated by checking the degree of tilting of the bucket 16A in the fore-and-aft direction and/or the like, the state of contact should in fact be evaluated based on the relationship in hydraulic pressure regarding the lift arm cylinder(s) 14 (relationship between the rod-side hydraulic pressure P1r and the bottom-side hydraulic pressure P1b) and the relationship in hydraulic pressure regarding the attachment cylinder(s) 15 (relationship between the rod-side hydraulic pressure P2r and the bottom-side hydraulic pressure P2b).

It is assumed here that, however, for ease of description, the contact state of the bucket 16A (contact degree C.) is determined based on the relationship in hydraulic pressure (cylinder thrust force Fc) regarding the attachment cylinder(s) 15, based on the assumption that the lift arm(s) 10 has already been placed by the extension/retraction of the lift arm cylinder(s) 14 in an optimal position for the land leveling (leveling of ground) using the bucket 16A, before the bucket 16A is brought into contact with the soil 17A by the extension/retraction of the attachment cylinder(s) 15.

Assume that the predetermined contact state is a state in which the bottom surface of the bucket 16A is in full-surface contact with the soil 17A such that the bottom surface of the bucket 16A is parallel to the surface of the soil 17A, as discussed earlier. The predetermined contact degree Cp required for the bucket 16A which is about to perform land leveling (leveling of ground) is about 0% to about 1%. That is, such a state is a state in which the bucket 16A is in contact with the soil 17A without digging into the soil 17A and therefore the cylinder thrust force Fc of the attachment cylinder(s) 15 resulting from the weight of the bucket 16A is substantially stable. The predetermined contact degree Cp of the bucket 16A in such an orientation, i.e., a predetermined contact degree Cpa, is included in a piece of information Ia relating to the bucket 16A stored in the memory 21 of the working machine 1 or the storage unit (such as a microchip) of the bucket 16A.

Figure 9:
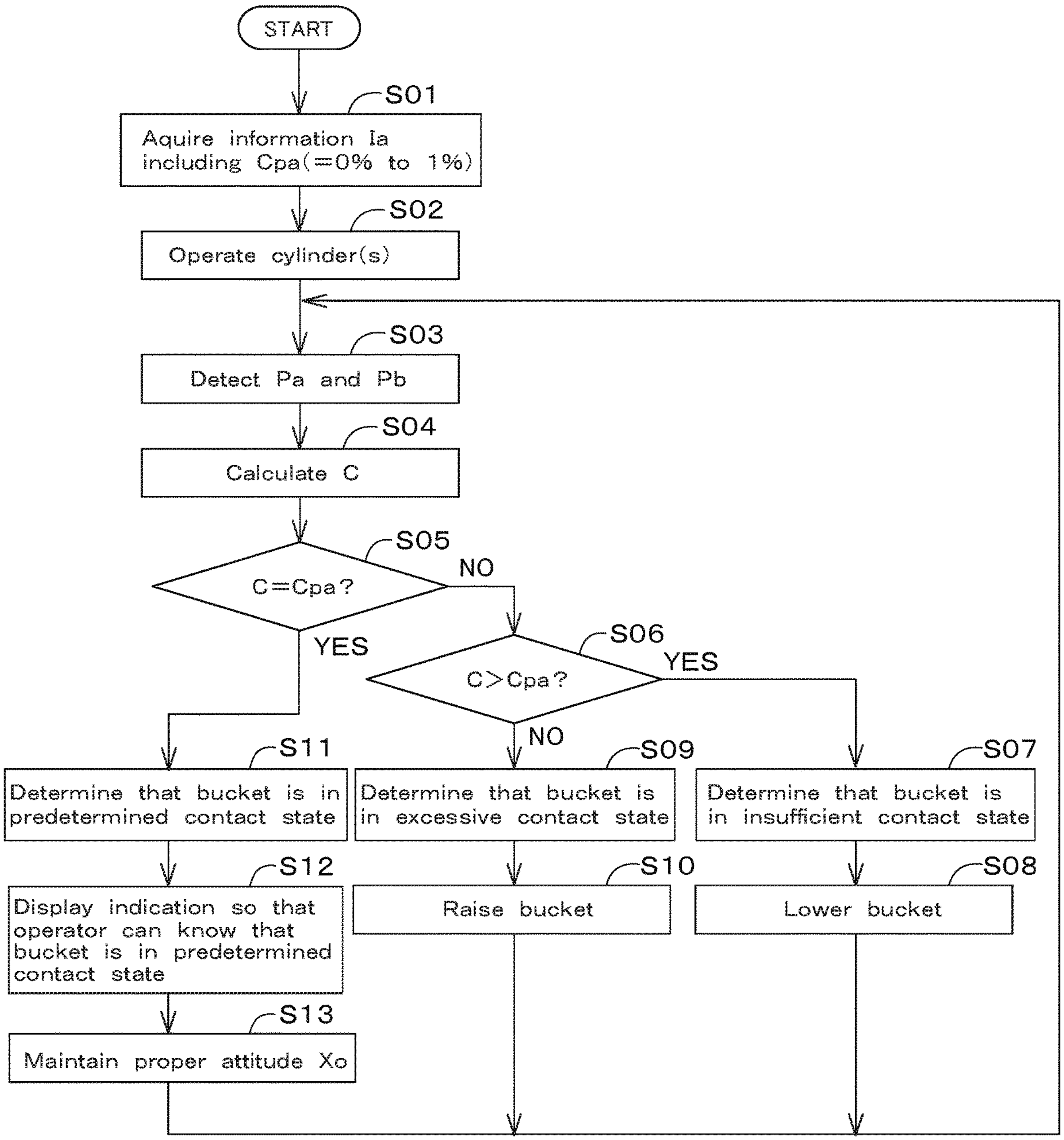
FIG. 9 is a control flowchart showing steps of evaluating the state of contact of a bucket and controlling a working device and/or the like based on the evaluation when land leveling (leveling of ground) as illustrated in FIG. 1 is performed.

The following description discusses a control flow for leveling of soil 17A (leveling of ground) using the bucket 16A, with reference to FIG. 9.

First, the controller 20 acquires a piece of information Ia relating to the bucket 16A in response to selection of a corresponding icon 101 in the attachment list 65 displayed on the display 22 and/or by receiving a signal issued by the work attachment 16 actually attached to the working device 4, for example (step S01). The piece of information Ia includes the predetermined contact degree Cpa (which is about 0% to about 1%) which is the predetermined contact degree Cp required for the bucket 16A, and/or the like.

Before the land leveling (leveling of ground) is started, the attachment cylinder(s) is/are operated to bring the bucket 16A into contact with the soil 17A (step S02), during which the attachment cylinder fluid pressure detector 64 detects the rod-side hydraulic pressure Pr (P2r) and the bottom-side hydraulic pressure Pb (P2b) (step S03). The controller calculates the cylinder thrust force Fc which is the relationship in hydraulic pressure between the detected rod-side hydraulic pressure Pr (P2r) and the detected bottom-side hydraulic pressure Pb (P2b) and the contact degree C. based on the cylinder thrust force Fc (step S04).

The controller 20 may cause the display 22 to display the calculated contact degree C. and/or the like. Note that the detection of the hydraulic pressures may be performed while the piston rod(s) of the attachment cylinder(s) 15 is/are moving or not moving. If the hydraulic pressures are detected while the piston rod(s) of the attachment cylinder(s) 15 is/are in action, the cylinder thrust force Fc is calculated via correction in consideration of the sliding resistance of the cylinder(s), as discussed earlier.

The controller 20 compares the calculated contact degree C. with the selected and acquired predetermined contact degree Cpa (steps S05 and S06). If the contact degree C. is greater than the predetermined contact degree Cpa (about 0% to about 1%) (NO in step S05, YES in step S06), the controller 20 determines that the bucket 16A is currently in contact with the soil 17A and in the "insufficient contact state" (or the bucket 16A is currently not in contact with the soil 17A) (step S07), and causes the piston rod(s) of the attachment cylinder(s) 15 to extend to lower the bucket 16A (lower the front portion of the bucket 16A) (step S08). The bucket 16A continues to be lowered until the contact degree C. calculated based on the results of detection by the attachment cylinder fluid pressure detector 64 becomes the predetermined contact degree Cpa (about 0% to about 1%) (YES in step S05).

If the contact degree C. is less than the predetermined contact degree Cpa (about 0% to about 1%) (NO in step S05, NO in step S06), the controller 20 determines that the bucket 16A is currently in contact with the soil 17A in the "excessive contact state" (the bucket 16A is strongly pressed against the soil 17A or the bucket 16A is stuck in the soil 17A) (step S09), and causes the piston rod(s) of the attachment cylinder(s) 15 to retract to raise the bucket 16A (raise the front portion of the bucket 16A) (step $10). The bucket 16A continues to be raised until the contact degree C. calculated based on the results of detection by the attachment cylinder fluid pressure detector 64 becomes the predetermined contact degree Cpa (about 0% to about 1%) (YES in step S05).

Note that, in cases where the bucket 16A is not in the predetermined contact state (in the insufficient contact state or in the excessive contact state), the controller 20 may cause the display 22 to issue an alert or a guidance indication as discussed earlier to prompt the worker to operate the working device 4 (attachment cylinder(s) 15 and/or the like) to bring the bucket 16A into the predetermined contact state, instead of or in addition to the automatic operation of the working device 4 (attachment cylinder(s) 15 and/or the like) as indicated in steps S08 and S10.

If the contact degree C. is the predetermined contact degree Cpa (about 0% to about 1%) (YES in step S05), the controller 20 determines that the bucket 16A is currently in contact with the soil 17A and in the "predetermined (optimal) contact state" (step S11), and causes the display 22 to display a message and/or the like indicating that the bucket 16A is in the predetermined (optimal) contact state (step S12). Furthermore, the controller 20 controls, for example, the position of the attachment control valve 45 (which is a proportional solenoid valve) and/or the like so that the attitude X of the working device 4 (and the bucket 16A) detected by the attitude detector 62 when the bucket 16A is in the predetermined (optimal) contact state, i.e., a proper attitude Xo, is maintained also during the subsequent travel of the working machine 1 for land leveling (leveling of ground) (step S13).

The steps performed by the controller 20 as described above are based on the piece of information Ia including the predetermined contact degree Cpa (=about 0% to about 1%) for the bucket 16A for land leveling (leveling of ground) and the like. Examples of the type of work attachment 16 and content of work that can be achieved by performing substantially the same steps as those shown in FIG. 9 based on the same information as the information Ia include land leveling (leveling of ground) using a dozer blade, snow shoveling using a dozer blade, and the like.

FIG. 2 illustrates a working machine 1 which is cleaning a road surface 17B (contact object 17) by traveling with the sweeper 16B in contact with the road surface 17B. The sweeper 16B includes a main body cover 16Ba, a rotary brush 16Bb located in a front portion of the main body cover 16Ba and having a rotary shaft extending horizontally left to right, and a hydraulic motor 16Bc to drive the rotary shaft of the rotary brush 16Bb.

The space in a rear portion of the main body cover 16Ba that is located rearward of the rotary brush 16Bb is to accommodate dust scraped into the space by the rotary brush 16Bb. The rear end of the main body cover 16Ba is pivotally connected to the distal end portions 10*c* of the left and right lift arms 10 and the heads of the piston rods of the left and right attachment cylinders 15. The hydraulic motor 16Bc is connected to the AUX ports 11 via fluid pipes 16Bd.

When the sweeper 16B maintains an optimal attitude and causes the rotary brush 16Bb to make contact with the road surface 17B at a suitable contact pressure (i.e., when the state of contact between the bottom end of the rotary brush 16Bb and the road surface 17B is a predetermined (optimal) contact state), a preferred cleaning effect is achieved.

Note that, also with regard to evaluating the attitude of the sweeper 16B when the sweeper 16B is brought into contact with the road surface 17B, it is in fact necessary to calculate both the relationship in hydraulic pressure regarding the lift arm cylinder(s) 14 (relationship between the rod-side hydraulic pressure P1r and the bottom-side hydraulic pressure P1b) and the relationship in hydraulic pressure regarding the attachment cylinder(s) (relationship between the rod-side hydraulic pressure P2r and the bottom-side hydraulic pressure P2b). It is assumed also here that, however, for ease of description, the contact state of the sweeper 16B (contact degree C.) is determined based on the relationship in hydraulic pressure (cylinder thrust force Fc) regarding the attachment cylinder(s) 15, based on the assumption that the lift arms 10 have already been placed by the extension/retraction of the lift arm cylinders 14 in an optimal position.

The predetermined (optimal) state of contact between the sweeper 16B and the road surface 17B is preferably a state in which the main body cover 16Ba is spaced above from the road surface 17B to some extent and only the bottom end of the rotary brush 16Bb is in contact with the road surface 17B. In such a state, the weight of the sweeper 16B is applied on the pistons of the attachment cylinders 15, and the cylinder thrust force Fc is acting in the direction of retraction of the piston rods. That is, the predetermined contact degree Cp required for the sweeper 16B is greater than the predetermined contact degree Cpa of the bucket 16A that is set on the assumption that the bottom surface of the bucket 16A is in surface contact with the surface of the soil 17A.

While the rotary brush 16Bb is rotating, the cylinder thrust force Fc acting on the attachment cylinders 15 in the direction of retraction of the piston rods is greater than while the rotary brush 16Bb is in the stopped state, because of the "jacking up" force acting on the sweeper 16B (or because a force that raises the sweeper 16B is generated). Therefore, it is preferable that there are two different predetermined contact degrees Cp for the sweeper 16B in the stopped state and for the sweeper 16B in the rotating state.

Thus, the following predetermined contact degrees Cp are set for the sweeper 16B: a predetermined contact degree Cpb1 for the rotary brush 16Bb in the stopped state (hereinafter referred to as "predetermined contact degree Cpb1 for stopped state" for short); and a predetermined contact degree Cpb2 for the rotary brush 16Bb in the rotating state (hereinafter referred to as "predetermined contact degree Cpb2 for driven state" for short). The predetermined contact degree Cpb1 for stopped state may be, for example, about 6% to about 7%. The predetermined contact degree Cpb2 for driven state may be, for example, about 10% to about 11%. These are included in the piece of information Ib relating to the sweeper 16B stored in the memory 21 of the working machine 1 or a storage unit (such as a microchip) of the sweeper 16B.

Figure 10A:
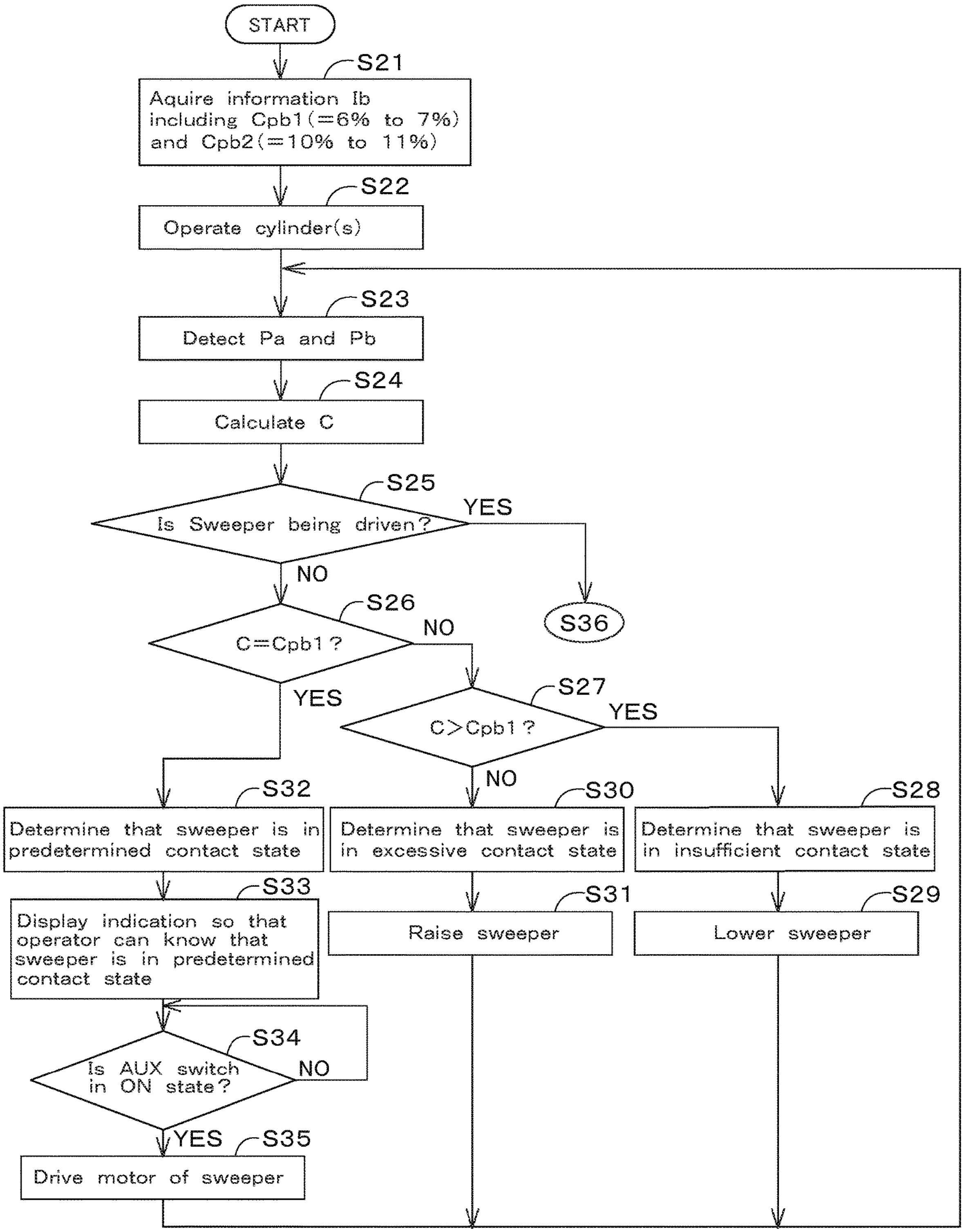
FIG. 10A is a control flowchart showing steps of evaluating the state of contact of a sweeper and controlling a working device and/or the like based on the evaluation when cleaning as illustrated in FIG. 2 is performed.
Figure 10B:
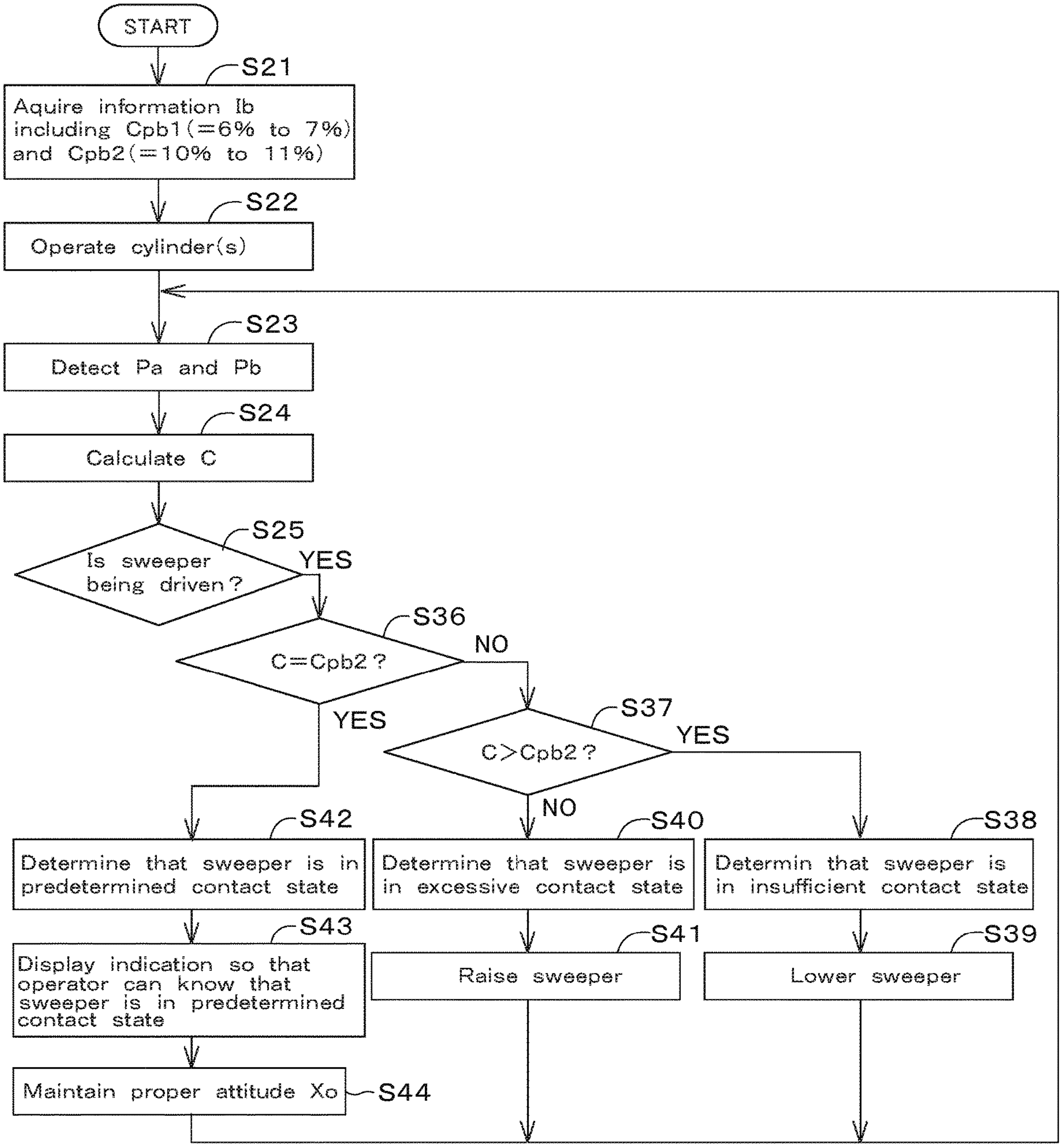
FIG. 10B is a control flowchart continuing from FIG. 10A.

The following description discusses a control flow for cleaning the road surface 17B using the sweeper 16B, with reference to FIGS. 10A and 10B.

First, the controller 20 acquires a piece of information Ib relating to the sweeper 16B in response to selection of a corresponding icon 101 in the attachment list 65 and/or by receiving a signal from the sweeper 16B actually attached to the working device 4 as discussed earlier, for example (step S21). The piece of information Ib includes the predetermined contact degree Cpb1 for stopped state which is one of the predetermined contact degrees Cp required for the sweeper 16B (about 6% to about 7%), the predetermined contact degree Cpb2 for driven state which is the other of the predetermined contact degrees Cp required for the sweeper 16B (about 10% to about 11%), and/or the like.

Before the cleaning is started, the attachment cylinders 15 are operated to bring the sweeper 16B (the rotary brush 16Bb of the sweeper 16B) into contact with the road surface 17B (step S22), during which the attachment cylinder fluid pressure detector 64 detects the rod-side hydraulic pressure Pr (P2r) and the bottom-side hydraulic pressure Pb (P2b) (step S23). The controller 20 calculates the cylinder thrust force Fc which is the relationship in hydraulic pressure between the detected rod-side hydraulic pressure Pr (P2r) and the detected bottom-side hydraulic pressure Pb (P2b) and the contact degree C. based on the cylinder thrust force Fc (step S24).

The controller 20 may cause the display 22 to display the calculated contact degree C. and/or the like. Note that the detection of the hydraulic pressures may be performed while the piston rods of the attachment cylinders 15 are moving or not moving. If the hydraulic pressures are detected while the piston rods of the attachment cylinders 15 are in action, the cylinder thrust force Fc is calculated via correction in consideration of the sliding resistance of the cylinders, as discussed earlier.

Before the controller 20 determines whether or not the sweeper 16B is in the predetermined contact state, the controller 20 first determines whether the sweeper 16B is being driven (i.e., whether the rotary brush 16Bb is rotating) or in the stopped state (i.e., whether the rotary brush 16Bb is in the stopped state) (step S25).

If the sweeper 16B is in the stopped state (No in step S25), the controller 20 compares the calculated contact degree C. with the predetermined contact degree Cpb1 for stopped state included in the acquired piece of information Ib (steps S26, S27). If the contact degree C. is greater than the predetermined contact degree Cpb1 for stopped state (about 6% to about 7%) (NO in step S26, YES in step S27), the controller 20 determines that the sweeper 16B is currently in contact with the road surface 17B and in the "insufficient contact state" (the rotary brush 16Bb is spaced from the road surface 17B or the rotary brush 16Bb only applies a weak pressing force on the road surface 17B and therefore dust etc. on the road surface 17B would not be sufficiently scraped into the sweeper 16B even if the rotary brush 16Bb starts being driven now, for example) (step S28), and causes the piston rods of the attachment cylinders 15 to extend to press down the sweeper 16B (front portion of the sweeper 16B) (step S29). The sweeper 16B continues to be lowered until the contact degree C. calculated based on the results of detection by the attachment cylinder fluid pressure detector 64 becomes the predetermined contact degree Cpb1 for stopped state (about 6% to about 7%) (YES in step S26).

If the contact degree C. is less than the predetermined contact degree Cpb1 for stopped state (about 6% to about 7%) (NO in step S26, NO in step S27), the controller 20 determines that the sweeper 16B is currently in contact with the road surface 17B and in the "excessive contact state" (the rotary brush 16Bb applies too great a pressing force on the road surface 17B and the rotary brush 16Bb would not rotate well and reduce the cleaning efficiency even if the hydraulic motor 16Bc starts being driven now, and/or the main body cover 16Ba is in contact with the road surface 17B) (step S30), and causes the piston rods of the attachment cylinders 15 to retract to raise the sweeper 16B (raise the front portion of the sweeper 16B (step S31). The sweeper 16B continues to be raised until the contact degree C. calculated based on the results of detection by the attachment cylinder fluid pressure detector 64 becomes the predetermined contact degree Cpb1 for stopped state (about 6% to about 7%) (YES in step S26).

If the contact degree C. is the predetermined contact degree Cpb1 for stopped state (about 6% to about 7%) (YES in step S26), the controller 20 determines that the sweeper 16B is currently in contact with the road surface 17B and in the "predetermined (optimal) contact state" and the rotary brush 16Bb is in the stopped state (step S32), and causes the display 22 to display a message and/or the like to indicate that the sweeper 16B is in the predetermined (optimal) contact state (step S33).

When the operator here turns ON the foregoing AUX switch 18 (YES in step S34), the controller 20 controls the solenoid valve(s) 47 and/or 48 to switch the position of the AUX control valve 46 to drive the hydraulic motor 16Bc of the sweeper 16B, thus rotating the rotary brush 16Bb (step S35).

After that, the controller 20 determines that the sweeper 16B is being driven (i.e., the rotary brush 16Bb is rotating) (YES in step S25), and compares the contact degree C. calculated based on the results of detection by the attachment cylinder fluid pressure detector 64 with the predetermined contact degree Cpb2 for driven state (about 10% to about 11%) included in the acquired piece of information Ib (steps S36, S37).

Note that the predetermined contact degree Cpb2 for driven state is set in consideration of how the cylinder thrust force Fc of the attachment cylinders 15 would change when the rotary brush 16Bb of the sweeper 16B, which is in the predetermined contact state while in the stopped state, is rotated/driven. Therefore, merely bringing the sweeper 16B (rotary brush 16Bb) from the stopped state into the driven state (turning the AUX switch 18 from OFF to ON) should basically suffice to change the contact degree C. from the value equivalent to the predetermined contact degree Cpb1 for stopped state (about 6% to about 7%) to a value equivalent to the predetermined contact degree Cpb2 for driven state (about 10% to about 11%) (YES in step S36), without having to perform an operation to change the attitude of the sweeper 16B such as an operation to cause the piston rods of the attachment cylinders 15 to extend or retract.

While the sweeper 16B is being driven (while the rotary brush 16Bb is rotating), if the contact degree C. is not the predetermined contact degree Cpb2 for driven state (NO in S36), the controller 20 causes, for example, the piston rods of the attachment cylinders 15 to extend or retract to bring the sweeper 16B into the predetermined contact state, similarly to the case where the sweeper 16B (rotary brush 16Bb) is in the stopped state.

Specifically, if the contact degree C. is greater than the predetermined contact degree Cpb2 for driven state (about 10% to about 11%) (NO in step S36, YES in step S37), the controller 20 determines that the sweeper 16B is currently in contact with the road surface 17B in the "insufficient contact state" and the rotary brush 16Bb is currently rotating (step S38), and causes the piston rods of the attachment cylinders 15 to extend to press down the sweeper 16B (front portion of the sweeper 16B) (step S39). The sweeper 16B continues to be lowered until the contact degree C. calculated based on the results of detection by the attachment cylinder fluid pressure detector 64 becomes the predetermined contact degree Cpb2 for driven state (about 10% to about 11%) (YES in step S36).

If the contact degree C. is less than the predetermined contact degree Cpb2 for driven state (about 10% to about 11%) (NO in step S36, NO in step S37), the controller 20 determines that the sweeper 16B is currently in contact with the road surface 17B and in the "excessive contact state" and the rotary brush 16Bb is currently rotating (step S40), and causes the piston rods of the attachment cylinders 15 to retract to raise the sweeper 16B (front portion of the sweeper 16B) (step S41). The sweeper 16B continues to be raised until the contact degree C. calculated based on the results of detection by the attachment cylinder fluid pressure detector 64 becomes the predetermined contact degree Cpb2 for driven state (about 10% to about 11%) (YES in step S36).

If the contact degree C. is the predetermined contact degree Cpb2 for driven state (about 10% to about 11%) (YES in step S36), the controller 20 determines that the sweeper 16B is currently in contact with the road surface 17B and in the "predetermined (optimal) contact state" and the rotary brush 16Bb is currently rotating (step S42), and causes the display 22 to display a message and/or the like to indicate that the sweeper 16B is in the predetermined (optimal) contact state (step S43). Furthermore, the controller 20 controls, for example, the positions of the lift arm control valve 44 and the attachment control valve 45 (which are proportional solenoid valves) so that the attitude X of the working device 4 (and the sweeper 16B) detected by the attitude detector 62 when the sweeper 16B is in the predetermined (optimal) contact state, i.e., a proper attitude Xo, is maintained also during the subsequent travel of the working machine 1 for cleaning (step S44).

Note that, in cases where the sweeper 16B is not in the predetermined contact state (in the insufficient contact state or in the excessive contact state) regardless of whether the rotary brush 16Bb is rotating or in the stopped state, the controller 20 may cause the display 22 to issue an alert or a guidance indication as discussed earlier to prompt the worker to operate the working device 4 (attachment cylinders 15 and the like) to bring the sweeper 16B into the predetermined contact state, instead of or in addition to the automatic operation of the working device 4 (attachment cylinders 15 and the like) as indicated in steps S29, S31, S39, and S41.

Examples of the work attachment 16 including a main body which has a driven member to be driven by hydraulic fluid from the AUX ports 11 and which should be instructed to be spaced above from the ground surface, such as the sweeper 16B as illustrated in FIG. 2, include an angle broom including a brush having a similar horizontal rotation shaft, a snow blower including an auger having a horizontal shaft, and a brush cutter and a mower which include a rotary blade having a vertical rotation shaft. Also in cases of these work attachments 16, the controller 20 may evaluate the contact state of the work attachment 16, bring the contact state into a predetermined (optimal) contact state, and maintain the predetermined (optimal) contact state during work/travel of the working machine 1 with reference to the control flow shown in FIGS. 10A and 10B.

FIG. 3 illustrates a working machine 1 performing crushing of a to-be-crushed object 17C which is a contact object 17 by bringing a hydraulic breaker 16C into contact with the to-be-crushed object 17C such as a concrete block. The hydraulic breaker 16C includes a main body 16Ca and a chisel 16Cb in the form of a rod projecting from the main body 16Ca.

The main body 16Ca contains therein a piston to be driven by hydraulic pressure. The movement of the piston is transmitted to the chisel 16Cb, and the to-be-crushed object 17C in contact with the chisel 16Cb is crushed. Hydraulic fluid to apply hydraulic pressure to drive the piston in the main body 16Ca is supplied from the AUX ports 11 of the working machine 1 into the main body 16Ca via fluid pipes 16Cc.

The hydraulic breaker 16C is attached to the working device 4 such that the hydraulic breaker 16C is fixed non-rotatably to the distal end portions 10*c* of the left and right lift arms 10. That is, the piston rods of the attachment cylinders 15 usually do not extend or retract to move the hydraulic breaker 16C, and the hydraulic breaker 16C is moved only by the up and down movements of the lift arms 10 caused by the extension and retraction of the piston rods of the lift arm cylinders 14.

Therefore, the state of contact between the hydraulic breaker 16C and the to-be-crushed object 17C (contact degree C.) is evaluated based on the relationship in hydraulic pressure regarding the lift arm cylinders 14 (cylinder thrust force Fc) calculated based on the results of detection by the lift arm cylinder fluid pressure detector 63.

It follows that the cylinder thrust force Fc obtained by substituting the rod-side hydraulic pressure P1r and the bottom-side hydraulic pressure P1b detected by the lift arm cylinder fluid pressure detector 63 into the foregoing expression is a force acting in the direction of retraction of the piston rods, i.e., a force acting in the direction in which the lift arms 10 are lowered.

The predetermined contact state (predetermined contact degree Cp) for the state of contact between the hydraulic breaker 16C (chisel 16Cb of the hydraulic breaker 16C) and the to-be-crushed object 17C is a criterion for making a judgment to avoid the "insufficient contact state" in which the hydraulic breaker 16C is likely to be damaged, as discussed earlier. Assuming that the predetermined contact degree Cp for the hydraulic breaker 16C is a predetermined contact degree Cpc, the predetermined contact degree Cpc may be, for example, about 10%. The predetermined contact degree Cpc is included in the piece of information Ic relating to the hydraulic breaker 16C stored in the memory 21 of the working machine 1 or the storage unit (such as a microchip) of the sweeper 16B.

Figure 11:
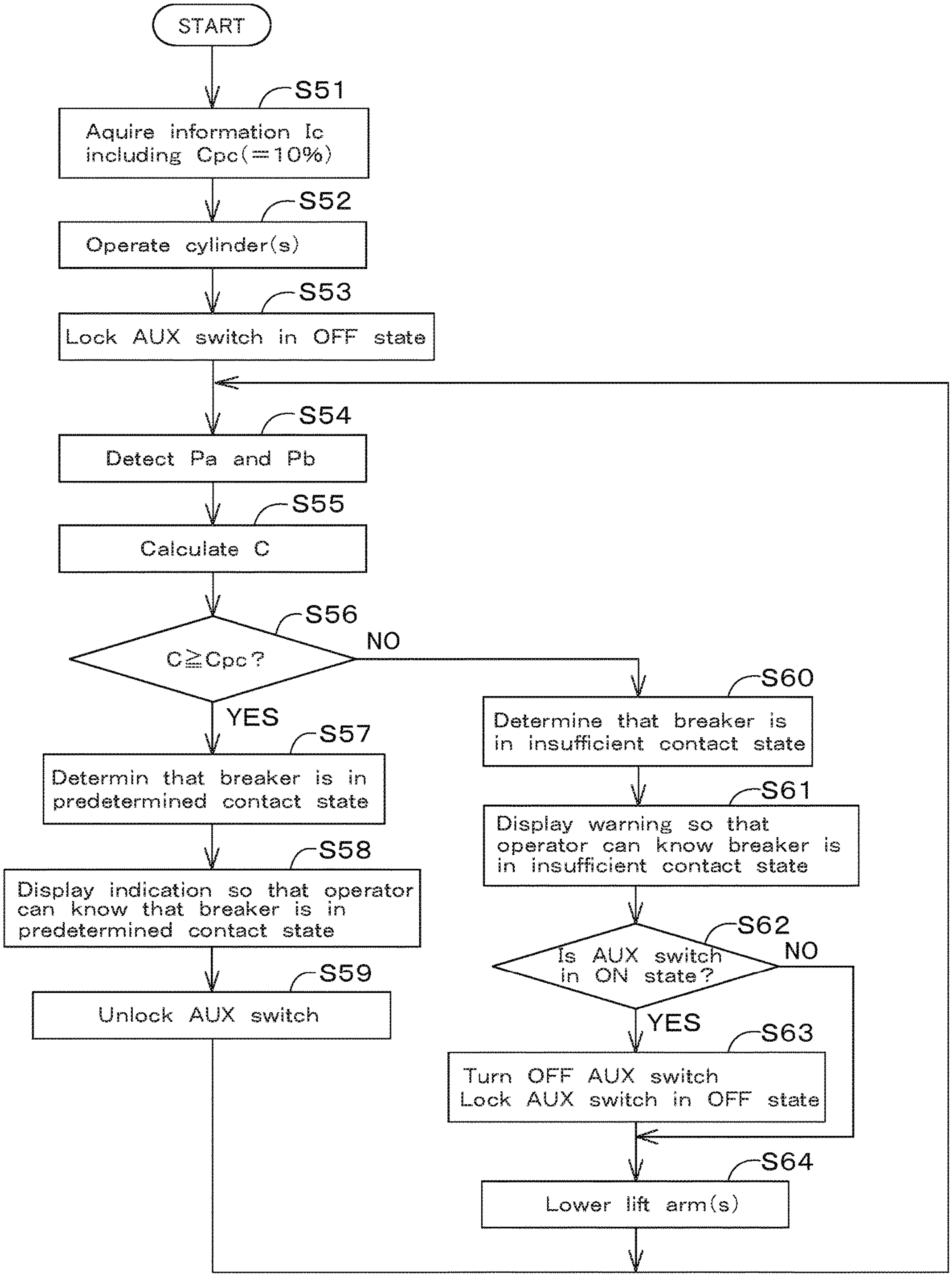
FIG. 11 is a control flowchart showing steps of evaluating the state of contact of a hydraulic breaker and controlling a working device and/or the like based on the evaluation when crushing as illustrated in FIG. 3 is performed.

The following description discusses a control flow for crushing of the to-be-crushed object 17C (such as a concrete block) using the hydraulic breaker 16C, with reference to FIG. 11.

First, the controller 20 acquires a piece of information Ic relating to the hydraulic breaker 16C in response to selection of a corresponding icon 101 in the attachment list 65 and/or by receiving a signal from the hydraulic breaker 16C actually attached to the working device 4 as discussed earlier, for example (step S51). The piece of information Ic includes the predetermined contact degree Cpc (=about 10%) required for the hydraulic breaker 16C and/or the like, as described earlier.

Before crushing is started, the controller 20 first locks the AUX switch 18 in an OFF position (step S52). That is, the AUX switch 18 is prevented from being switched to an ON state even if the operator operates the AUX switch 18. This prohibits the driving of the hydraulic breaker 16C.

While the AUX switch 18 is kept in the OFF position, the lift arm cylinders 14 (piston rods of the lift arm cylinders 14) extend or retract to raise or lower the lift arms 10 (step S53) to bring the hydraulic breaker 16C close to the to-be-crushed object 17C and into contact with the to-be-crushed object 17C. Such extension or retraction of the lift arm cylinders 14 may be achieved by the operator operating the work operation lever 9 or the controller 20 controlling the working device 4 in response to the operator's operation of a switch and/or the like.

While the lift arms 10 are in operation, the lift arm cylinder fluid pressure detector 63 detects the rod-side hydraulic pressure Pr (P1r) and the bottom-side hydraulic pressure Pb (P1b) (step S54). The controller 20 calculates the cylinder thrust force Fc which is the relationship in hydraulic pressure between the detected rod-side hydraulic pressure Pr and the detected bottom-side hydraulic pressure Pb and the contact degree C. based on the cylinder thrust force Fc (step S55).

The controller 20 may cause the display 22 to display the calculated contact degree C. and/or the like. Note that the detection of the hydraulic pressures may be performed while the lift arms 10 in operation are moving or not moving. If the hydraulic pressures are detected while the lift arms 10 are moving, the cylinder thrust force Fc is calculated via correction in consideration of the sliding resistance of the cylinders, as discussed earlier.

The controller 20 compares the calculated contact degree C. withe the predetermined contact degree Cpc (about 10%) included in the acquired piece of information Ic (step S56). If the contact degree C. is greater than the predetermined contact degree Cpc (about 10%) (YES in step S56), the controller 20 determines that the hydraulic breaker 16C is currently in contact with the to-be-crushed object 17C and in the "predetermined contact state" (step S57), and causes the display 22 to display a message and/or the like to notify the worker of such (step S58) and unlocks the AUX switch 18 (step S59). That is, the controller allows driving of the hydraulic breaker 16C.

If the contact degree C. is less than the predetermined contact degree Cpc (about 10%) (NO in step S56), the controller 20 determines that the hydraulic breaker 16C is currently in contact with the to-be-crushed object 17C in the "insufficient contact state" (the chisel 16Cb is spaced above from the to-be-crushed object 17C, or the chisel 16Cb for example applies only a weak pressing force on the to-be-crushed object 17C and the hydraulic breaker 16C would be easily damaged if the chisel 16Cb starts being driven now) (step S60), and causes the display 22 to display a message indicating such (step S61).

The controller 20 determines whether or not the AUX switch 18 here is in the ON position (whether or not the hydraulic breaker 16C is in the driven state) (step S62). If the AUX switch 18 is in the ON position (YES in step S62), the controller 20 brings the AUX switch 18 into the OFF position and locks the AUX switch 18 in the OFF position (step S63).

After that, the controller 20 causes the piston rods of the lift arm cylinders 14 to retract to lower the lift arms 10, to increase the cylinder thrust force Fc of the lift arm cylinders 14 (step S64). The lift arms 10 continue to be lowered until the contact degree C. calculated based on the results of detection by the lift arm cylinder fluid pressure detector 63 becomes the predetermined contact degree Cpc (about 10%) (YES in step S56).

Note that, in cases where the hydraulic breaker 16C is in the insufficient contact state, the controller 20 may cause the display 22 to issue an alert or a guidance indication as discussed earlier to prompt the worker to operate the working device 4 (lift arm cylinders 14 and the like) to bring the hydraulic breaker 16C into the predetermined contact state, instead of or in addition to the automatic operation of the working device 4 (lift arm cylinders 14 and the like) as indicated in step S64.

The steps performed by the controller 20 as discussed above are based on the piece of information Ic including, for example, the predetermined contact degree Cpc (=about 10%) for the hydraulic breaker 16C for when performing crushing and determination of whether or not to allow the operation to turn ON the AUX switch 18. In cases of work attachments 16 which need to be in contact with a contact object while applying a predetermined pressing force or greater force on the contact object similarly to the hydraulic breaker 16C, a desired effect of the work would be achieved by performing substantially the same steps as those shown in FIG. 11 based on information similar to the information Ic.

FIG. 4 illustrates a working machine 1 performing work to dig into soil 17D (make a hole in the soil 17D) by starting driving and rotating the earth auger 16D in contact with the soil 17D. The earth auger 16D includes a fixed plate 16Da fixed non-rotatably to the distal end portions 10*c* of the left and right lift arms 10, a motor housing 16 Db pivotally supported on the widthwise center of the fixed plate 16Da via a universal joint, and an auger shaft 16Dc projecting downward from the motor housing 16 Db. The motor housing 16 Db contains therein a hydraulic motor which is a hydraulic actuator to rotate and drive the auger shaft 16Dc. The hydraulic motor is connected to the AUX ports 11 via fluid pipes 16Dd.

The position of the distal end of the auger shaft 16Dc when the distal end of the auger shaft 16Dc of the earth auger 16D is in contact with the surface of the soil 17D and in the predetermined contact state is defined as the position at a depth-of-excavation of 0 (zero). The distance of the distal end of the auger shaft 16Dc which is caused to move downward from the depth-of-excavation D of 0 in the soil 17D by driving the earth auger 16D, from the position at a depth-of-excavation of 0 is the depth-of-excavation D which is the depth of the hole formed by the excavation. That is, because the position of the earth auger 16D at a depth-of-excavation of 0 is defined, the error between the depth of the hole formed and the depth-of-excavation D of the earth auger 16D is eliminated, making it possible to accurately make a hole having a desired depth.

Also in the case of the earth auger 16D, the state of contact of the earth auger 16D with the soil 17D (contact degree C.) is evaluated based on the relationship in hydraulic pressure (cylinder thrust force Fc) regarding the lift arm cylinders 14 calculated based on the results of detection by the lift arm cylinder fluid pressure detector 63. Note that the cylinder thrust force Fc calculated in such a case is also a force acting in the direction in which the lift arms 10 are lowered, i.e., a force acting in the direction of retraction of the lift arm cylinders 14.

The predetermined contact state (predetermined contact degree Cp) of the earth auger 16D (auger shaft 16Dc of the earth auger 16D) and the soil 17D preferably has a value corresponding to the position of the distal end of the auger shaft 16Dc at the point in time at which a depth-of-excavation of 0 is defined. Assuming that the predetermined contact degree Cp for the earth auger 16D is a predetermined contact degree Cpd, the predetermined contact degree Cpd may be, for example, about 3%. Such a predetermined contact degree Cpd is included in the piece of information Id relating to the earth auger 16D stored in the memory 21 of the working machine 1 or a storage unit (such as a microchip) of the earth auger 16D.

In the present example, the display 22 displays a depth-of-excavation gauge 67 as illustrated in FIG. 8, and the current depth-of-excavation D, which is the position of the distal end of the auger shaft 16Dc with respect to the soil 17D, is indicated such that, for example, the current depth-of-excavation D matches a mark indicative of the corresponding depth on the depth-of-excavation gauge 67. Furthermore, the display 22 is configured to receive input of a target depth Dt. The inputted target depth Dt is indicated such that, for example, the target depth Dt matches a mark indicating the corresponding depth on the depth-of-excavation gauge 67.

Figure 12:
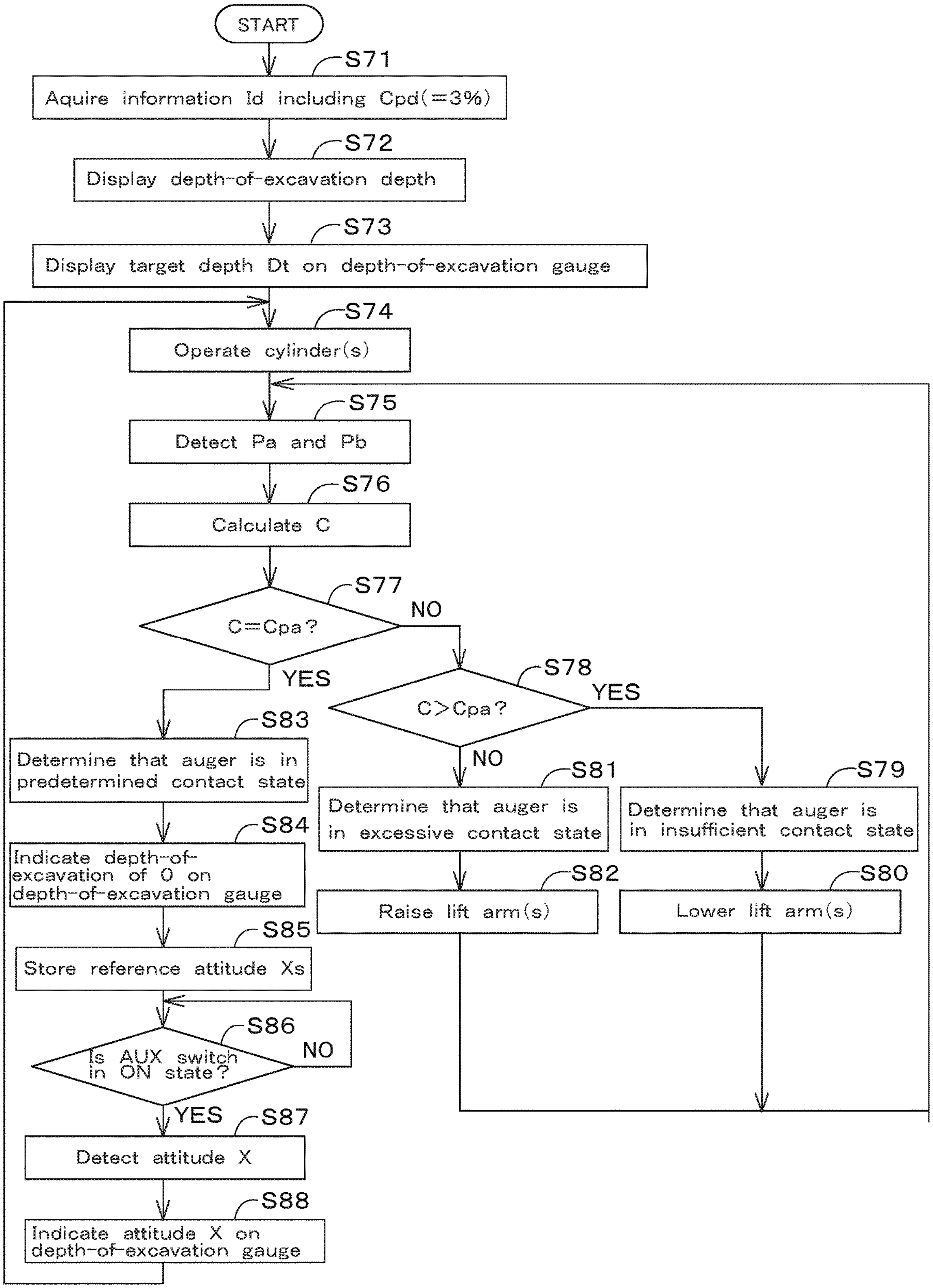
FIG. 12 is a control flowchart showing steps of evaluating the state of contact of an earth auger and controlling a working device and/or the like based on the evaluation when excavation (making a hole) as illustrated in FIG. 4 is performed.

The following description discusses a control flow for digging into the soil 17D (making a hole in the soil 17D) using the earth auger 16D, with reference to FIG. 12.

First, the controller 20 acquires a piece of information Id relating to the earth auger 16D in response to selection of a corresponding icon 101 in the attachment list 65 and/or by receiving a signal from the earth auger 16D actually attached to the working device 4 as discussed earlier, for example (step S71). The piece of information Id includes the predetermined contact degree Cpd (=about 3%) required for the earth auger 16D and/or the like, as described earlier.

The piece of information Id relating to the earth auger 16D also includes a signal indicating a command to display the depth-of-excavation gauge 67 as illustrated in FIG. 8. The controller 20, upon acquisition of the information Id, causes the display 22 to display the depth-of-excavation gauge 67 (step S72).

The display 22 is configured to receive input of the target depth Dt, as described earlier. The controller 20 causes the inputted target depth Dt to be displayed on the depth-of-excavation gauge 67 such that, for example, the corresponding mark on the depth-of-excavation gauge 67 is indicated in a marked manner (step S73, see FIG. 8).

Before the excavation (drilling, making a hole) is started, the lift arm cylinders 14 (piston rods of the lift arm cylinders 14) extend or retract to raise or lower the lift arms 10 (step S74) to bring the earth auger 16D close to the soil 17D and into contact with the soil 17D. Such extension or retraction of the lift arm cylinders 14 may be achieved by the operator operating the work operation lever 9 or the controller 20 controlling the working device 4 in response to the operator's operation of a switch and/or the like.

While the lift arms 10 are in operation, the lift arm cylinder fluid pressure detector 63 detects the rod-side hydraulic pressure Pr (P1r) and the bottom-side hydraulic pressure Pb (P1b) (step S75). The controller 20 calculates the cylinder thrust force Fc which is the relationship in hydraulic pressure between the detected rod-side hydraulic pressure Pr and the detected bottom-side hydraulic pressure Pb and the contact degree C. based on the cylinder thrust force Fc (step S76).

The controller 20 may cause the display 22 to display the calculated contact degree C. and/or the like. Note that the detection of the hydraulic pressures may be performed while the lift arms 10 in operation are moving or not moving. If the hydraulic pressures are detected while the lift arms 10 are moving, the cylinder thrust force Fc is calculated via correction in consideration of the sliding resistance of the cylinders, as discussed earlier.

Note that the controller 20 may keep the AUX switch 18 locked in the OFF position until the state of contact between the earth auger 16D and the soil 17D becomes the predetermined contact state. This makes it possible to eliminate or reduce the likelihood that the distal end of the rotating auger shaft 16Dc will drill the soil 17D upon contact with the soil 17D and the position of the distal end will not accurately define a depth-of-excavation 0.

The controller 20 compares the calculated contact degree C. with the predetermined contact degree Cpd (about 3%) included in the acquired piece of information Id (steps S77, S78). If the contact degree C. is less than the predetermined contact degree Cpd (about 3%) (No in step S77, NO in step S78), the controller 20 determines that the earth auger 16D is currently in contact with the soil 17D and in the "insufficient contact state" (the auger shaft 16Dc is spaced from the soil 17D or the auger shaft 16Dc applies only a weak pressing force on the soil 17D, for example) (step S79), and causes the piston rods of the lift arm cylinders 14 to retract to lower the lift arms 10 to press down the earth auger 16D (step S80). The earth auger 16D continues to be lowered until the contact degree C. calculated based on the results of detection by the lift arm cylinder fluid pressure detector 63 becomes the predetermined contact degree Cpd (about 3%) (YES in step S77).

If the contact degree C. is greater than the predetermined contact degree Cpd (about 3%) (No in step S77, YES in step S78), the controller 20 determines that the earth auger 16D is currently in contact with the soil 17D and in the "excessive contact state" (the distal end of the auger shaft 16Dc may be stuck in the soil 17D and the position of the distal end does not accurately define a depth-of-excavation of 0) (step S81), and causes the piston rods of the lift arm cylinders 14 to extend to raise the lift arms 10 to raise the earth auger 16D (step S82). The earth auger 16D continues to be raised until the contact degree C. calculated based on the results of detection by the lift arm cylinder fluid pressure detector 63 becomes the predetermined contact degree Cpd (about 3%) (YES in step S77).

Note that, in cases where the earth auger 16D is not in the predetermined contact state (in the insufficient contact state or excessive contact state), the controller 20 may cause the display 22 to issue an alert or a guidance indication as discussed earlier to prompt the worker to operate the working device 4 (lift arm cylinders 14 and the like) to bring the earth auger 16D into the predetermined contact state, instead of or in addition to the automatic operation of the working device 4 (lift arm cylinders 14 and the like) as indicated in steps S80 and S82.

If the contact degree C. is the predetermined contact degree Cpd (about 3%) (YES in step S77), the controller 20 confirms that the earth auger 16D is currently in contact with the soil 17A and in the "predetermined contact state" (step S83), defines the current position of the distal end (lower end) of the auger shaft 16Dc of the earth auger 16D in the predetermined contact state as a depth-of-excavation 0, and causes the position to be displayed such that, for example, the corresponding mark on the depth-of-excavation gauge 67 displayed on the display 22 is shown in a marked manner (step S84, see FIG. 8).

After confirming that the earth auger 16D is in the predetermined contact state and defining the position of the earth auger 16D as a depth-of-excavation of 0, assuming that the attitude X of the working device 4 (lift arms 10) obtained here is a reference attitude Xs, the controller 20 acquires the reference attitude Xs of the working device 4 (lift arms 10) based on the results of detection by the attitude detector 62 (such as the angle of the lift arms 10 to the machine body 2 and/or the degree of extension of the lift arm cylinders 14) obtained here, and causes the memory 21 to store the reference attitude Xs (step S85).

Upon confirmation that the earth auger 16D is in the predetermined contact state, the controller 20 automatically rotates the auger shaft 16Dc or the operator turns ON the AUX switch 18 (step S86) to rotate the auger shaft 16Dc. After that, the operator operates the work operation lever 9 to cause the lift arm cylinders 14 to retract to lower the lift arms 10, thus causing the auger shaft 16Dc to dig into the soil 17D. While the lift arms 10 are lowered as such, the controller 20 receives a signal indicating the attitude X (such as the angle of the lift arms 10 to the machine body 2 and/or the degree of extension of the lift arm cylinders 14) of the working device 4 detected by the attitude detector 62 (step S87).

The controller 20 recognizes the current attitude X of the working device 4 based on the result of detection by the attitude detector 62, calculates the amount of change in the position of the earth auger 16D in the vertical direction based on a difference of the current attitude X from the reference attitude Xs (the attitude X of the working device 4 with its earth auger 16D in the predetermined contact state) stored in the memory 21, and causes the display 22 to display the depth-of-excavation D corresponding to the amount of change using the depth-of-excavation gauge 67 (step S88, see FIG. 8).

The operator can recognize the difference between the depth-of-excavation D and the target depth Dt which are displayed on the depth-of-excavation gauge 67, and therefore the operator can operate the work operation lever 9 based on the recognition to bring the depth-of-excavation D close to the target depth Dt, eventually making it possible to make a hole having the target depth Dt in the soil 17D.

Note that the controller 20 is capable of calculating the attitude of the working device 4 having its earth auger 16D positioned at the inputted target depth Dt. Therefore, the following arrangement may be used: the controller 20 automatically lowers the lift arms 10 to bring the attitude of the working device 4, corresponding to the depth-of-excavation D recognized based on the result of detection by the attitude detector 62, close to the attitude of the working device 4 corresponding to the target depth Dt to automatically make a hole having the target depth Dt.

Examples of the work attachment 16 such as the earth auger 16D as illustrated in FIG. 4, for which it is confirmed that the state of contact between the earth auger 16D and the contact object 17 (soil 17D) is the predetermined contact state and then a work product such as a drilled hole is formed in the contact object 17 and the work product is completed by causing the degree of work done such as the depth-of-excavation D to reach the target value, include a trencher which is a machine to dig a trench in soil, in addition to the earth auger 16D.

Also in cases of a trencher, the controller 20 may evaluate the contact state of the work attachment 16, define the position of the working attachment 16 as a depth-of-excavation of 0 based on the contact state defined as the predetermined contact state, and cause the trencher to dig a trench in the soil such that the actual depth-of-excavation reaches the target depth, with reference to the control flow in FIG. 12.

A working machine 1 includes: a machine body 2: at least one support member (lift arm 10) supported on the machine body 2 and connectable to a work attachment 16 to do work by making contact with an object 17 to be contacted; at least one hydraulic cylinder 14 (or 15) extendable and retractable to move the work attachment 16 connected to the at least one support member (lift arm 10), the at least one hydraulic cylinder 14 (or 15) including a rod-side fluid chamber 14*a* (or 15*a*) and a bottom-side fluid chamber 14*b* (or 15*b*) separated by a piston; a rod-side pressure detector 63*a* (or 64*a*) to detect a rod-side hydraulic pressure Pr (P1r or P2r) which is a pressure of hydraulic fluid in communication with the rod-side fluid chamber 14*a* (or 15*a*) of the at least one hydraulic cylinder 14 (or 15): a bottom-side pressure detector 63*b* (or 64*b*) to detect a bottom-side hydraulic pressure Pb (P1b or P2b) which is a pressure of hydraulic fluid in communication with the bottom-side fluid chamber 14*b* (or 15*b*) of the at least one hydraulic cylinder 14 (or 15); and a controller 20 to calculate a relationship in pressure (cylinder thrust force Fc) between the rod-side hydraulic pressure Pr (P1r or P2r) detected by the rod-side pressure detector 63*a* (or 64*a*) and the bottom-side hydraulic pressure Pb (P1b or P2b) detected by the bottom-side pressure detector 63*b* (or 64*b*) and evaluate, based on the calculated relationship in pressure (cylinder thrust force Fc), a contact state which is a state of contact of the work attachment 16 with the object 17.

The state of contact between the work attachment 16 and the object 17 is accurately determined as such. This makes it possible, for example, to eliminate or reduce the likelihood that an unintended or inaccurate work product will result from an inappropriate contact state, and hydraulic actuator(s) and/or the like of the work attachment 16 will be damaged because of the inappropriate contact state, making it possible for unskilled operators to easily achieve suitable work products using the work attachment 16. Furthermore, the state of contact is evaluated based on the detection of the rod-side hydraulic pressure Pr by the rod-side pressure detector 63*a* (or 64*a*) and the detection of the bottom-side hydraulic pressure Pb by the bottom-side pressure detector 63*b* (64*b*). This eliminates the need for special, complex, and costly devices and thus makes it possible to provide a working machine 1 suitable also economically.

The working machine 1 may further include a memory 21 to store a predetermined contact degree Cp, the predetermined contact degree Cp being a degree to which the work attachment 16 is in contact with the object 17 when the work attachment 16 is in a predetermined contact state. The controller 20 may be configured or programmed to: calculate, based on the calculated relationship in pressure (cylinder thrust force Fc), a current contact degree C. which is a degree to which the work attachment 16 is currently in contact with the object 17; compare the current contact degree C. with the stored predetermined contact degree Cp; and determine whether or not the work attachment 16 is in the predetermined contact state.

By comparing the predetermined contact degree Cp and the contact degree C. calculated based on the relationship in hydraulic pressure (cylinder thrust force Fc) which can be easily calculated as described above, it is possible to easily obtain the result of determination of whether the work attachment 16 is in the predetermined contact state.

The working machine 1 may further include an attitude detector 62 to detect an attitude X of the work attachment 16 and/or the at least one support member (lift arm 10). The controller 20 may be configured or programmed to: if the controller 20 compares the calculated contact degree C. with the predetermined contact degree Cp and determines that the work attachment 16 is in the predetermined contact state, recognize, as a reference attitude Xs, the attitude X detected by the attitude detector 62 at a point in time at which the controller determined that the work attachment 16 was in the predetermined contact state; and based on a change in the attitude X detected by the attitude detector 62 from the reference attitude Xs, measure a degree of work done (depth-of-excavation D) represented as a change in position of the work attachment 16 relative to the object 17.

A change in attitude X of the work attachment 16 and/or the support member (lift arm 10) from the reference attitude Xs is used to calculate the degree of work done (depth-of-excavation D). With the above configuration, because the predetermined state of contact (predetermined contact state in which the contact degree C. is the predetermined contact degree Cp) between the work attachment 16 and the object 17 corresponding to the reference attitude Xs is accurately defined, the calculated degree of work done (depth-of-excavation D) is also accurate. This makes it possible to make a hole, trench, and/or the like (work product) having a dimension corresponding to the target degree (having a target depth, width, and/or the like) in the soil or the like (object).

The working machine 1 may further include a display 22 to display the degree of work done (depth-of-excavation D) measured by the controller 20.

The display 22 allows the operator to easily know the degree of work done (depth-of-excavation D) which is a current work product produced using the work attachment 16, and to also know the difference between the target degree (target depth Dt) and the current degree of work done (depth-of-excavation D) and/or the like.

The controller 20 may be configured or programmed to cause the display 22 to display a guidance indication regarding an operation of the at least one hydraulic cylinder (lift arm cylinder(s) 14 and/or attachment cylinder(s) 15) to change the attitude X to cause the degree of work done (depth-of-excavation D) to reach a target degree (target depth Dt).

The guidance indication allows the operator to know what operation they should perform to obtain a target work product, and makes it possible to easily achieve the target work product.

The controller 20 may be configured or programmed to, if the controller 20 determines that the degree of work done (depth-of-excavation D) has reached a target degree (target depth Dt) based on a result of detection by the attitude detector 62, cause the display 22 to display an indication that the degree of work done (depth-of-excavation D) has reached the target degree (target depth Dt).

The indication allows the operator to know that the target degree (target depth Dt) has been reached, and the operator therefore stops operating the hydraulic cylinder(s) not to increase the degree of work done (depth-of-excavation D) any further. This makes it possible to obtain an intended work product (such as a hole or a trench having a depth D equal to the target depth Dt).

The controller 20 may be configured or programmed to control extension and retraction of the at least one hydraulic cylinder (lift arm cylinder(s) 14 and/or attachment cylinder(s) 15) to control the attitude X such that the degree of work done (depth-of-excavation D) reaches a target degree (target depth Dt).

Since the controller 20 controls the extension and retraction of the hydraulic cylinder(s) as described above, the degree of work done (depth-of-excavation D) automatically reaches the target degree (target depth Dt) without operation errors or the like that would otherwise be caused by the operator, making it possible to reliably obtain an intended work product (such as a hole or a trench having a depth D equal to the target depth Dt).

The controller 20 may be configured or programmed to, if the controller 20 determines that the work attachment 16 is not in the predetermined contact state, control extension and retraction of the at least one hydraulic cylinder (lift arm cylinder(s) 14 and/or attachment cylinder(s) 15) such that the calculated current contact degree C. reaches the predetermined contact degree Cp.

Since the controller 20 controls the extension and retraction of the hydraulic cylinder(s) as described above, the contact degree C. automatically reaches the predetermined contact degree Cp without operation errors or the like that would otherwise be caused by the operator, making it possible to reliably achieve the predetermined state of contact (predetermined contact state) between the work attachment 16 and the object 17.

The working machine 1 may further include a display 22. The controller 20 may be configured or programmed to, if the controller 20 determines that the work attachment 16 is not in the predetermined contact state, cause the display 22 to display a guidance indication regarding an operation of the at least one hydraulic cylinder (lift arm cylinder(s) 14 and/or attachment cylinder(s) 15) to cause the calculated current contact degree C. to reach the predetermined contact degree Cp.

The guidance indication allows the operator to know what operation they should perform to achieve the predetermined state of contact (predetermined contact state) between the work attachment 16 and the object 17, making it possible to easily achieve the predetermined contact state which is to be achieved.

The controller 20 may be configured or programmed to, if the controller 20 determines that the work attachment 16 is not in the predetermined contact state, prohibit driving of the work attachment 16.

With this, for example, with regard to a work attachment 16 (such as a hydraulic breaker 16C) which is likely to be damaged if the work attachment 16 is driven when the state of contact between the work attachment 16 and the object 17 is not the predetermined contact state, it is possible to prevent or reduce damage to the work attachment 16 that would otherwise result if the work attachment 16 is driven while not in the predetermined contact state, and possible to improve durability of the work attachment 16.

The memory 21 may store a plurality of the predetermined contact degrees Cp (Cp1, Cpb1, Cpb2, Cpc, Cpd) corresponding to a respective plurality of the work attachments 16. The controller 20 may be configured or programmed to: select one of the plurality of predetermined contact degrees Cp (Cp1, Cpb1, Cpb2, Cpc, Cpd) that corresponds to the work attachment 16 connected to the at least one support member (lift arm 10); and compare the selected one of the plurality of predetermined contact degrees Cp (Cp1, Cpb1, Cpb2, Cpc, Cpd) with the calculated current contact degree C.

With this, when a work attachment 16 is actually connected to the support member (lift arm 10), the predetermined contact degree Cp corresponding to the work attachment 16 is selected reliably, contributing to accurately determining whether or not the state of contact between the work attachment 16 and the object 17 is the predetermined contact state.

The working machine 1 may further include an attitude detector 62 to detect an attitude X of the work attachment 16. The controller 20 may be configured or programmed to, if the controller 20 determines that the work attachment 16 is in the predetermined contact state, determine, as the attitude X of the work attachment 16 (e.g., a bucket 16A about to perform leveling of soil 17A (leveling of ground) or a sweeper 16B about to perform cleaning of a road surface 17B) in the predetermined contact state, the attitude X detected by the attitude detector 62 at a point in time at which the controller 20 determined that the work attachment 16 was in the predetermined contact state.

Since it is possible to evaluate the attitude X of the work attachment 16 in contact with the object 17 in the predetermined contact state, it is possible to prevent or reduce the loss of the work product (for example, the tilted work attachment 16 such as the bucket 16A scratches the soil) that would otherwise result from an inappropriate attitude X despite that the contact degree C. is the predetermined contact degree Cp, making it possible to more reliably obtain a suitable work product.

The memory 21 may store a proper attitude Xo of the work attachment 16 (e.g., a bucket 16A about to perform leveling of soil 17A (leveling of ground) or a sweeper 16B about to perform cleaning of a road surface 17B) in the predetermined contact state. The controller may be configured or programmed to, if the controller 20 determines that the work attachment 16 is in the predetermined contact state and the attitude X of the work attachment 16 detected by the attitude detector 62 differs from the proper attitude Xo, control extension and retraction of the at least one hydraulic cylinder (lift arm cylinder(s) 14 and/or attachment cylinder(s) 15) such that the attitude X of the work attachment 16 reaches the proper attitude Xo.

Since the controller 20 controls the extension and retraction of the hydraulic cylinder(s) as described above, the attitude X of the work attachment 16 which is in contact with the object 17 in the predetermined contact state (the state in which the contact degree C. is the predetermined contact degree Cp) automatically reaches the proper attitude Xo without operation errors or the like that would otherwise be caused by the operator, making it possible to reliably obtain a work product that is achievable by the work attachment 16 in the proper attitude Xo.

The working machine 1 may further include a display 22. The memory 21 may store a proper attitude Xo of the work attachment 16 (e.g., a bucket 16A about to perform leveling of soil 17A (leveling of ground) or a sweeper 16B about to perform cleaning of a road surface 17B) in the predetermined contact state. The controller 20 may be configured or programmed to, if the controller 20 determines that the work attachment 16 is in the predetermined contact state and the attitude X of the work attachment 16 detected by the attitude detector 62 differs from the proper attitude Xo, cause the display 22 to display a guidance indication regarding an operation of the at least one hydraulic cylinder (lift arm cylinder(s) 14 and/or attachment cylinder(s) 15) to cause the attitude X of the work attachment 16 to reach the proper attitude Xo.

The guidance indication allows the operator to know what operation they should perform to cause the attitude X of the work attachment 16 which is in contact with the object 17 in the predetermined contact state to reach the proper attitude Xo, and makes it possible to easily achieve the proper attitude Xo which is to be achieved.

The working machine 1 may further include a display 22. The memory 21 may store a proper attitude Xo of the work attachment 16 (e.g., a bucket 16A about to perform leveling of soil 17A (leveling of ground) or a sweeper 16B about to perform cleaning of a road surface 17B) in the predetermined contact state. The controller 20 may be configured or programmed to, if the controller 20 determines that the work attachment 16 is in the predetermined contact state and the attitude X of the work attachment 16 detected by the attitude detector 62 is equal to the proper attitude Xo, cause the display 22 to display an indication that the work attachment 16 is in the proper attitude Xo and in the predetermined contact state.

The indication allows the operator to know that the work attachment 16 is in the proper attitude Xo and in the predetermined contact state, and the operator therefore stops operating the hydraulic cylinder(s) not to change the attitude X to reach the proper attitude Xo any further. This makes it possible to obtain an intended work product (a product achievable by the work attachment 16 which does work in this state).

The working machine 1 may include a work operation lever 9 as a manual operator to be operated to cause the at least one hydraulic cylinder (the lift arm cylinder(s) 14 and/or the attachment cylinder(s) 15) to extend or retract. The controller 20 may be configured or programmed to, if the work operation lever 9 is operated to cause the at least one hydraulic cylinder (the lift arm cylinder(s) 14 and/or the attachment cylinder(s) 15) to extend or retract, calculate a corrected version of the relationship in pressure (cylinder thrust force Fc) using correction value(s) Kp and/or Kv set according to frictional resistance caused by operation of the work operation lever 9 on the piston of the at least one hydraulic cylinder (the lift arm cylinder(s) 14 and/or the attachment cylinder(s) 15).

With this, the relationship in pressure (cylinder thrust force Fc) is accurately calculated in consideration of variation in hydraulic pressure caused by frictional resistance generated in the at least one hydraulic cylinder (the lift arm cylinder(s) 14 and/or the attachment cylinder(s) 15).

The correction value(s) Kp and/or Kv may be changed according to a temperature of hydraulic fluid and/or an ambient temperature.

With this, the relationship in pressure (cylinder thrust force Fc) is accurately calculated in consideration of frictional resistance generated in the at least one hydraulic cylinder (the lift arm cylinder(s) 14 and/or the attachment cylinder(s) 15) that varies with the temperature of hydraulic fluid and/or the ambient temperature.

The correction value may be set to differ between when the at least one hydraulic cylinder (the lift arm cylinder(s) 14 and/or the attachment cylinder(s) 15) is not moving (the correction value set for such a case is “correction value Kp”) and when the at least one hydraulic cylinder (the lift arm cylinder(s) 14 and/or the attachment cylinder(s) 15) is moving (the correction value set for such a case is “correction value Kv”).

With this, the relationship in pressure (cylinder thrust force Fc) is accurately calculated in consideration of a difference between the static frictional resistance that would be generated in the at least one hydraulic cylinder (the lift arm cylinder(s) 14 and/or the attachment cylinder(s) 15) when the hydraulic cylinder is not moving and the kinetic frictional resistance that would be generated in the at least one hydraulic cylinder (the lift arm cylinder(s) 14 and/or the attachment cylinder(s) 15) when the hydraulic cylinder is moving.

The correction value may be set to differ between when the work operation lever 9 is operated to cause the at least one hydraulic cylinder (the lift arm cylinder(s) 14 and/or the attachment cylinder(s) 15) to extend (the correction value set for such a case is "correction value Kpr") and when the work operation lever 9 is operated to cause the at least one hydraulic cylinder (the lift arm cylinder(s) 14 and/or the attachment cylinder(s) 15) to retract (the correction value set for such a case is "correction value Kpb").

With this, the relationship in pressure (cylinder thrust force Fc) is accurately calculated in consideration of a difference between the frictional resistance that would be generated in the at least one hydraulic cylinder (the lift arm cylinder(s) 14 and/or the attachment cylinder(s) 15) while the hydraulic cylinder is extending or receiving a load from the work operation lever 9 operated to extend the hydraulic cylinder and the frictional resistance that would be generated in the at least one hydraulic cylinder (the lift arm cylinder(s) 14 and/or the attachment cylinder(s) 15) while the hydraulic cylinder is retracting or receiving a load from the work operation lever 9 operated to retract the hydraulic cylinder.

The correction value may be set to differ between when the at least one hydraulic cylinder (the lift arm cylinder(s) 14 and/or the attachment cylinder(s) 15) is extending (the correction value set for such a case is "correction value Kvr") and when the at least one hydraulic cylinder (the lift arm cylinder(s) 14 and/or the attachment cylinder(s) 15) is retracting (the correction value set for such a case is "correction value Kvb").

With this, the relationship in pressure (cylinder thrust force Fc) is accurately calculated in consideration of a difference between the kinetic frictional resistance that would be generated in the at least one hydraulic cylinder (the lift arm cylinder(s) 14 and/or the attachment cylinder(s) 15) while the hydraulic cylinder is extending and the kinetic frictional resistance that would be generated in the at least one hydraulic cylinder (the lift arm cylinder(s) 14 and/or the attachment cylinder(s) 15) while the hydraulic cylinder is retracting.

The controller 20 may be configured or programmed to: if the work operation lever 9 is operated to cause the at least one hydraulic cylinder (lift arm cylinder(s) 14 and/or attachment cylinder(s) 15) to extend, correct the detected bottom-side hydraulic pressure Pb to reduce the detected bottom-side hydraulic pressure Pb; and if the work operation lever 9 is operated to cause the at least one hydraulic cylinder (lift arm cylinder(s) 14 and/or attachment cylinder(s) 15) to retract, correct the detected rod-side hydraulic pressure Pr to reduce the detected rod-side hydraulic pressure Pr.

With this, the detected hydraulic pressures are corrected differently depending on when the hydraulic cylinder is extending and when the hydraulic cylinder is retracting, and the relationship in pressure regarding the hydraulic cylinder is calculated in an appropriate manner corresponding to the case of extension or the case of retraction.

A working machine 1 includes: a machine body 2: a support member (lift arm 10) supported on the machine body 2 and connectable to a work attachment 16 to do work by making contact with an object 17 to be contacted: lift arm cylinder(s) 14 which is a first hydraulic cylinder extendable and retractable to move the support member (lift arm 10) relative to the machine body 2, the first hydraulic cylinder including a rod-side fluid chamber 14*a* and a bottom-side fluid chamber 14*b* separated by a piston: a first rod-side pressure detector 63*a* to detect a first rod-side hydraulic pressure P1r which is a pressure of hydraulic fluid in communication with the rod-side fluid chamber 14*a* of the lift arm cylinder(s) 14: a first bottom-side pressure detector 63*b* to detect a first bottom-side hydraulic pressure P1b which is a pressure of hydraulic fluid in communication with the bottom-side fluid chamber 14*b* of the lift arm cylinder(s) 14: attachment cylinder(s) 15 which is a second hydraulic cylinder extendable and retractable to move the work attachment 16 connected to the support member (lift arm 10) relative to the support member (lift arm 10), the second hydraulic cylinder including a rod-side fluid chamber 15*a* and a bottom-side fluid chamber 15*b* separated by a piston: a second rod-side pressure detector 64*a* to detect a second rod-side hydraulic pressure P2r which is a pressure of hydraulic fluid in communication with the rod-side fluid chamber 15*a* of the attachment cylinder(s) 15: a second bottom-side pressure detector 64*b* to detect a second bottom-side hydraulic pressure P2b which is a pressure of hydraulic fluid in communication with the bottom-side fluid chamber 15*b* of the attachment cylinder(s) 15; and a controller 20 to calculate a relationship in pressure (cylinder thrust force Fc) between the detected first rod-side hydraulic pressure P1r and the detected first bottom-side hydraulic pressure P1b and a relationship in pressure between the detected second rod-side hydraulic pressure P2r and the detected second bottom-side hydraulic pressure P2b, and evaluate, based on the calculated relationships in pressure (cylinder thrust force Fc), a contact state which is a state of contact of the work attachment 16 with the object 17.

The state of contact between the work attachment 16 and the object 17 is accurately determined as such. This makes it possible, for example, to eliminate or reduce the likelihood that an unintended or inaccurate work product will result from an inappropriate contact state and hydraulic actuator(s) and/or the like of the work attachment 16 will be damaged because of the inappropriate contact state, making it possible for unskilled operators to easily obtain suitable work products using the work attachment 16. Furthermore, the state of contact is determined based on the detection of the rod-side hydraulic pressures Pr (P1r and P2r) by the rod-side pressure detectors 63*a* and 64*a* and the detection of the bottom-side hydraulic pressures Pb (P1b and P2b) by the bottom-side pressure detectors 63*b* and 64*b*. This eliminates the need for special, complex, and costly devices and thus makes it possible to provide a working machine 1 suitable also economically. Furthermore, since the relationship in hydraulic pressure regarding the lift arm cylinder(s) 14 and the relationship in hydraulic pressure of the attachment cylinder(s) 15 which are two types of cylinders are used, it is possible to accurately evaluate the state of contact of the work attachment 16 with the object 17 including the attitude of the work attachment 16 relative to the object 17.

The working machine 1 may further include a memory 21 to store a predetermined contact degree Cp, the predetermined contact degree Cp being a degree to which the work attachment 16 is in contact with the object 17 when the work attachment 16 is in a predetermined contact state. The controller 20 may be configured or programmed to: calculate, based on the calculated relationships in pressure, a current contact degree C. which is a degree to which the work attachment 16 is currently in contact with the object 17; compare the current contact degree C. with the stored predetermined contact degree Cp; and determine whether or not the work attachment 16 is in the predetermined contact state.

By comparing the predetermined contact degree Cp and the contact degree C. which based on the relationship in hydraulic pressure that can be easily calculated as described above, it is possible to easily obtain the result of determination of whether the work attachment 16 is in the predetermined contact state. Furthermore, since the relationship in hydraulic pressure regarding the lift arm cylinder(s) 14 and the relationship in hydraulic pressure regarding the attachment cylinder(s) 15 which are two types of cylinders are used, it is possible to more accurately calculate a contact degree C. that agrees with the actual state of contact of the work attachment 16.

The working machine 1 may further include an attitude detector 62 to detect an attitude X of the work attachment 16 and/or the support member (lift arm 10). The controller 20 may be configured or programmed to: if the controller 20 compares the calculated contact degree C. with the predetermined contact degree Cp and determines that the work attachment 16 is in the predetermined contact state, recognize, as a reference attitude Xs, the attitude X detected by the attitude detector 62 at a point in time at which the controller determined that the work attachment 16 was in the predetermined contact state; and based on a change in the attitude X detected by the attitude detector 62 from the reference attitude Xs, measure a degree of work done (depth-of-excavation D) represented as a change in position of the work attachment 16 relative to the object 17.

A change in attitude X of the work attachment 16 and/or the support member (lift arm 10) from the reference attitude Xs is used to calculate the degree of work done (depth-of-excavation D). With the above configuration, because the predetermined state of contact (predetermined contact state in which the contact degree C. is the predetermined contact degree Cp) between the work attachment 16 and the object 17 corresponding to the reference attitude Xs is accurately defined, the calculated degree of work done (depth-of-excavation D) is also accurate. This makes it possible to make a hole, trench, and/or the like (work product) having a dimension corresponding to the target degree (having a target depth, width, and/or the like) in the soil or the like (object). Furthermore, since the predetermined state of contact (predetermined contact state) between the work attachment 16 and the object 17 is evaluated based on the contact degree C. calculated based on the relationship in hydraulic pressure regarding the lift arm cylinder(s) 14 and the relationship in hydraulic pressure regarding the attachment cylinder(s) 15 which are two types of cylinders, it is possible to more accurately define the reference attitude Xs, and the degree of work done (depth-of-excavation D) based on a change in attitude X from the reference attitude Xs is also more accurate.

The controller 20 may be configured or programmed to, if the controller 20 determines that the work attachment 16 is in the predetermined contact state, evaluate the attitude X of the work attachment 16 in the predetermined contact state based on a relationship between (i) a relationship in pressure (cylinder thrust force Fc) between the first rod-side hydraulic pressure P1r and the first bottom-side hydraulic pressure P1b detected at a point in time at which the controller 20 determined that the work attachment 16 was in the predetermined contact state, and (ii) a relationship in pressure (cylinder thrust force Fc) between the second rod-side hydraulic pressure P2r and the second bottom-side hydraulic pressure P2b detected at a point in time at which the controller 20 determined that the work attachment 16 was in the predetermined contact state.

The attitude X of the work attachment 16 in the predetermined contact state can be evaluated using as-is the relationships in hydraulic pressure regarding the two types of hydraulic cylinders (lift arm cylinder(s) 14 and attachment cylinder(s) 15) for use in determining whether or not the state of contact between the work attachment 16 and the object 17 is the predetermined contact state, without having to use an apparatus such as the attitude detector 62, e.g., an angle sensor or a cylinder length detector to detect the attitude of the work attachment 16 and/or the support member (lift arm 10). This makes it possible, at low cost, to prevent or reduce the loss of the work product (for example, the tilted work attachment 16 such as the bucket 16A scratches the soil) that would otherwise result from an inappropriate attitude X despite that the contact degree C. is the predetermined contact degree Cp, making it possible to more reliably achieve a suitable work product.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:

a machine body;

at least one support member supported on the machine body and connectable to a work attachment to do work by making contact with an object to be contacted;

at least one hydraulic cylinder extendable and retractable to move the work attachment connected to the at least one support member, the at least one hydraulic cylinder including a rod-side fluid chamber and a bottom-side fluid chamber separated by a piston, the rod-side fluid chamber having a rod-side pressure area and the bottom-side fluid chamber having a bottom-side pressure area;

a control valve to control a rod-side hydraulic pressure which is a pressure of hydraulic fluid in communication with the rod-side fluid chamber of the at least one hydraulic cylinder, and a bottom-side hydraulic pressure which is a pressure of hydraulic fluid in communication with the bottom-side fluid chamber of the at least one hydraulic cylinder;

a rod-side pressure detector to detect the rod-side hydraulic pressure;

a bottom-side pressure detector to detect the bottom-side hydraulic pressure; and a controller to calculate a cylinder thrust force corresponding to a difference between a product of the rod-side hydraulic pressure detected by the rod-side pressure detector and the rod-side pressure area minus another product of the bottom-side hydraulic pressure detected by the bottom-side pressure detector and the bottom side pressure area;

a memory to store a predetermined cylinder thrust force which achieves a predetermined contact state of the work attachment with the object, the predetermined cylinder thrust force depending on the work attachment and the work done using the work attachment, wherein the controller is configured or programmed to read the predetermined cylinder thrust force stored in the memory, and control the control valve to bring the calculated cylinder thrust force into the predetermined cylinder thrust force.

2. The working machine according to claim 1, wherein the at least one hydraulic cylinder includes a lift arm cylinder;

the work attachment includes a hydraulic breaker having a chisel, which is connected to the lift arm cylinder; and the controller is configured or programmed to, after bringing the calculated cylinder thrust force into the predetermined cylinder thrust force and while causing the chisel to crush a to-be-crushed object which is the object to be contacted, by reciprocating movements of the chisel, control the control valve so that a cylinder rod of the lift arm cylinder is retracted.

3. The working machine according to claim 1, wherein the at least one hydraulic cylinder includes an attachment cylinder;

the work attachment includes a sweeper having a rotary brush, which is connected to the attachment cylinder;

the controller is configured or programmed to, after bringing the calculated cylinder thrust force into the predetermined cylinder thrust force and while causing the rotary brush to clean a road surface which is the object to be contacted, by rotating the rotary brush on the road surface, control the control valve so that a cylinder rod of the attachment cylinder is extended.

4. The working machine according to claim 1, wherein the at least one hydraulic cylinder includes an attachment cylinder;

the work attachment includes an earth auger having an auger shaft, which is connected to the attachment cylinder;

the controller is configured or programmed to, after bringing the calculated cylinder thrust force into the predetermined cylinder thrust force and while digging into soil which is the object to be contacted, by rotating the auger shaft in contact with the soil, control the control valve so that a cylinder rod of the attachment cylinder is extended.

5. The working machine according to claim 4, wherein the controller is configured or programmed to, calculate and display on a display, an excavation depth from a reference position of the auger shaft when bringing the calculated cylinder thrust force into the predetermined cylinder thrust force, to a position of the auger shaft which changes as the earth auger proceeds excavation.

6. The working machine according to claim 1, wherein the work attachment includes a storage to store information relating to the work attachment; and the controller is configured or programmed to read the predetermined cylinder thrust force stored in the memory, based on the information stored in the storage of the work attachment, and control the control valve to bring the calculated cylinder thrust force into the predetermined cylinder thrust force.

7. The working machine according to claim 6, wherein the at least one hydraulic cylinder a lift arm cylinder and an attachment cylinder;

the information stored in the storage of the work attachment indicates the cylinder thrust force of either one of the lift arm cylinder or the attachment cylinder; and the controller is configured or programmed to read the predetermined cylinder thrust force indicated by the information stored in the storage of the work attachment, and control the control valve to bring the calculated cylinder thrust force into the predetermined cylinder thrust force.

8. The working machine according to claim 1, further comprising:

a display to display a plurality of pictograms each corresponding to respective one of a plurality of the work attachments, in a touch sensitive form, wherein the controller is configured or programmed to read the predetermined cylinder thrust force of the respective one of the plurality of the work attachments, which is selected by an operator's touch on one of the plurality of pictograms, and control the control valve to bring the calculated cylinder thrust force into the predetermined cylinder thrust force.

* * * * *